United States Patent
Dunning et al.

(10) Patent No.: US 8,005,724 B2
(45) Date of Patent: Aug. 23, 2011

(54) RELATIONSHIP DISCOVERY ENGINE

(75) Inventors: Ted E Dunning, San Diego, CA (US); Bradley D Kindig, San Diego, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1230 days.

(21) Appl. No.: 10/401,940

(22) Filed: Mar. 26, 2003

(65) Prior Publication Data

US 2003/0229537 A1    Dec. 11, 2003

Related U.S. Application Data

(63) Continuation of application No. 09/846,823, filed on Apr. 30, 2001.

(60) Provisional application No. 60/201,622, filed on May 3, 2000.

(51) Int. Cl.
*G06Q 30/00* (2006.01)

(52) U.S. Cl. ..................................................... 705/26.7

(58) Field of Classification Search ........................ None
See application file for complete search history.

(56) References Cited

U.S. PATENT DOCUMENTS

| | | | |
|---|---|---|---|
| 3,568,156 A | 3/1971 | Thompson | |
| 4,384,329 A | 5/1983 | Rosenbaum et al. | |
| 4,833,610 A | 5/1989 | Zamora | |
| 4,996,642 A | 2/1991 | Hey | |
| 5,062,143 A | 10/1991 | Schmitt | |
| 5,182,708 A | 1/1993 | Ejiri | |
| 5,241,674 A | 8/1993 | Kuorsawa | |
| 5,303,150 A | 4/1994 | Kameda | |
| 5,303,302 A | 4/1994 | Burrows | |
| 5,371,807 A | 12/1994 | Register et al. | |
| 5,392,212 A | 2/1995 | Geist | |
| 5,404,505 A | 4/1995 | Levinson | |
| 5,418,951 A | 5/1995 | Damashek | |
| 5,497,488 A | 3/1996 | Akizawa | |
| 5,499,046 A | 3/1996 | Schiller | |
| 5,539,635 A | 7/1996 | Larson, Jr. | |
| 5,548,507 A | 8/1996 | Martino | |
| 5,583,763 A * | 12/1996 | Atcheson et al. | 707/3 |
| 5,592,511 A | 1/1997 | Schoen | |
| 5,608,622 A | 3/1997 | Church | |
| 5,616,876 A | 4/1997 | Cluts | |

(Continued)

FOREIGN PATENT DOCUMENTS

AU    A-53031/98    8/1998

(Continued)

OTHER PUBLICATIONS

U.S. Appl. No. 60/144,377.*

(Continued)

*Primary Examiner* — Yehdega Retta
(74) *Attorney, Agent, or Firm* — James J. DeCarlo; Greenberg Traurig, LLP

(57) ABSTRACT

A system, method, and computer program product discover relationships among items and recommend items based on the discovered relationships. The recommendations provided by the present invention are based on user profiles that take into account actual preferences of users, without requiring users to complete questionnaires. An improved binomial log likelihood ratio analysis technique is applied, to reduce adverse effects of overstatement of coincidence and predominance of best sellers. The invention may be used, for example, to generate track lists for a personalized radio station.

88 Claims, 52 Drawing Sheets

U.S. PATENT DOCUMENTS

| | | |
|---|---|---|
| 5,661,787 A | 8/1997 | Pocock |
| 5,675,786 A | 10/1997 | McKee |
| 5,678,054 A | 10/1997 | Shibata |
| 5,706,365 A | 1/1998 | Rangarajan |
| 5,708,709 A | 1/1998 | Rose |
| 5,713,016 A | 1/1998 | Hill |
| 5,721,827 A | 2/1998 | Logan et al. |
| 5,726,909 A | 3/1998 | Krikorian |
| 5,740,134 A | 4/1998 | Peterson |
| 5,749,081 A | 5/1998 | Whiteis |
| 5,751,672 A | 5/1998 | Yankowski |
| 5,754,938 A | 5/1998 | Herz |
| 5,758,257 A | 5/1998 | Herz et al. |
| 5,764,235 A | 6/1998 | Hunt et al. |
| 5,774,357 A | 6/1998 | Hoffberg |
| 5,790,423 A | 8/1998 | Lan et al. |
| 5,790,935 A | 8/1998 | Payton |
| 5,809,246 A | 9/1998 | Goldman et al. |
| 5,819,160 A | 10/1998 | Foladare et al. |
| 5,842,010 A | 11/1998 | Jain |
| 5,862,220 A | 1/1999 | Perlman |
| 5,862,339 A | 1/1999 | Bonnaure |
| 5,864,868 A | 1/1999 | Contois |
| 5,872,921 A | 2/1999 | Zahariev |
| 5,881,234 A | 3/1999 | Schwab |
| 5,883,986 A | 3/1999 | Kopec |
| 5,884,312 A | 3/1999 | Dustan |
| 5,898,833 A | 4/1999 | Kidder |
| 5,913,040 A | 6/1999 | Rakavy |
| 5,913,041 A | 6/1999 | Ramanathan |
| 5,926,207 A | 7/1999 | Vaughan |
| 5,930,526 A | 7/1999 | Iverson |
| 5,930,768 A | 7/1999 | Hooban |
| 5,931,907 A | 8/1999 | Davies |
| 5,941,951 A | 8/1999 | Day |
| 5,945,988 A | 8/1999 | Williams |
| 5,950,189 A | 9/1999 | Cohen |
| 5,956,482 A | 9/1999 | Agraharam |
| 5,960,430 A | 9/1999 | Haimowitz |
| 5,969,283 A | 10/1999 | Looney et al. |
| 5,977,964 A | 11/1999 | Williams |
| 5,983,176 A | 11/1999 | Hoffert |
| 5,987,525 A | 11/1999 | Roberts |
| 5,996,015 A | 11/1999 | Day |
| 6,000,008 A | 12/1999 | Simcoe |
| 6,009,382 A | 12/1999 | Martino et al. |
| 6,012,098 A | 1/2000 | Bayeh |
| 6,020,883 A | 2/2000 | Herz |
| 6,021,203 A | 2/2000 | Douceur |
| 6,026,398 A | 2/2000 | Brown et al. |
| 6,026,439 A | 2/2000 | Chowdhury |
| 6,029,195 A | 2/2000 | Herz |
| 6,031,795 A | 2/2000 | Wehmeyer |
| 6,031,797 A | 2/2000 | Van Ryzin |
| 6,035,268 A | 3/2000 | Carus |
| 6,038,527 A | 3/2000 | Renz |
| 6,038,591 A | 3/2000 | Wolfe |
| 6,047,251 A | 4/2000 | Pon |
| 6,047,268 A | 4/2000 | Bartoli |
| 6,047,320 A | 4/2000 | Tezuka |
| 6,047,327 A | 4/2000 | Tso |
| 6,052,717 A | 4/2000 | Reynolds |
| 6,061,680 A | 5/2000 | Scherf |
| 6,064,980 A | 5/2000 | Jacobi et al. |
| 6,065,051 A | 5/2000 | Steele |
| 6,065,058 A | 5/2000 | Hailpern et al. |
| 6,070,185 A | 5/2000 | Anupam |
| 6,085,242 A | 7/2000 | Chandra |
| 6,097,719 A | 8/2000 | Benash |
| 6,102,406 A | 8/2000 | Miles |
| 6,105,022 A | 8/2000 | Takahashi |
| 6,131,082 A | 10/2000 | Hargrave, III et al. |
| 6,134,532 A | 10/2000 | Lazarus et al. |
| 6,138,142 A | 10/2000 | Linsk |
| 6,154,773 A | 11/2000 | Roberts et al. |
| 6,161,132 A | 12/2000 | Roberts et al. |
| 6,161,139 A | 12/2000 | Win |
| 6,167,369 A | 12/2000 | Schulze |
| 6,182,142 B1 | 1/2001 | Win |
| 6,185,560 B1 | 2/2001 | Young |
| 6,192,340 B1 | 2/2001 | Abecassis |
| 6,205,126 B1 | 3/2001 | Moon |
| 6,222,980 B1 | 4/2001 | Asai |
| 6,225,546 B1 | 5/2001 | Kraft |
| 6,230,192 B1 | 5/2001 | Roberts |
| 6,230,207 B1 | 5/2001 | Roberts |
| 6,240,459 B1 | 5/2001 | Roberts |
| 6,246,672 B1 | 6/2001 | Lumelsky |
| 6,249,810 B1 | 6/2001 | Kiraly |
| 6,252,988 B1 | 6/2001 | Ho |
| 6,263,313 B1 | 7/2001 | Milsted |
| 6,272,456 B1 | 8/2001 | de Campos |
| 6,272,495 B1 | 8/2001 | Hetherington |
| 6,282,548 B1 | 8/2001 | Burner |
| 6,292,795 B1 | 9/2001 | Peters et al. |
| 6,298,446 B1 | 10/2001 | Schreiber |
| 6,314,421 B1 | 11/2001 | Sharnoff |
| 6,317,761 B1 | 11/2001 | Landsman et al. |
| 6,321,205 B1 | 11/2001 | Eder |
| 6,321,221 B1 * | 11/2001 | Bieganski ............ 707/5 |
| 6,330,593 B1 | 12/2001 | Roberts |
| 6,343,317 B1 | 1/2002 | Glorikian |
| 6,353,849 B1 | 3/2002 | Linsk |
| 6,370,315 B1 | 4/2002 | Mizuno |
| 6,370,513 B1 | 4/2002 | Kolawa et al. |
| 6,389,467 B1 * | 5/2002 | Eyal ............... 709/223 |
| 6,405,203 B1 | 6/2002 | Collart |
| 6,430,539 B1 | 8/2002 | Lazarus et al. |
| 6,434,535 B1 | 8/2002 | Kupka |
| 6,438,579 B1 | 8/2002 | Hosken |
| 6,487,598 B1 | 11/2002 | Valencia |
| 6,490,553 B2 | 12/2002 | Van Thong |
| 6,505,160 B1 | 1/2003 | Levy |
| 6,512,763 B1 | 1/2003 | DeGolia, Jr. |
| 6,513,061 B1 | 1/2003 | Ebata |
| 6,522,769 B1 | 2/2003 | Rhoads |
| 6,526,411 B1 | 2/2003 | Ward |
| 6,532,477 B1 | 3/2003 | Tang |
| 6,535,854 B2 | 3/2003 | Buchner |
| 6,538,996 B1 | 3/2003 | West |
| 6,560,403 B1 | 5/2003 | Tanaka |
| 6,560,704 B2 | 5/2003 | Dieterman |
| 6,587,127 B1 | 7/2003 | Leeke |
| 6,611,812 B2 | 8/2003 | Hurtado |
| 6,611,813 B1 | 8/2003 | Bratton |
| 6,614,914 B1 | 9/2003 | Rhoads |
| 6,615,208 B1 | 9/2003 | Behrens et al. |
| 6,655,963 B1 | 12/2003 | Horvitz et al. |
| 6,657,117 B2 | 12/2003 | Weare et al. |
| 6,658,151 B2 | 12/2003 | Lee |
| 6,661,787 B1 | 12/2003 | O'Connell |
| 6,677,894 B2 | 1/2004 | Sheynblat |
| 6,725,446 B1 | 4/2004 | Hahn |
| 6,741,980 B1 | 5/2004 | Langseth |
| 6,757,740 B1 | 6/2004 | Parekh |
| 6,807,632 B1 | 10/2004 | Carpenter |
| 6,889,383 B1 | 5/2005 | Jarman |
| 6,925,441 B1 * | 8/2005 | Jones et al. ............ 705/10 |
| 6,952,523 B2 | 10/2005 | Tanaka |
| 2001/0005823 A1 | 6/2001 | Fischer |
| 2001/0042107 A1 | 11/2001 | Palm |
| 2001/0042109 A1 | 11/2001 | Bolas et al. |
| 2001/0044855 A1 | 11/2001 | Vermeire et al. |
| 2001/0052028 A1 | 12/2001 | Roberts |
| 2001/0055276 A1 | 12/2001 | Rogers |
| 2002/0002039 A1 | 1/2002 | Qureshey et al. |
| 2002/0004839 A1 | 1/2002 | Wine et al. |
| 2002/0007418 A1 | 1/2002 | Hegde et al. |
| 2002/0010621 A1 | 1/2002 | Bell et al. |
| 2002/0010714 A1 | 1/2002 | Hetherington |
| 2002/0010789 A1 | 1/2002 | Lord |
| 2002/0013852 A1 | 1/2002 | Janik |
| 2002/0016839 A1 | 2/2002 | Smith et al. |
| 2002/0035561 A1 | 3/2002 | Archer |
| 2002/0045717 A1 | 4/2002 | Grenda |
| 2002/0056004 A1 | 5/2002 | Smith |
| 2002/0065857 A1 | 5/2002 | Michalewicz |

| | | | |
|---|---|---|---|
| 2002/0082901 | A1 | 6/2002 | Dunning |
| 2002/0095387 | A1 | 7/2002 | Sosa |
| 2002/0099696 | A1 | 7/2002 | Prince |
| 2002/0099737 | A1 | 7/2002 | Porter |
| 2002/0111912 | A1 | 8/2002 | Hunter |
| 2002/0129123 | A1 | 9/2002 | Johnson |
| 2002/0152204 | A1 | 10/2002 | Ortega et al. |
| 2002/0175941 | A1 | 11/2002 | Hand |
| 2003/0002608 | A1 | 1/2003 | Glenn |
| 2003/0007507 | A1 | 1/2003 | Rajwan et al. |
| 2003/0028796 | A1 | 2/2003 | Roberts |
| 2003/0046283 | A1 | 3/2003 | Roberts |
| 2003/0083871 | A1 | 5/2003 | Foote |
| 2003/0093476 | A1 | 5/2003 | Syed |
| 2003/0133453 | A1 | 7/2003 | Makishima et al. |
| 2003/0135513 | A1 | 7/2003 | Quinn |
| 2003/0139989 | A1 | 7/2003 | Churquina |
| 2003/0165200 | A1 | 9/2003 | Pugel |
| 2003/0182139 | A1 | 9/2003 | Harris |
| 2003/0190077 | A1 | 10/2003 | Ross |
| 2003/0206558 | A1 | 11/2003 | Parkkinen et al. |
| 2005/0149759 | A1 | 7/2005 | Vishwanath |

FOREIGN PATENT DOCUMENTS

| | | |
|---|---|---|
| EP | 0 173 639 A2 | 3/1986 |
| EP | 0 847 156 A2 | 10/1998 |
| EP | 0 955 592 A2 | 11/1999 |
| EP | 0 955 592 A3 | 11/1999 |
| EP | 1 050 833 A2 | 11/2000 |
| EP | 1 236 354 | 5/2001 |
| EP | 1 010 098 B1 | 6/2003 |
| EP | 1 324 567 A2 | 7/2003 |
| EP | 1 324 567 A3 | 7/2003 |
| GB | 2306869 | 11/1995 |
| GB | 2 306 869 | 7/1997 |
| JP | 2001202368 | 7/2001 |
| JP | 2001521642 T | 11/2001 |
| WO | WO 97/07467 | 2/1997 |
| WO | WO 98/25269 A1 | 6/1998 |
| WO | WO 98/47080 A2 | 11/1998 |
| WO | WO 99/27681 | 6/1999 |
| WO | WO 99/43111 | 8/1999 |
| WO | WO 00/31964 | 6/2000 |
| WO | WO 00/46681 A1 | 8/2000 |
| WO | WO 01/33379 A1 | 10/2000 |
| WO | WO 01/54323 A2 | 1/2001 |
| WO | WO 01/35667 A1 | 5/2001 |
| WO | WO 01/73639 A1 | 10/2001 |
| WO | WO 02/42862 A2 | 5/2002 |
| WO | WO 03/012695 A2 | 2/2003 |

OTHER PUBLICATIONS

U.S. Appl. No. 60/166,039.*
U.S. Appl. No. 60/165,726.*
U.S. Appl. No. 60/165,727.*
Lauren B. Doyle, "Indexing and Abstracting by Association—Part 1," pp. 25-38, Santa Monica, CA,, *Found in: Readings in Information Retrieval, Edited by Karen Sparck Jones and Peter Willett, Morgan Kaufmann Publishers, Inc.*, San Francisco, CA, © 1997.
M.E. Maron and J.L. Kuhns, "On Relevance, Probabilistic Indexing and Information Retrieval," pp. 39-46, *Found in: Readings in Information Retrieval, Edited by Karen Sparck Jones and Peter Willett, Morgan Kaufmann Publishers, Inc.*, San Francisco, CA, © 1997.
Cyril Cleverdon, "The Cranfield Tests on Index Language Devices," presented Apr. 27, 1967, pp. 47-59, *Found in: Readings in Information Retrieval, Edited by Karen Sparck Jones and Peter Willett, Morgan Kaufmann Publishers, Inc.*, San Francisco, CA, © 1997.
G. Salton and M. E. Lesk, "Computer Evaluation of Indexing and Text Processing," pp. 60-84, *Found in: Readings in Information Retrieval, Edited by Karen Sparck Jones and Peter Willett, Morgan Kaufmann Publishers, Inc.*, San Francisco, CA, © 1997.
Chapter 3—"Key Concepts," pp. 85-92 *Found in: Readings in Information Retrieval, Edited by Karen Sparck Jones and Peter Willett, Morgan Kaufmann Publishers, Inc.*, San Francisco, CA, © 1997.
W. J. Hutchins, "The Concept of 'Aboutness' in Subject Indexing," presented Apr. 18, 1977, Chapter 3—Key Concepts, pp. 93-97, *Found in: Readings in Information Retrieval, Edited by Karen Sparck Jones and Peter Willett, Morgan Kaufmann Publishers, Inc.*, San Francisco, CA, © 1997.
Cyril W. Cleverdon and J. Mills, "The Testing of Index Language Devices," presented Feb. 5, 1963, Chapter 3—Key Concepts, pp. 98-110, *Found in: Readings in Information Retrieval, Edited by Karen Sparck Jones and Peter Willett, Morgan Kaufmann Publishers, Inc.*, San Francisco, CA, © 1997.
Gerard Salton and Michael J. McGill, "Introduction to Modern Information Retrieval," Computer Science Series, pp. 1-435, © 1983 by McGraw-Hill, Inc., McGraw-Hill Book Company, USA.
C. J. van Rijsbergen B.Sc., Ph.D., M.B.C.S, "Information Retrieval," Department of Computing Science—University of Glasgow [online], 1979 [retrieved on Aug. 24, 2001] Retrieved from <URL:http://www.dcs.gla.ac.uk/keith/preface.html> (213 pages).
Alan Griffiths, H. Claire Luckhurst and Peter Willett, "Using Interdocument Similarity Information in Document Retrieval Systems," pp. 365-373, © 1986 by John Wiley & Sons, Inc.
Karen Sparck Jones, "Search Term Relevance Weighting Given Little Relevance Information," pp. 329-338, (originally located in Journal of Documentation, vol. 35, No. 1, Mar. 1979, pp. 30-48).
E. Michael Keen, "Presenting Results of Experimental Retrieval Comparisons," Department of Information & Library Studies, University College of Wales, Aberystwyth, Sy23 3AS U.K., pp. 217-222.
Brian P. Mc Cune, Richard M. Tong, Jeffrey S. Dean, and Daniel G. Shapiro, "RUBRIC: A System for Rule-Based Information Retrieval," pp. 440-445.
S.E. Robertson, "The Probability Ranking Principle in IR," School of Library, Archive, Information Studies, University College of London, pp. 281-286.
S.E. Robertson and S. Walker, "Some Simple Effective Approximations to the 2—Poisson Model for Probabilistic Weighted Retrieval," Centre for Interactive Systems Research, Department of Information Science, City University, Northampton Square, London, EC1V 0HB, U.K., pp. 345-354.
G. Salton and M.J. McGill, "The SMART and SIRE Experimental Retrieval Systems," pp. 381-399.
G. Salton, A. Wong and C.S. Yang, "A Vector Space Model for Automatic Indexing," Cornell University, pp. 273-280.
Gerard Salton and Christopher Buckley, "Term-Weighting Approaches in Automatic Text Retrieval," (received Nov. 19, 1987; accepted in final form Jan. 26, 1988), Department of Computer Science, Cornell University, Ithaca, NY.
Tomek Strzalkowski, "Robust Text Processing in Automated Information Retrieval," Courant Institute of Mathematical Sciences, pp. 317-322.
Jean Tague-Sutcliffe, "The Pragmatics of Information Retrieval Experimentation Revisited," School of Library and Information Science, University of Western Ontario, Canada, pp. 205-216.
M. F. Porter, "An Algorithm for Suffix Stripping," Computer Laboratory, Corn Exchange Street, Cambridge, 313-316.
W. B. Croft and D. J. Harper, "Using Probabilistic Models of Document Retrieval Without Relevance Information," Department of Computer & Information Science, University of Massachusetts, pp. 339-344.
Hayes, Conor et al., Smart Radio—A Proposal, Technical Report TCD-CS-1999-24, Online! Apr. 1999 , pp. 1-14, XP002279579. Trinity College Dublin. Ireland. Retrieved from the Internet <URL:http://www.cs.tcd.ie/publications/tech-reports/reports.99/TCD-CS-1999-24.pdf>, retrieved on May 7, 2004.
Hoffman, Thomas et al., Latent Class Models For Collaborative Filtering, Proceedings of The Sixteenth International Joint Conference on Artificial Intelligence, IJCAI 99, Stockholm, Sweden, Jul. 31-Aug. 6, 1999, Online! pp. 688-693, XP002279578, Retrieved from the Internet <URL:http://www.cs.brcnvn.edu/(th/papers/HofmannPuzicha-IJCAI99.pdf>. retrieved on May 7, 2004.
Loeb, Shoshana, Architecting Personalized Delivery of Multimedia Information, Communications of The ACM, vol. 25, No. 12. Dec. 1992, pp. 39-50, XP002102709.
Nichols, David M. et al., Recommendation and Usage in the Digital Library, Technical Report Ref. CSEG/2/1997, Online! 1997. pp.

1-15. XP002279577, Retrieved from the Internet <URL:ftp://ftp.comp.lancs.ac.uk/pub/reports/1997/CSEG.2.97.pdf> retrieved on May 7, 2004.

Schafer, J. Ben et al., Recommender Systems in E-Commerce, Proceedings ACM Conference on Electronic Commerce, 1999, pp. 158-166, XP002199598.

Supplementary European Search Report in Application No. EP 01 95 1043 (dated Mar. 28, 2007).

"Fast Algorithms for Projected Clustering;" Charu C. Aggarwal, Cecilia Procopiuc, Joel L. Wolf, Philip S. Yu, and Jong Soo Park. Proceedings of the ACM SIGMOD International Conference on Management of Data, 1999.

R. Brody, Ph.D., "The Conditions and Consequences of Profiling in Commercial and Governmental Settings," Technology and Society, 1998. ISTAS 98. Wiring The World: The Impact of Information Technology on Society, Proccedings of the 1998 International Symposium on South Bend, IN, USA Jun. 12-13, 1998, NY, NY, USA, IEEE, US, Jun. 12, 1998, pp. 148-154, XP010291443, ISBN: 0-7803-4327-1 *the whole document*.

Agosti, M., Gradenigo, G. Marchetti, P.G., "A Hypertext Environment for Interacting with Large Textual Databases," pp. 469-477.

MusicMatch Literature downloaded from web.archive.org—7 pages total.

RealNetworks Literature downloaded from web.archive.org—16 pages total.

Belkin, N.J. Oddy, R.N., Brooks, H.M., "The Journal of Documentation," vol. 38, No. 2, Jun. 1982, pp. 299-304.

"Mel-Frequency Cepstral Analysis", [online] [retrieved on Feb. 2, 2001] Retrieved from the Internet <URL:http://ccrma-www.standford.edu/~unjung/mylec/mfcc.html>, pp. 1-3.

de Marcken, Carl, "The Unsupervised Acquisition of a Lexicon from Continuous Speech," Massachusetts Institute of Technology Artificial Intelligence Laboratory: Center for Biological and Computational Learning, Department of Brain and Cognitive Sciences, A.I. Memo No. 1558 and C.B.C.L. Memo No. 129, Nov. 2001, pp. 1-27.

Goldberg, Gribble, Wagner, Brewer "The Ninja Jukebox" Oct. 14, 1999.

Hull, David A. and Grefenstette, Gregory, "Querying Across Languages: A Dictionary-Based Approach to Multilingual Information Retrieval," pp. 484-492.

Jones, Karen Sparck, Jones, G.J.F., Foote, J.T. and Young, S.J., "Experiments in Spoken Document Retrieval," pp. 493-502.

Internet Papers: Freetantrum: Songprint 1.2, and computer code; www.freetantrum.org; Dec. 11, 2000; 46 pages.

Jones, Karen Sparck and Willett, Peter, "Readings in Information Retrieval," Morgan Kaufmann Publishers, Inc., 1997, pp. 25-110, 205-246, 257-412, 440-445, 469-502, 527-533.

Lancaster, F.W., "MEDLARS: Report on the Evaluation of Its Operating Efficiency," pp. 223-246.

Shah, Tej, "Improving Electronic Commerce Through Gather Customer Data," TCC402 [online] Apr. 23, 1998 XP002379874, University of Virginia, USA Retrieved from the Internet: <URL:http://www.lib.virginia.edu> [Retrieved on May 8, 2006] *the whole document*.

Liu, Zhu, Wang, Yao and Chen, Tsuhan, "Audio Feature Extraction and Analysis for Scene Segmentation and Classification," Journal of VLSI Signal Processing 20.61-79 (1998).

Rau, Lisa F., "Conceptual Information Extraction and Retrieval from Natural Language Input," Artificial Intelligence Program GE Research and Development Center, Schenectady, NY 12301, pp. 527-533.

Salton, Gerard, Allan, James, Buckley, Singhal, Amit, "Automatic Analysis, Theme Generation, and Summarization of Machine-Readable Texts," pp. 478-483.

Stubblefield, Adam and Wallach, Dan S., "A Security Analysis of My.MP3.com and the Beam-it Protocol," Department of Computer Science, Rice University.

Witten, Ian H. and Frank, Eibe, :Data Mining, Practical Machine Learning Tools and Techniques with JAVA Implementations, Academic Press, pp. 57-76.

Wold, Erling, Blum, Thom, Keislar, Douglas and Wheaton, James, "Content-Based Classification, Search, and Retrieval of Audio," IEEE MultiMedia, Fall 1996.

Written Opinion of the Patent Cooperation Treaty for International Patent Application No. PCT/US02/03504.

* cited by examiner

RELATIONSHIP DISCOVERY ENGINE

CROSS-REFERENCE TO RELATED APPLICATION

This application is a continuation of U.S. patent application Ser. No. 09/846,823, filed on Apr. 30, 2001, for "Relationship Discovery Engine," which claims priority from provisional U.S. Patent Application Ser. No. 60/201,622, for "Recommendation Engine," filed May 3, 2000, the disclosures of which are incorporated herein by reference.

BACKGROUND OF THE INVENTION

1. Field of the Invention

The present invention is related to systems, methods, and computer program products for relationship discovery, and more particularly to a system, method, and computer program product of discovering relationships among items such as music tracks, and making recommendations based on user preferences and discovered relationships.

2. Description of the Background Art

In many applications for the presentation and marketing of online content, personalization of the user's experience is desirable. Knowledge and application of user preferences permit online advertisers to more efficiently target their advertisements to those users who are more likely to respond. Electronic commerce sites are able to suggest products and services that are likely to be of interest to particular users, based on user profiles and preferences. Such suggestions may be made, for example, by sending e-mail to the user, or by presenting a list of recommended items in the context of a dynamically generated web page. Additional applications exist for such functionality, including both online applications (such as personalized radio stations, news delivery, and the like) and non-online applications (such as targeting of direct mail advertising, supermarket checkout coupons, and the like).

One particular application in which user-specific recommendations may be generated is personalized online radio stations. It is known to provide web pages for delivering selected music tracks to individual users, based on user selection. Compressed, digitized audio data is delivered to users in a streaming format (or alternatively in downloadable format), for playback at users' computers using conventional digital audio playback technology such as the Windows Media Player from Microsoft Corporation, or the RealPlayer from Real Networks. It would be desirable for such radio stations to be able to determine which music tracks are likely to be enjoyed by a particular user, even in the absence of, or as a supplement to, explicit selection of particular tracks by the user.

It is desirable, then, to provide accurate methods and systems for discovering user preferences in particular domains and with respect to particular types of products and services. Several prior art techniques exist for discovering user preferences. In one such technique, as described in U.S. Pat. No. 6,064,980, Jacobi et al., "System and Methods for Collaborative Recommendations," issued May 16, 2000, collaborative filtering is employed. Users are asked to complete an online questionnaire specifying their preferences. Such a questionnaire may be presented to the user, for example, when he or she attempts to register for an online service or purchase an online product. The user's responses may then be stored as a user "profile" in a back-end database. The system correlates the profile to the profiles of other users in order to identify users having similar tastes; recommendations are then generated based on the preferences of the similar users.

However, many users may be reluctant to complete such online questionnaires, due to privacy concerns, or due to an unwillingness to take the time required to answer the questions. Furthermore, such questionnaires often fail to accurately collect user preference information, since they do not actually reflect the user's consumptive behavior; in other words, users may answer inaccurately because they are unaware of (or dishonest about) their own preferences. In addition, the accuracy of the results is limited by the quality of the designed questions. Finally, the stored user profile merely provides a description of the user's preferences at the particular point in time when the questionnaire was completed, and may fail to take into account subsequent changes and/or refinements to the preferences.

A second prior art technique for discovering user preferences is to observe user behavior. In online commerce environments, user behavior can be observed by tracking the particular pages visited, products ordered, files downloaded or accessed, and the like. Users may be prompted for login identifiers, providing a mechanism for identifying users. In addition to or instead of login, cookies may be stored on users' computers, as is known in the art, in order to recognize a user who has previously visited a site. Thus, user behavior can be tracked over multiple visits, without requiring the user to set up a login identifier or to even be aware that his or her behavior is being tracked.

For example, many online commerce sites keep track of user purchases, and, based on such purchases, make recommendations as to products and services that are likely to be of interest to a particular user. Such recommendations may be based on analysis of the purchases of other users who have purchased the same products and services. User browsing may also be monitored, so that recommendations may be based on products that the user has browsed, as well as those he or she has purchased.

The above-described technique for observing user behavior may lead to inaccurate results. Relatively few data points may be available, particularly when recommendations are based on user purchases. For example, a typical user may make four or five purchases annually from any particular online store, and may distribute his or her purchases among several stores, including online, conventional retail, and/or other outlets. The relatively small number of purchases tracked by any particular store may be insufficient to develop a reasonably accurate user profile in a relatively short period of time. Thus, recommendations in such systems are often inaccurate since they are based on insufficient information.

Furthermore, some purchases may be gifts, and may thus fail to accurately reflect personal preferences of the purchaser. In some cases, the purchaser may specify that an item is a gift (by requesting gift-wrapping, or a gift message for example), so that the item may be excluded from user behavior analysis; however in many cases the purchaser may not make the online merchant aware of the fact that the purchase is a gift, and there may be no way for the merchant to make this determination. Distortions and inaccuracies in the user profile may then result. In particular, when relatively few data points are available, each individual gift purchase may have a particularly powerful distorting effect on the user profile.

Finally, distortions may result from the fact that, once a purchase is made, the merchant may not be able to easily determine whether the purchaser was satisfied with the product. This is a particular problem in connection with products that are typically only purchased once, such as books, videos, and compact discs. A user may purchase a compact disc and listen to it only once, finding the music not to his liking. The user may purchase a second compact disc, by another artist, and enjoy it immensely, listening to it hundreds of times. The user's behavior with respect to the online merchant is the same for the two cases namely, a single purchase of a compact disc. The online merchant cannot determine, from the purchasing behavior, the musical tastes and preferences of the user, since the merchant is not aware of the post-purchase behavior of the user.

In addition to the above problems with data gathering for developing user profiles, there are additional limitations and shortcomings of conventional recommendation engines, with respect to the data analysis that is performed to generate recommendations. Conventionally, recommendations are made based on data analysis performed on the observed user behavior. Several types of data analysis are known in the art for developing recommendations based on observed behavior. One commonly used technique is to observe that people who buy a particular product X also tend to be more likely to buy a particular product Y. Thus, the system may suggest, to a user who is observed purchasing (or browsing) product X, that he or she may also be interested in product Y. The basis for the suggestion is an observed correlation between purchasers of product X and purchasers of product Y.

Such a data analysis technique often leads to inaccurate results, particularly when the observed purchase is a relatively rare product. Relationships among such products often tend to be overstated, since relatively few data points are available for both the purchased product and the suggested product. Thus, the significance of a particular co-occurrence (i.e. an observed purchase of two products by the same individual) is given undue weight, when in actuality the co-occurrence may merely be a coincidence and may not provide an accurate indication of a relationship between the two products. In addition, certain products, such as "best sellers," tend to appeal to virtually all consumers, so that co-occurrence is seen between a best seller and nearly every other product. Conventional data analysis techniques often fail to yield meaningful results, because of both the overstated significance of coincidental co-occurrence, and the overpowering influence of best sellers.

The following is an illustration of the deficiencies of conventional data analysis techniques in situations involving a rare product and/or best sellers. Analysis of the co-occurrence of events A and B (e.g. a purchase of product A and a purchase of product B) involves construction of the following matrix:

|    | A       | ~A       |        |
|----|---------|----------|--------|
| B  | k(AB)   | k(~AB)   | k(B)   |
| ~B | k(A~B)  | k(~A~B)  | k(~B)  |
|    | k(A)    | k(~A)    | k(*)   | where:

k(AB) is a count of the number of times A and B both occurred;

k(~AB) is a count of the number of times A did not occur and B occurred;

k(A~B) is a count of the number of times A occurred and B did not occur;

k(~A~B) is a count of the number of times neither A nor B occurred;

k(A) is a count of the total number of times A occurred;

k(~A) is a count of the total number of times A did not occur;

k(B) is a count of the total number of times B occurred;

k(~B) is a count of the total number of times B did not occur; and k(*) is a count of the total number of events.

If p(B|A)=p(B), where p(B|A) is the probability of B given that A has occurred, and p(B) is the probability of B, then events A and B are considered to be independent. It also follows that if p(A)p(B)=p(AB), where p(A) is the probability of A, p(B) is the probability of B, and p(AB) is the probability of both A and B occurring, then A and B are independent.

It is assumed that probabilities can be estimated from observed event occurrences using the maximum likelihood principle, so that $$\frac{k(AB)}{k(A)} \cong p(B|A); \text{ and}$$

$$\frac{k(B)}{k(*)} \cong p(B)$$

As discussed above, A and B are independent if p(B|A)=p(B). Accordingly, if $$\frac{p(B|A)}{p(B)} > 1,$$

A and B are appearing together more than expected for independent events. Substitution of the above equations yields the following test:

If $$\frac{k(AB)k(*)}{k(A)k(B)} > 1,$$

a co-occurrence relationship can be established.

The above-described technique is deficient, in that quantization effects tend to overpower meaningful results. Particularly where event counts are small, coincidences often translate into perfect correlations, yielding misleading results.

Pearson's Chi-Squared test improves on the above-described technique by introducing an estimate of significance. According to this technique, independence is assumed and a determination of how many k(AB) and k(A~B) would be expected. Expected k(AB) can be expressed as:

$$\hat{k}(AB) = \frac{k(A)k(B)}{k(*)}$$

If $\hat{k}(AB)$ and all similar estimates are greater than five, the distribution of the count of multinomially distributed events can be approximated using a normal distribution. Assuming a normal distribution, the difference between the observed k(AB) and the expected value can be determined and squared. The sum of the squared normal distribution is known to be $\chi^2$. Accordingly, the significance of the difference is then determined, and unexpected co-occurrence defined.

However, Pearson's Chi-Squared test yields misleading results when one of the events is relatively rare (such as when the expected count is less than 5). In such situations, the assumption of normal distribution tends to lead to an overstatement of the significance of the co-occurrence.

A second prior art data analysis technique for developing product recommendations employs archetypal customers in order to categorize users according to observed behavior. Such techniques are employed, for example, in LikeMinds 3.1 from Macromedia Corporation. A set of customers is selected and denoted the archetype set. Prospective purchasers and users are compared with the archetype set in order to determine which archetypes they most resemble. However, such systems may also lead to inaccurate results, since the set of archetypes is often insufficient to accurately describe individual real-world users. In many situations, archetypes are non-orthogonal to one another, and the archetype set thus provides a poor basis space for modeling users. The system may thus fail to provide a concise description of a user (if too many archetypes are needed to provide an accurate description), or the description may not be accurate (if too few archetypes are used).

In some variations, users may be presented with a list of archetypes and asked to select which archetype(s) they most resemble. Such an approach leads to similar disadvantages as described above with respect to questionnaires, and also may lead to inaccuracies as users have difficulty selecting a subset of archetypes that accurately reflects their own preferences. In such an approach, it rapidly becomes apparent that, no matter how many archetypes are available, the user cannot easily be defined as a sum of fixed archetypes.

The archetype approach also tends to yield recommendations that are dominated by a particular subgroup. Very popular items filter to the top of the list, since most archetypes are readers of bestsellers (as is most everyone; hence the definition of "bestseller"). This massive overlap of best sellers exacerbates the problem of non-orthogonality of the archetype set. If bestsellers are removed from the set of items, results may be inaccurate because coincidental co-occurrences then dominate, as described above. This problem may be even more prevalent when this approach is employed, since the non-orthogonality of the archetype set tends to increase the noise sensitivity of the system, so that coincidental matches (as described above) become even more significant, leading to increased levels of distortion and unsatisfactory results.

Caid et al., U.S. Pat. No. 5,619,709, for "System and method of context vector generation and retrieval" describes an approach that attempts to deal with this problem of non-orthogonality by explicitly constructing an orthogonal basis space with relatively low dimensionality. However, such reduced-dimensionality systems suffer from the limitation that distinctions between words tend to be lost when reducing the dimensionality of the system. The loss of such distinctions can improve recall in an information retrieval system, but leads to a decrease in precision. Precision, expressed as the fraction of high scoring results that are correct, is the most useful figure of merit for a recommendation system.

What is needed is a system and method of generating and providing recommendations to users that avoids the above-described limitations and disadvantages. What is further needed is a system and method of discovering relationships among items, that is not obtrusive to users and that leads to accurate recommendations based on user preferences. What is further needed is a recommendation engine that provides improved accuracy by reacting to user preferences that may change with time, and by collecting a larger number of data points so that more accurate profiles may be developed.

SUMMARY OF THE INVENTION

The present invention provides a recommendation engine and application capable of discovering relationships among items and recommending items without requiring undue effort on the part of the user. The recommendations provided by the present invention are based on user profiles that take into account actual preferences of users, without requiring users to complete questionnaires. Problems of non-orthogonality, sparsity of data points, overstatement of coincidence, dominance of best-sellers, and flaws in the data source, as described above, are avoided. Thus, the present invention facilitates generation of recommendations that are likely to be of interest to the user, and leads to improved marketing and ad targeting, along with greater credibility and utility of the recommendation system.

The present invention provides improved data analysis by avoiding inaccurate assumptions regarding distribution of user preferences. In particular, the present invention employs a binomial log likelihood ratio to provide improved analysis of data points describing user preferences, and to avoid inaccurate assumptions inherent in a normal distribution analysis. The invention thus provides improved recommendation generation, while avoiding the problems of overstatement of coincidences and dominance of bestsellers, described above.

Furthermore, in one embodiment, the present invention operates in the domain of music, making recommendations as to music tracks (such as songs), based on analysis of music tracks previously selected by the user for listening. The invention may operate, therefore, in connection with a personalized radio station for playing songs over the Internet, based on user selection of tracks and based on recommendations derived from previously selected tracks. Conventional techniques for programming radio stations may be applied and combined with the techniques of the present invention. Thus, a plurality of programming "slots" may be specified in a given time period, to be filled alternately by explicit user selections (or requests), and by recommendations generated by the present invention based on the user's preferences. As the user makes additional selections of music tracks, the system is able to accumulate more information as to the user's preferences, so that more accurate recommendations may be made.

Since, in the context of a personalized radio station, a user specifies music tracks that he or she is interested in hearing, a finer granularity of user preferences can be recorded. By contrast to online commerce environments such as purchases of books, compact discs, and the like, in which a typical user may make four or five purchases annually, the present invention offers the opportunity to observe the user making selections several times per hour. The present invention thus facilitates more rapid data collection regarding user preferences, and thus provides more accurate profile generation.

In addition, repeated requests for a particular track may be noted, with the number of requests tending to indicate the level of satisfaction or enjoyment with regard to the requested music track. If a user aborts a track soon after it has begun, that may be an indication that the user does not like the track. Conventional user profile generation techniques, based on user purchases, do not include such a mechanism for determining the degree of satisfaction of a user by observing the user's behavior, since a user does not tend to make repeated purchases of a particular item even if he or she enjoys the item. Thus, by contrast to conventional monitoring of online purchases, the present invention facilitates development of a user profile that indicates the degree to which various items are preferred. Negative, as well as positive, data points may be extracted, based on users aborting or repeating track playback, respectively. Finally, users' preferences are more accurately recorded, since the purchase of gifts for others ceases to be a factor in the context of an online radio station (a user does not listen to music "on behalf of" another person).

Based on recorded user preferences and data analysis as provided by the present invention, relationships among works are discovered, and recommendations may be generated.

Additional applications of discovered relationships may also be provided. In one application, results of text-based searches (such as for albums by a particular artist, for example) may be enhanced by the discovered relationships of the present invention. Thus, in an online commerce environment, a user may search for artist A and be presented with works by artist B as well, based on a relationship between artists A and B that is discovered by analysis of user listening behavior. Such an application illustrates the utility of the present invention in discovering relationships based on user listening, and applying the relationships to generate recommendations in online commerce.

In another application, the present invention may be employed in connection with conventional radio station programming techniques, to implement an improved personalized radio station. As is known in the art, conventional radio stations typically divide a programming block (such as a one-hour period) into a number of segments. Each segment is assigned a programming category, such as "power hit," "new release," "recurrent hit," and the like. For a particular programming block, music tracks are assigned to each of the segments based on the particular programming format of the radio station. Music scheduling software, such as Selector® by RCS Sound Software, applies heuristic rules for repetition limits and classes of songs, to automatically generate track lists for use by radio stations. The present invention may be combined with such existing radio station programming techniques, to populate the defined segments with music tracks that are likely to appeal to a particular listener. Additional rules may be applied in generating track lists, so as to limit undesired repetition and to comply with limiting legislation (such as the Digital Millennium Copyright Act) and other restrictions.

In another application, the discovered relationships of the present invention may be employed to improve targeting of advertising. Once relationships between music tracks and/or artists have been developed, users may be presented with ads that are most likely to be of interest to them. This provides another example of application of relationships discovered in one domain to content delivery in another domain, according to the present invention.

As can be seen from the above examples, the present invention may be applied to many different domains, and is not limited to application to the domain of personalized online radio stations. In addition, relationship discovery according to the techniques of the present invention is not limited to observation of music listening habits. Many of the techniques of the present invention may be applied to observation of user behavior in other domains, such as online or conventional purchases, viewing of web pages, viewing of television programs, movie ticket purchases, pay-per-view orders, and many others. In addition, the present invention may be applied to document-based systems, in order to detect relationships among documents based on co-occurrences of words and phrases therein.

BRIEF DESCRIPTION OF THE DRAWINGS

Figure 21C:
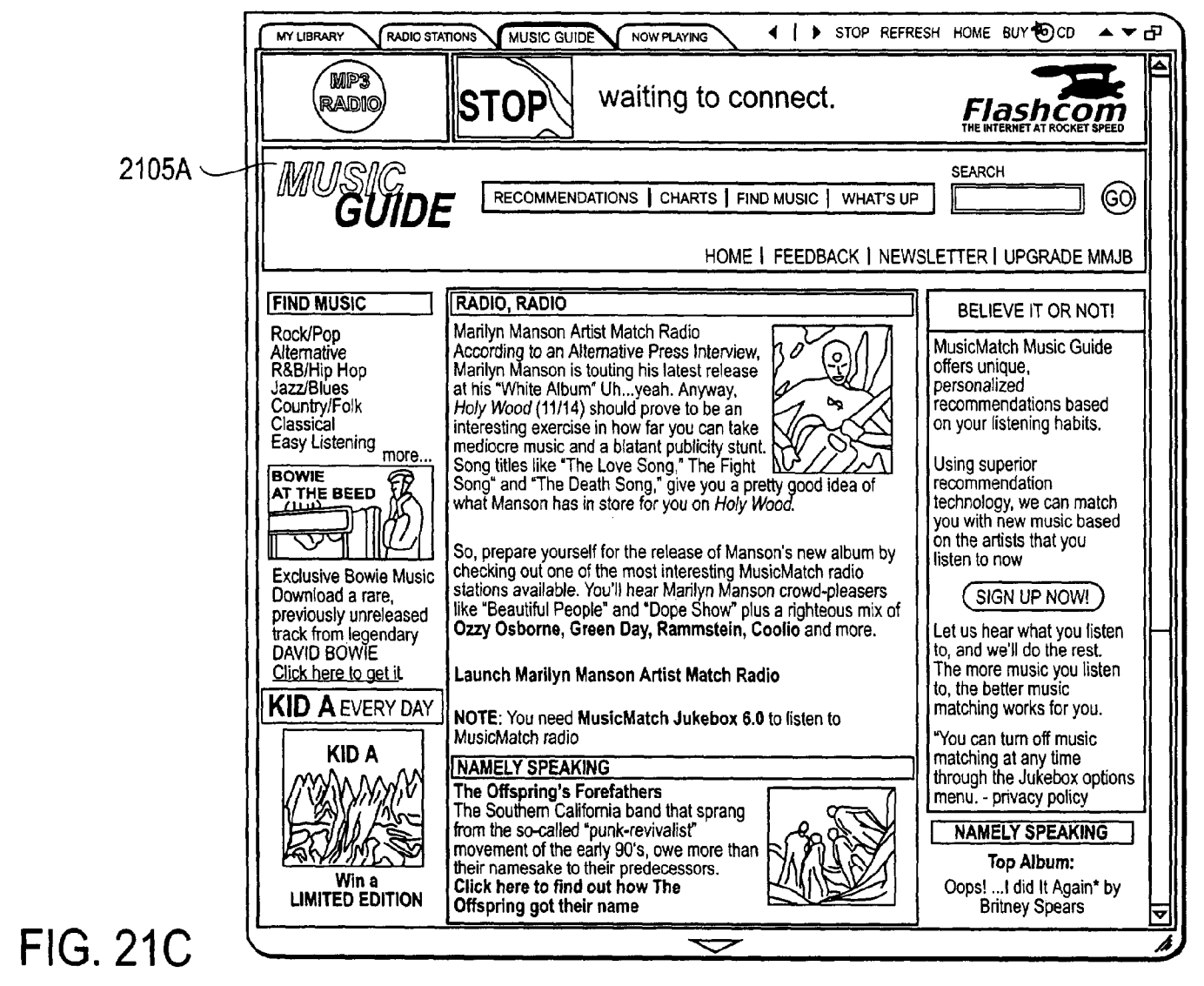

FIGS. 21A through 21F depict interface elements for View menu items of a sample user interface of a jukebox that implements the present invention.

FIGS. 22A, 22B, and 22C depict interface elements for Option menu items of a sample user interface of a jukebox that implements the present invention.

FIGS. 23A through 23G depict interface elements for Option menu items of a sample user interface of a jukebox that implements the present invention.

DETAILED DESCRIPTION OF THE PREFERRED EMBODIMENTS

The following description of preferred embodiments of the present invention is presented in the context of an online recommendation engine for music tracks, such as may be implemented in an Internet-based jukebox or personalized radio station. One skilled in the art will recognize that the present invention may be implemented in many other domains and environments, both within the context of musical recommendations, and in other contexts. Accordingly, the following description, while intended to be illustrative of a particular implementation, is not intended to limit the scope of the present invention or its applicability to other domains and environments. Rather, the scope of the present invention is limited and defined solely by the claims.

Architecture

Figure 16:
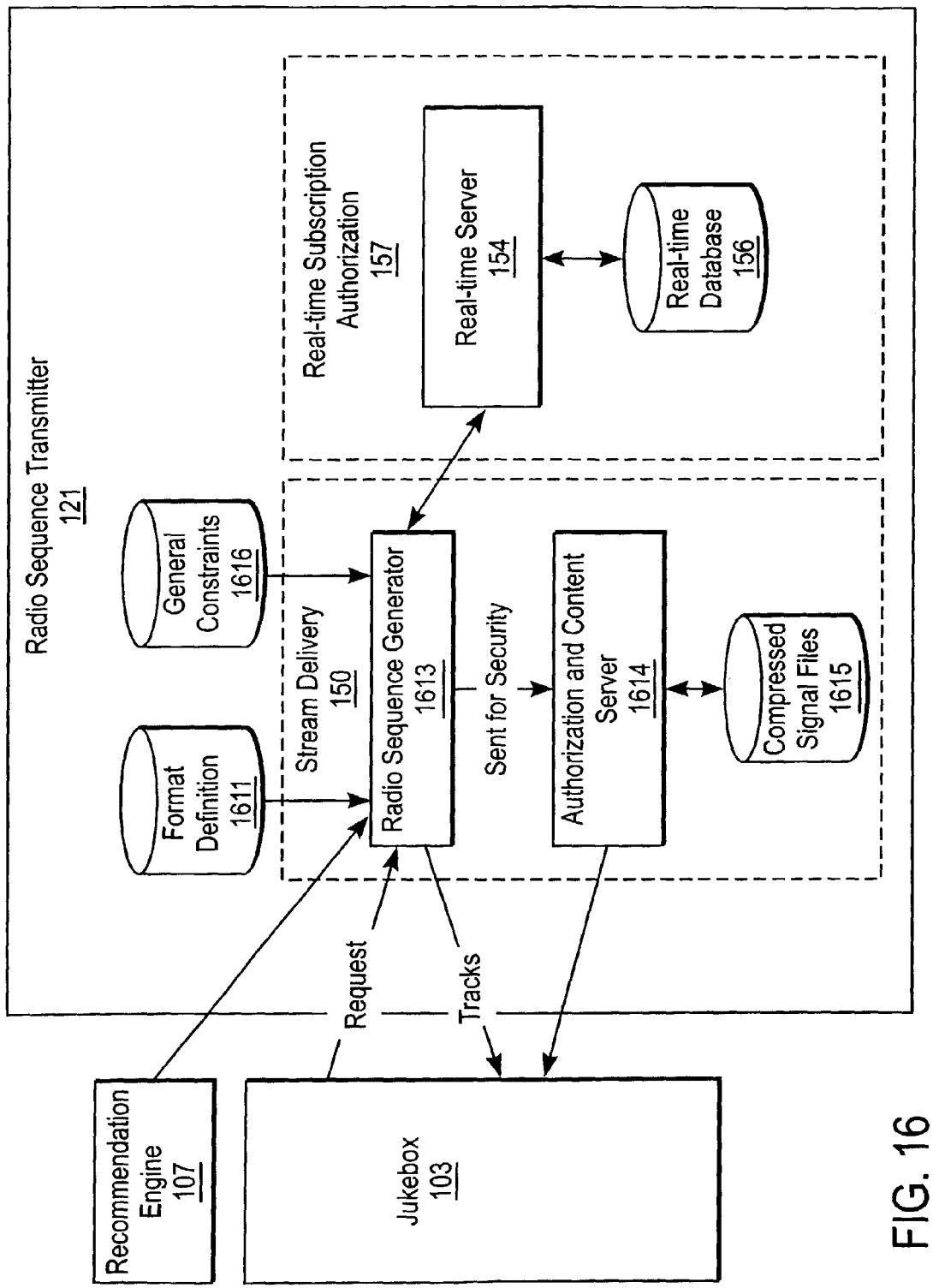
FIG. 16 is a block diagram of a conceptual architecture for one embodiment of the present invention.

Referring now to FIG. 16, there is shown a conceptual architecture of one embodiment of the present invention. In the architecture of FIG. 16, the invention is implemented in connection with a web-based "jukebox" 103, or personalized radio station, which accepts a user's selections of music tracks and makes additional recommendations as to music tracks the user is likely to enjoy. The user is able to search for particular tracks and/or artists, and to control the playback of selected tracks. The system monitors the user's behavior with regard to searching, listening, and playback control, and generates and analyzes logs of such behavior in order to refine recommendations. Advertising, offers, and other information may be selected and presented to the user based on observations of user behavior and analysis as to which material may be of interest to the user.

Stream delivery system 150 interacts with jukebox 103 to specify a sequence of audio files to deliver to jukebox 103. Jukebox 103 transmits requests to stream delivery system 150, and stream delivery system 150 delivers the audio files, as tracks, to jukebox 103. Stream delivery system 150 also communicates with real-time subscription authorization module 157, which includes real-time server 154 and database 156 that keep track of which user accounts are active and enforces global business rules about which accounts can listen to the radio at a given time. Within stream delivery system 150, there are a number of distinct software entities. Radio sequence generator 1613 receives requests from jukebox 103, receives-format definitions 1611 and general constraints 1616, and receives recommendations from recommendation engine 107, to generate track selections to be transmitted to jukebox 103. The track selections generated by radio sequence generator 1613 specify which files to play according to estimated listener preferences as well as pre-determined station formats. Authorization and content server 1614 keeps a record of the files that are selected by radio sequence generator 1613; server 1614 is consulted by radio sequence generator 1613 when files are requested. If generator 1613 does not provide the necessary security information, server 1614 flags this anomaly and declines to provide the data.

Compressed signal files 1615 contain descriptions of music tracks, and in one embodiment contains digitized representations of the music tracks themselves. Compressed signal files 1615 are stored, for example, using conventional database storage means or in a conventional file system, and in one embodiment include several fields providing descriptive information regarding music tracks, such as title, album, artist, type of music, track length, year, record label, and the like.

Stream delivery system 150, real-time subscription authorization module 157, format definitions 1611, and general constraints 1616 are collectively designated as the radio sequence transmitter 121 of the present invention.

Figure 1A:
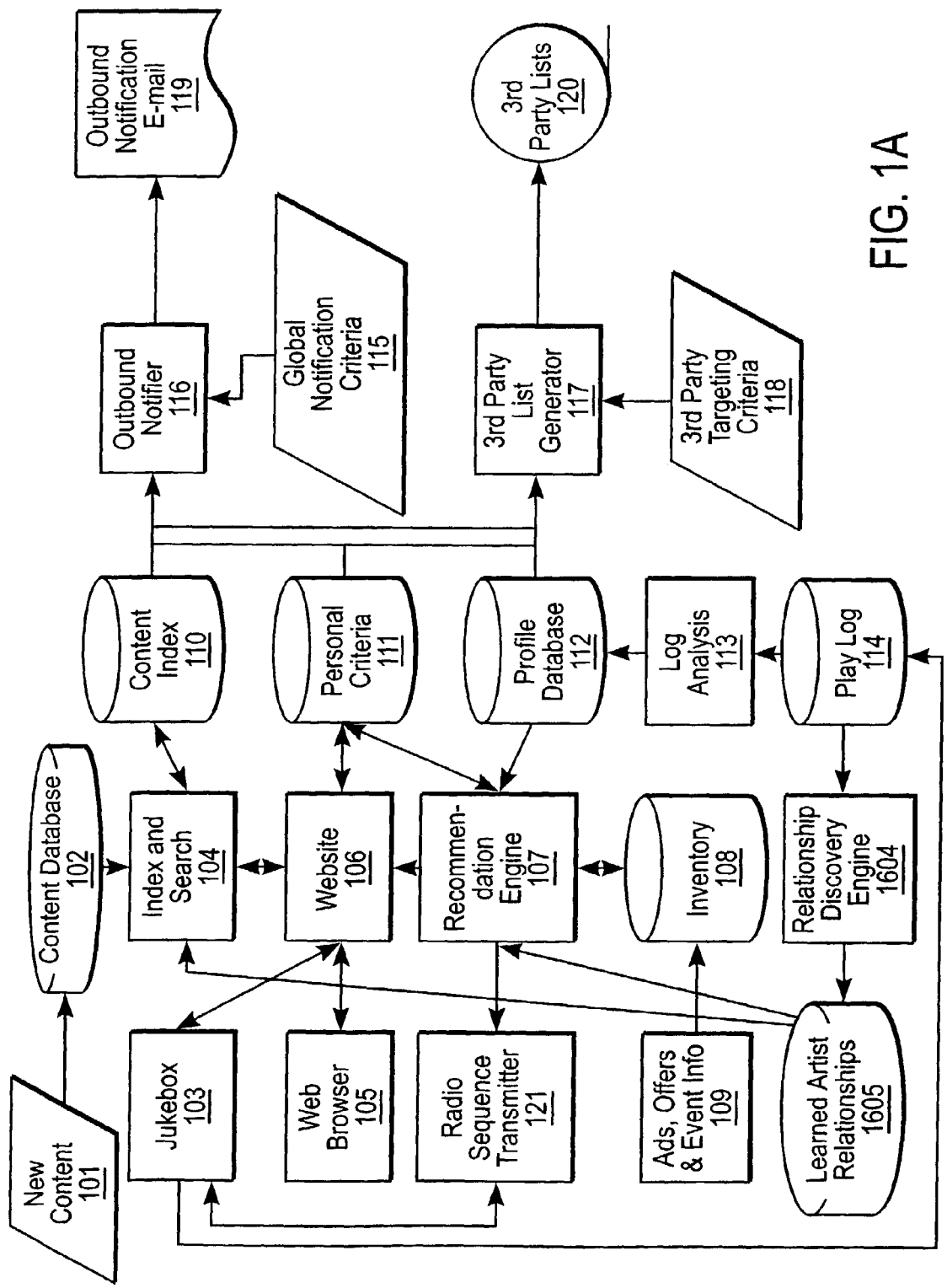
FIG. 1A is a block diagram of a functional architecture for one embodiment of the present invention.

Referring now to FIG. 1A, there is shown a block diagram of a functional architecture for one embodiment of the present invention. Content index 110 provides a concise index of content stored in database 102, and is generated by conventional index generation means, to enable more efficient searching and updating of database 102.

In one embodiment, relationship discovery engine 1604 uses a transient (non-persistent) TCL associative array, or hash table, (not shown) as is known in the art. The array includes a number of logical tables segmented by short prefixes on the keys. Track names are stored, for example, as lowercase strings, trackIDs as 32-bit integers. One example of a format for the array is as follows:

| Key | Prefix | Mapping |
| --- | --- | --- |
| W-track | W- | trackID for this string track |
| U-trackID | U- | track name for this trackID |
| C-trackID | C- | Number of occurrences of this trackID in the corpus |
| IDF-trackID | IDF- | Inverse Document Frequency (IDF) weighting for this trackID |
| TOTAL | | total number of tracks seen including duplicates |
| TRACKS | | total number of unique tracks |

Index and search module 104 facilitates functionality for accepting user queries and searching database 102 for particular music tracks. In one embodiment, the user enters queries by accessing web site 106, which provides an interactive user interface for accessing the functions of the present invention. Web site 106 provides the main point of contact with users. A user interacts with web site 106 over a network, using a conventional web browser 105 (such as Microsoft Internet Explorer), running on a client computer. Module 104 accesses database 102 and index 110 in response to user queries. In addition, module 104 receives recommendations from recommendation engine 107, via web site 106. In one embodiment, module 104 also receives information from learned artist relationships 1605. Results are returned to the user via web site 106. In one embodiment, index and search module 104 also dynamically updates content index 110 in order to provide improved efficiency for future searches. Such indexing techniques are well known in the art.

Index and search module 104 may provide fuzzy search capability to improve robustness and increase user satisfaction. Such capability detects imperfect matches between entered query terms and indexed content, so as to account for spelling errors or slightly incorrect titles or artist names in the entered query terms. Search capability includes, for example, searches for albums by artist, tracks by artist, text searches of lyrics, and the like. As described below, search results may be augmented by including secondary results that are similar to or related to the primary results, according to the relationship discovery techniques of the present invention. Thus, when a user searches for tracks by a particular artist, the invention may also present tracks by other artists that are musically related to the searched for artist. In one embodiment, module 104 presents a series of "browse pages", viewable via web site 106, for browsing through lists of related music tracks and artists. The user may follow links for particular tracks and artists, to either play the tracks, or continue browsing for additional related tracks. These related items are provided by recommendation engine 107.

In one embodiment, relationship discovery engine 1604 performs the following operations in developing and maintaining learned artist relationships 1605:
- Add play logs
- Calculate fixed parameters after indexing
- Prune the index of tracks occurring in fewer than a threshold number of play logs
- Read the index from a file
- Write the index to a file
- Find the number of occurrences of a track in the corpus
- Find the total number of tracks seen in the corpus
- Find the number of unique tracks seen in the corpus
- Find the set of play logs a track occurs in
- Find the number of occurrences of a track in a play log
- Find the tracks that occur in a play log In one embodiment, the above operations are performed by creating and using a TCL associative array as described above in connection with the memory structures in relationship discovery engine 1604.

In addition, web site 106 offers the capability for suggesting tracks and artists that may interest the user, based on personal criteria 111, profiles 112, of track-level discovered relationships based on observed user listening behavior determined by log analysis 113 of play logs 114, as described in more detail below.

Personal criteria 111 is a database that stores demographic, contact, and other descriptive information concerning individual users. Personal criteria 111 may also include expressed preferences of particular artists, genres, and the like, which may be collected from the user by online surveys. The musical suggestions provided by web site 106 may be based in part on analysis of personal criteria 111, based on observations that certain types of music tend to appeal to users associated with certain profiles or demographic categories.

Play log 114 is a database that monitors and stores information describing user behavior. Specifically, the user's interaction with jukebox 103, including track selection, repeats, aborts and skips, and the like, are recorded and stored in play log 114. Log analysis module 113 analyzes play log 114 in order to generate a profile of the user, which is stored in profile database 112. Profile database 112 contains user-level profiles that encode personal listening behavior of particular users. Log analysis module 113 periodically updates profile database 112 as new information becomes available, so as to refine the user profile over time.

In one embodiment, play log database 114 contains tables for storing forward and inverted indexes for play logs (play logs to tracks and tracks to play logs).

Tables in play log database 114 are implemented, for example, as TCL associative arrays (hash tables) as are known in the art. Play log database 114 includes a number of logical tables segmented by short prefixes on the keys. In one embodiment, index tables in database 114 and in other databases and tables of the present invention use lists of track, album, or artist identifiers associated with a play log.

Recommendation engine 107 provides suggestions for tracks and artists that are likely to appeal to a particular user. Suggestions provided by engine 107 are presented via web site 106 in the form of web pages, or via jukebox 103, or by some other output means. Recommendation engine 107 takes as input the user profile from profile database 112, as well as personal criteria database 111 containing demographic and other information describing the user. Thus, engine 107 uses a combination of explicit preferences and observed behavior to provide personalized music recommendations at any desired level, including for example tracks, artists, albums, genres, and the like. Details of the operation of recommendation engine 107 are provided below.

In one embodiment, the invention provides some music tracks for free, while others are only available upon receipt of payment. Payment may be collected via credit card or other means, as is known in the art. Suggestions provided by recommendation engine 107 and displayed via web site 106 may include both free and "for sale" music tracks. In addition, the user is able to preview tracks before deciding whether to purchase them. In one embodiment, suggestions made by recommendation engine 107 are augmented by additional information such as special offers or paid advertisements 109. Inventory 108 is a database of active advertisements, offers, promotions, and events that may be relevant to users that fit particular demographic profiles and/or expressed preferences.

Selected tracks are played via jukebox 103, which is implemented in one embodiment as a standalone application, or as a plug-in or bundled feature in browser 105. Jukebox 103 receives digitized representations of music tracks and plays the tracks over a speaker or headphones at the user's computer. In one embodiment, jukebox 103 can download and save music tracks in a compressed format, such as MP3, for playback on the user's computer or on a portable digital music listening device. A sample user interface for a jukebox application is described below in connection with FIG. 12.

Outbound notifier module 116 generates e-mail 119 or other communication that is sent to users in order to announce availability of new tracks or other items, events, or promotions that may be of interest. For example, if a user has expressed interest in a particular artist, and that artist releases a new album or is touring the user's area, an e-mail 119 may be sent to the user. Notification criteria 115 are defined and provided to notifier module 116, in order to specify under what conditions such e-mail 119 should be generated and sent. User profile 112, based on log analysis, as well as personal criteria 111, and data from content index 110, may be used as input to notifier module 116 in determining the content of e-mails 119. In addition, third-party data 120 (such as touring information for artists), may be processed by a list generator 117 and filtered by targeting criteria 118 to be provided as further output to notifier module 116. In this manner, generated e-mails 119 are likely to be of value and interest to particular users. For example, tour information for an artist, as provided by a third party, may be sent to users whose preferences (whether observed or stated) indicate that the user would be interested in hearing about that artist.

In one embodiment, profile database 112 is augmented and enhanced by data from user feedback. When users listen to music tracks, they may be offered the opportunity to provide feedback as to whether they enjoyed the tracks, and as to their opinions on other tracks and artists. Such feedback is processed and stored in profile database 112 and may be used as a basis for future recommendations provided by recommendation engine 107. In addition, such feedback may be used to generate and/or refine discovered relationships among artists and tracks.

One advantage of the present invention is that it provides recommendations that are responsive to particular tastes and preferences of individuals, so as to enable implementation of a personalized radio station that presents music tracks likely to be enjoyed by the individual user. As described below, the invention discovers relationships among artists and tracks in order to find musical selections that the user is likely to enjoy, based on observed behavior and profile information describing the user. These relationships can further be-employed to serve as a basis for delivery of advertising, improved searches, customized promotions and offers, and the like.

The present invention develops detailed behavior profiles based on observed user listening behavior. User track selections, made via jukebox 103, are monitored, along with user operations such as repeating, skipping, or scanning through tracks. Behavioral data is provided as input to a relationship discovery engine that operates as described herein. Relationship discovery takes place based on statistical analysis of track-to-track co-occurrences in observed user behavior. Recommendation engine 107 uses discovered relationships to generate suggestions of additional artists and tracks. User profiles, as stored in profile database 112, contain descriptions of analyzed play logs, as well as additional track suggestions related to the tracks the user has demonstrated he or she likes. Profiles can be modified, enhanced, or filtered, to include second-or third-level related artists or track, or to include only tracks the user does not already own. A randomization component may also be included in the development of profiles.

The architecture shown in FIGS. 1A and 16 may be used, for example, for implementing a personalized radio station that takes into account learned relationships among artists and/or tracks. Using the architecture of FIGS. 1A and 16, the system of the present invention learns relevant relationships, and populates a learned relationships database 1605 with the results. In one embodiment, the system acquires information from a deployed population of jukeboxes 103.

Referring again to FIGS. 1A and 16, learned artist relationships 1605, along with user profiles describing characteristics of users, are provided to recommendation engine 107, which operates as discussed above and transmits recommendations to radio sequence generator 1613, which is a component of radio sequence transmitter 121. Format definitions 1611, which includes descriptions of radio station formats (e.g. alternative rock, country/western, etc.), and other general constraints 1616 such as, for example, track schedules (e.g. play a top-40 hit at the top of each hour), are also provided to radio sequence generator 1613.

Recommendation engine 107 generates track preferences based on user information. Radio sequence generator 1613 uses track preferences, along with general constraints 1616 and format definitions 1611, to generate a sequence of tracks to be played. General constraints 1616 include particular rules and restrictions on the sequence of tracks, as may be required by law or as may be determined to be desirable for marketing or aesthetic purposes or for other reasons. Examples of constraints 1616 include: "no more than one song per hour from a particular album," or "do not play a fast song immediately after a slow song." Radio sequence generator 1613 may also incorporate a randomization element, if desired, and may be configurable by a website operator.

The track list is sent to jukebox 103 to be played to the user. A user activates jukebox 103 and selects music tracks for playback and/or purchase, via a user interface including controls and selectors. Authorization and content server 1614 checks that the appropriate security measures are in place (in order to prevent the user from "hacking" jukebox 103 to request unauthorized tracks from content server 1614), obtains the actual music tracks from files 1615, and provides them to jukebox 103 for output.

In one embodiment, the connections among the various elements of FIGS. 1A and 16 are implemented over the Internet, using known protocols such as HTTP and TCP/IP. Secure sockets layer (SSL) or other encryption techniques may be employed for added security.

In one embodiment, play logs representing the user's behavior are accumulated and stored in local storage at the user's computer. At periodic intervals, such as every one hundred songs, jukebox 103 transmits the locally stored play logs to centrally stored play log database 114. The transmission of play logs is accomplished using any known network transmission protocol, such as FTP, HTTP, and the like. As described previously, play log database 114 includes play log data from all active jukeboxes 103 in operation, including those in use by all active users. In an alternative embodiment, play log database 114 may contain a subset of such information, based on geographic delimiters, storage limitations, or other factors.

Relationship discovery engine 1604 mines database 114 to generate learned relationships, which are stored in database 1605. Discovery of relationships takes place according to techniques described in more detail below.

Sequence Construction

Figure 1B:
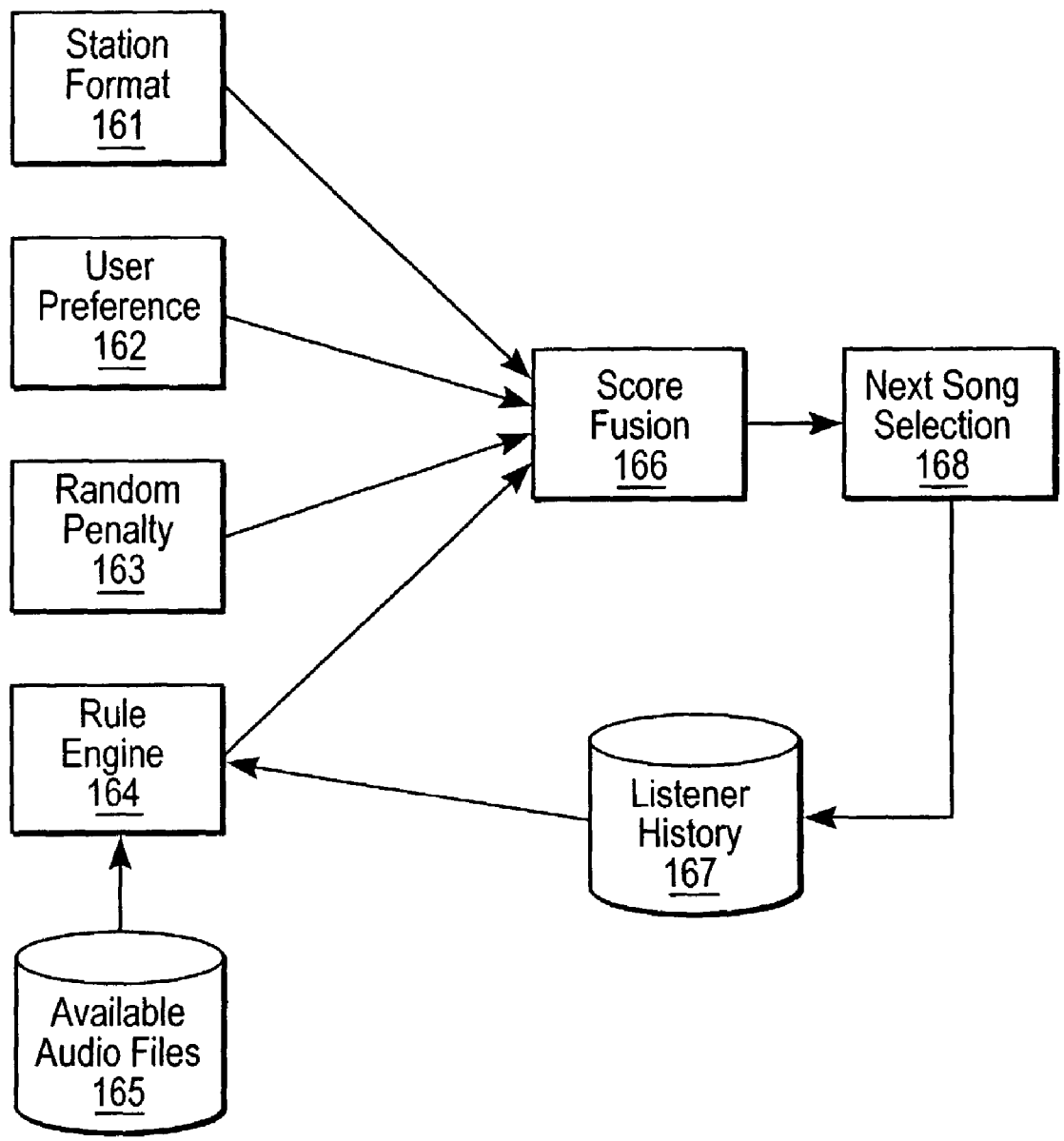
FIG. 1B is a block diagram of sequence construction flow according to one embodiment of the present invention.

Audio files are selected by fusing estimated user preferences, radio station format requirements and general sequence constraints. Referring now to FIG. 1B, there is shown a block diagram of sequence construction flow according to one embodiment of the present invention.

In this process, a human-designed "program clock" is used to specify a station format 161. Format 161 defines time slots that are filled sequentially. Each time slot has a class of songs that can be played in that time slot and each class has an associated set of audio files. The program clock specifies penalties for playing a song from a different class than the one specified. Station format 161 keeps track of the current time slot and outputs a list of all songs that can be played with associated (possibly zero) penalties.

Listening preferences 162 for the listener of the current station are estimated either by analyzing the music that the listener's jukebox has reported that the listener has listened to or by asking the user to enter the names of a few favorite artists. In any case, these preferences are reduced to a list of bonus scores for each possible song that can be played.

In order to decrease the predictability of the sequence of music played on a station, small random penalty scores 163 are associated with each song that can be played. This random penalty is small enough so that it does not outweigh the preference scores, but it is large enough to rearrange the order of the preferred songs.

Candidate songs are scored to find violations of sequence constraints by rule engine 164 that has access to a list of all potentially playable songs as audio files 165 and a listener history 167 containing the songs that the current listener has heard on this station. The history structure is designed to allow songs to be scored very quickly and is customized for the sequence rules being used. History structure 167 and penalties are discussed in more detail below.

Score fusion 166 adds up all of the scores (bonuses as positive numbers, penalties as negative) for all possible songs. This is done using a standard heap data structure to simplify finding the song with the highest resulting score. Next song selection 168 identifies the "best" song to play next. The selected song is then inserted into the listener history structure 167 so that it affects future song selections.

In one embodiment, the rules supported by the sequence constraint rule engine 164 are all of the form: "Add a penalty of x whenever attribute y occurs more than n times in the most recent (m plays) or (t minutes)."

In one embodiment, attributes include the artist, album name and track name for songs that have been played by the radio for a particular listener. Other candidate attributes include mood and tempo. This form of rule is sufficient to encode most of the desirable constraints for radio programming including both programmatic constraints as well as legal constraints, such as those arising from the requirements of statutory licenses under the Digital Millennium Copyright Act. One additional form of rule that is known to be useful is based on the combination of some attribute such as tempo from the last and current track. This additional rule form can be used to prevent huge variations in tempo or mood. One skilled in the art will recognize that many other rules and rule types could be employed.

In one embodiment, the data structure used to implement listener history 167 uses a number of cascaded queues with associated hash tables to maintain the necessary counts for attributes of all past events. There is one hash table of counts associated with each rule. This hash table counts the number of times each unique value of the attribute associated with that rule has been seen in the time period associated with the rule. The counts in the hash table are incremented when a song is entered into history structure 167 and decremented when a song is removed from the associated queue. More than one hash table may be associated with each queue.

Figure 1C:
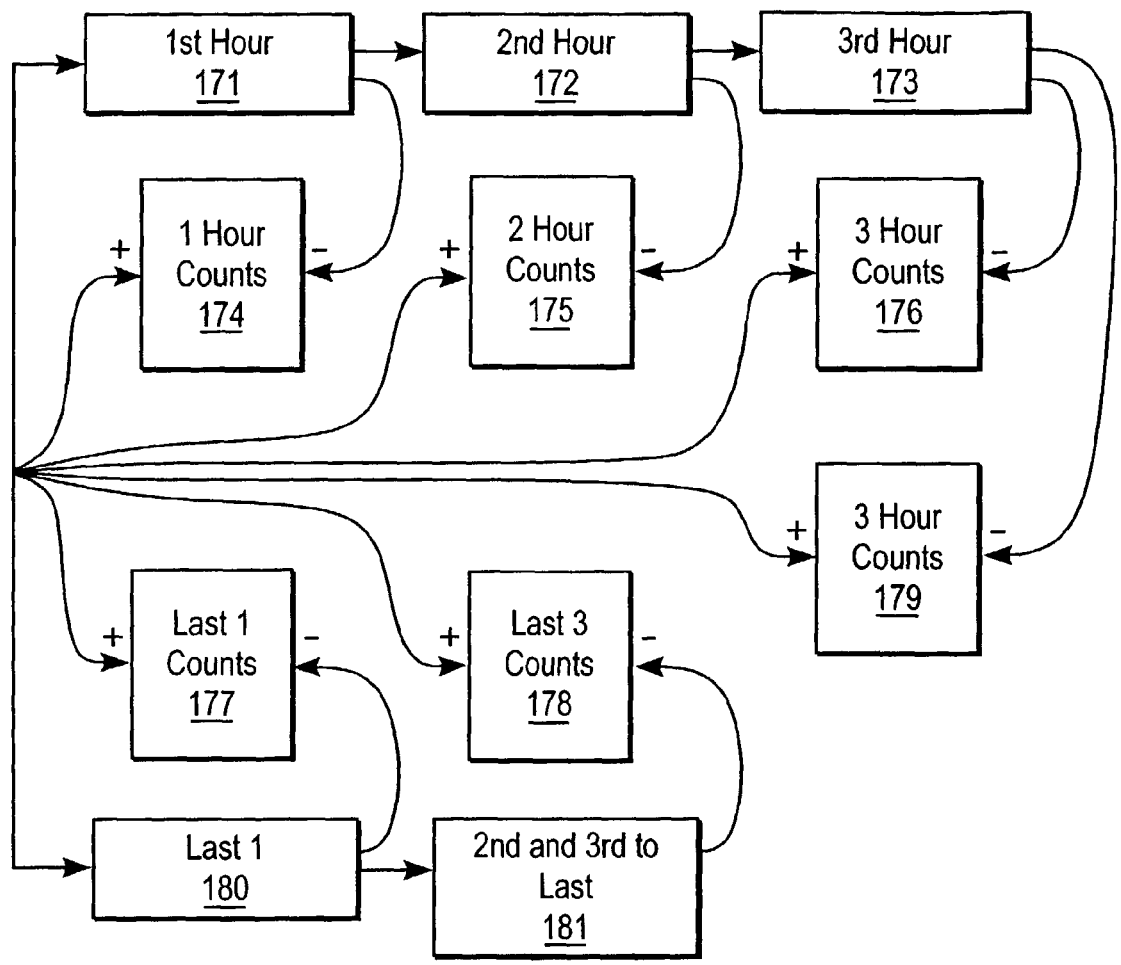
FIG. 1C is a block diagram of a sample history structure according to one embodiment of the present invention.

Referring now to FIG. 1C, there is shown a sample history structure in connection with the sequence construction flow of FIG. 1B. Two kinds of queues are maintained to retain the distinction between rules that are time based (last t hours) or ordinal (last m plays). The sample history structure includes hourly histories 171, 172, and 173; cumulative hourly counts 174, 175, 176, and 179; and ordinal queues 177, 178, 180, and 181.

There are two major operations on a history structure. These include the addition of a new event and testing a new event to determine if it would invoke any penalties. The addition of a new event involves the insertion of the event into the first of the time-based and ordinal queues and the incrementing of all tables according to the attributes values in the new event. Each queue must also be inspected to see if any events need to be moved to the next queue either due to the time or size limits on the starting queue. When an event is moved from one queue to another, all of the hash tables associated with the source queue are decremented. In one embodiment, any entries decremented to zero are deleted to save space.

When a new event is tested, each hash table is probed to determine if any of the attributes of the putative new event would cause violation of a limit. For each limit found to be exceeded, the corresponding penalty is assessed. No structure modifications are needed for testing a new event and the process can be completed very quickly. Measurements on a typical central processing unit (CPU) appropriate for this purpose indicate that only a few microseconds are required to test each new event.

The following table contains a typical set of sequence rules. This table contains eight rules, which would result in eight hash tables in the resulting history structure. Similarly, there are four distinct time limits (0.5, 2, 3 and 10 hours) and two distinct play sequence limits (3 and 4 plays). This means that there will be six queues in the history structure cascaded into two chains of length four and two.

| Attribute | Max Count | Period | Unit | Penalty |
|---|---|---|---|---|
| artist | 4 | 3 | hours | 2000 |
| album | 3 | 3 | hours | 2000 |
| album | 2 | 3 | plays | 2000 |
| artist | 3 | 4 | plays | 2000 |
| track | 1 | 2 | hours | 700 |
| track | 1 | 4 | hours | 100 |
| track | 1 | 10 | hours | 50 |
| artist | 1 | 30 | minutes | 90 |

Data Flow and Operation

Figure 2:
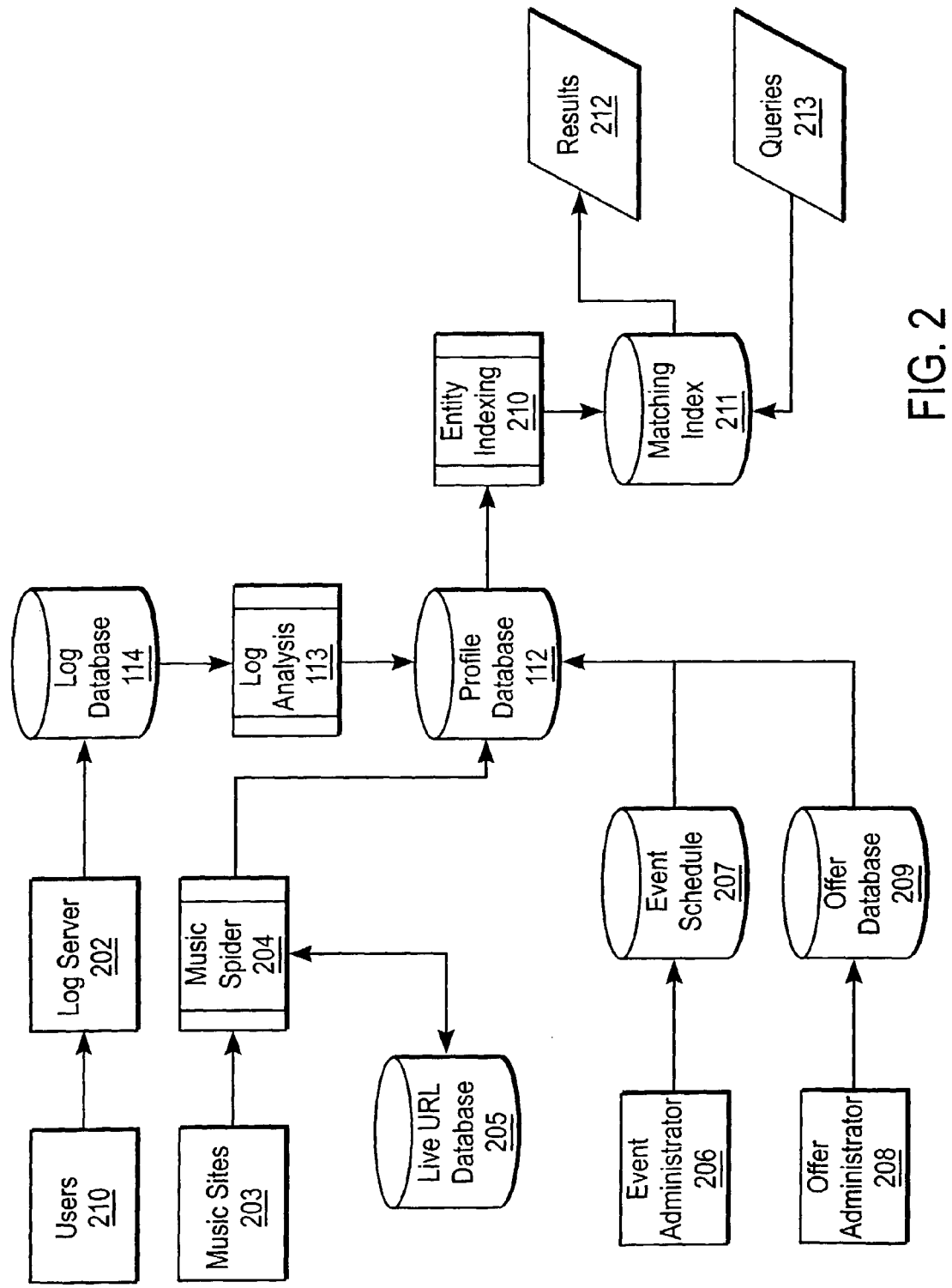
FIG. 2 is a data flow block diagram for one embodiment of the present invention.

Referring now to FIG. 2, there is shown a data flow block diagram for one embodiment of the present invention. Behavior of users 201 is monitored, including track selections, track repeating and skipping, and the like. Log server 202 collects user behavior information and stores the information in log database 114, as described above. Log analysis module 113 analyzes the stored behavior information to develop personal profiles, which are stored in profile database 112. Stored personal profiles represent abstracted musical preferences as developed through the relationship discovery techniques of the present invention.

In one embodiment, a database 205 of Uniform Resource Locators (URLs), or links, to music-related websites 203 is maintained. A music spider module 204 determines which of such links would be of interest to particular users, based on stored profiles in database 112, as well as on discovered relationships to artists and tracks that the user has indicated he or she likes. If desired, such links may be presented to individual users, either on website 106 or via e-mails 119 that may be periodically generated and transmitted. Such websites 203 may include, for example, e-commerce sites for the sale of compact discs or concert tickets, artist information sites, fan sites, and the like.

In one embodiment, additional databases are provided for storage of event information 207 and offers 209. Administrators 206 and 208 maintain these databases. Based on stored profiles in database 112, as well as on discovered relationships to artists and tracks that the user likes, selected items are extracted from databases 207 and 209, and sent to users. Thus, users can be kept informed as to upcoming concerts, events, offers, and the like, for artists that match their personal profiles.

Entity indexing module 210 processes profile information from database 112 and provides processed information to matching index 211. Matching index 211, which may be implemented in recommendation engine 207, develops relationships and matches among tracks and artists. Queries 213 (which may include any request for information, either from a user or from another module of the system) are provided as input, and results 212 are output, including related tracks and artists.

Figure 3:
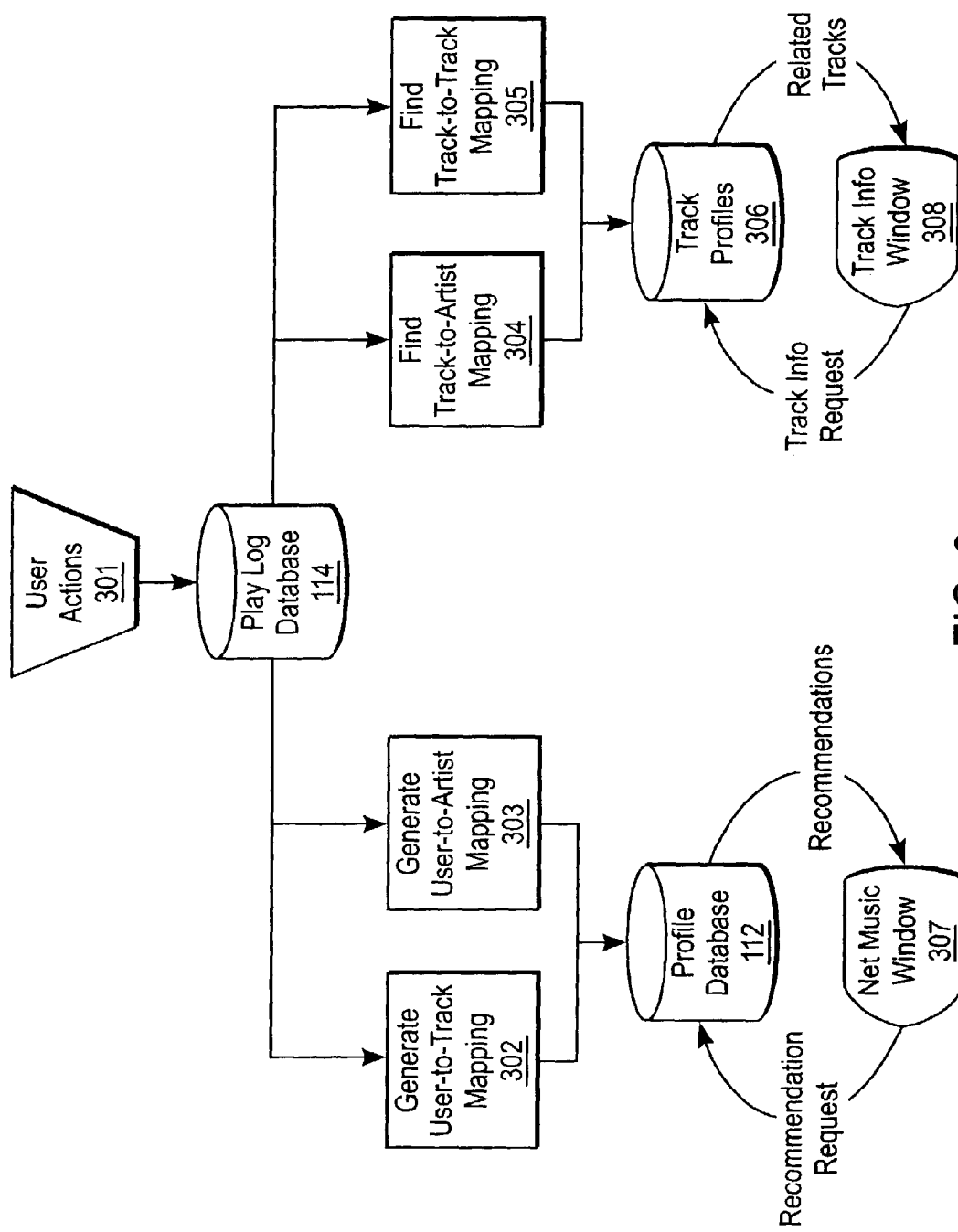
FIG. 3 is a block diagram showing an implementation of log and play history analysis according to one embodiment of the present invention.

Referring now to FIG. 3, there is shown a block diagram depicting an implementation of log and play history analysis according to one embodiment of the present invention. User actions 301, including behavior as described above, are monitored and provided to play log database 114. Four analysis modules 302-305 are provided, for performing various types of analysis on stored information from database 114. Each of modules 302-305 develops a different type of mapping, including user-to-track mapping 302, user-to-artist mapping 303, track-to-artist mapping 304, and track-to-track mapping 305. Thus, user-to-track mapping module 302 discovers relationships between particular users and the music tracks they tend to enjoy the most, while user-to-artist mapping module 303 discovers similar relationships between users and artists. Track-to-artist mapping module 304 and track-to-track mapping module 305 discover relationships based on co-occurrence of particular tracks and artists in significant numbers of user track lists. The specific techniques of such relationship discovery will be described in more detail below.

In one embodiment, discovered relationships from modules 302-305 are stored in profile database 112 (for describing user preferences) and in track profile database 306 (for describing track and artist relationships). In another embodiment, discovered relationships are stored in learned artist relationships 1605. These stored relationships are then used for generating recommendations, and for other applications as described herein. For example, a track information window 308 may be provided as part of the user interface for jukebox 103 (or in any other desired format). Window 308 accepts as input a particular track information request, and provides as output a list of one or more related tracks, based on track profile database 306. Suggestions from the output list may then be used for programming of a personalized radio station, or for other applications.

In addition, a Net Music window 307 may be provided, for offering suggestions or personalized programming based on user profiles. When a request for a recommendation is made, window 307 retrieves user profile information from database 112 and provides recommendations for tracks and/or artists based on user-to-track or user-to-artist mappings.

Figure 4:
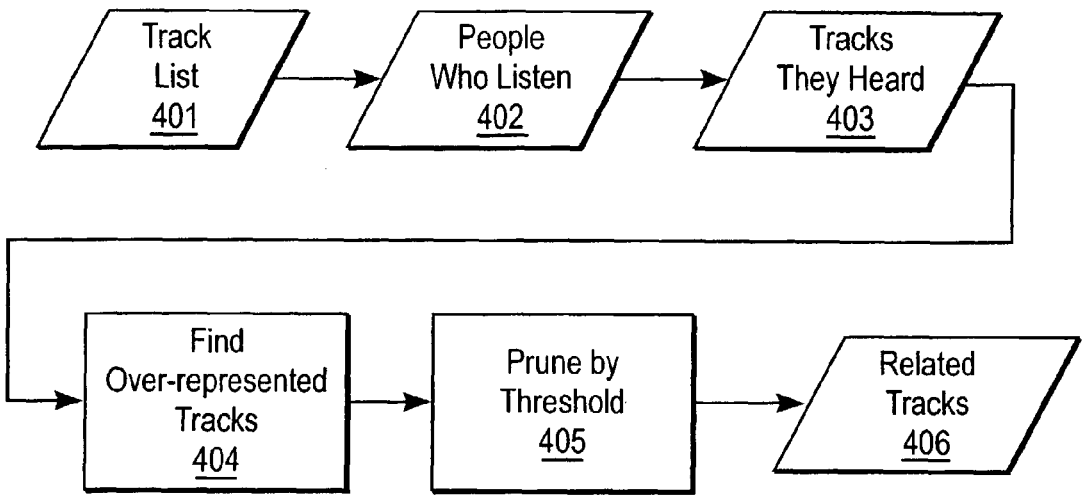
FIG. 4 is a block diagram showing a technique for identifying related music tracks according to one embodiment of the present invention.

Referring now to FIG. 4, there is shown a block diagram depicting a technique for identifying related music tracks according to one embodiment of the present invention. The technique illustrated in FIG. 4 may be used, for example, in implementing module 305 of FIG. 3. In one embodiment, the steps of FIG. 4 are performed off-line, and results are saved in track profile database 306 for retrieval when needed.

Track list 401 contains aggregated information describing music tracks that have been downloaded by users (i.e., music libraries), play logs, repeats, skips, and the like. For a particular track, track list 401 can be consulted to determine which individual users have listened to that track the most as a fraction of all of the music they listen to. The set of such users is indicated as "people who listen" 402 in FIG. 4. The system then determines which other tracks 403 tended to be popular among the users in list 402. Over-represented tracks 404 (i.e., best-sellers that appear on a high proportion of all user track lists) may be found 404 and pruned 405 according to a defined threshold, so that the resultant related tracks 406 captures music tracks that are distinctive and likely to be enjoyed by those who enjoy the tracks from track list 401. Related tracks 406 can then be stored in track profiles 306 for later reference in generating recommendations. In one embodiment, related tracks database 406 is implemented as part of learned artist relationships 1605.

The particular techniques for performing the track-to-track association of FIG. 4, as well as refinements thereto, are described below in connection with the operation of the recommendation engine.

Figure 5:
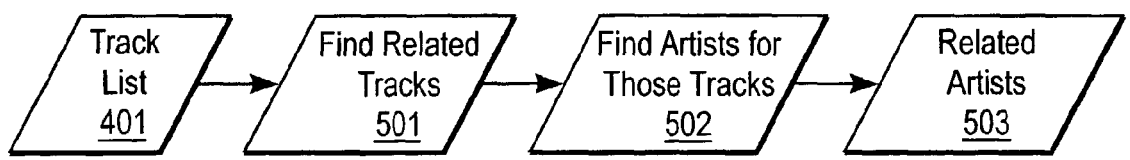
FIG. 5 is a block diagram showing a technique for identifying a mapping between music tracks and artists according to one embodiment of the present invention.

Referring now to FIG. 5, there is shown a block diagram depicting a technique for identifying a mapping between music tracks and artists according to one embodiment of the present invention. The technique illustrated in FIG. 5 may be used, for example, in implementing module 304 of FIG. 3. In one embodiment, the steps of FIG. 5 are performed off-line, and results are saved in track profile database 306 for retrieval when needed. Track list 401 contains aggregated information describing music tracks that have been downloaded by users (i.e., music libraries), play logs, repeats, skips, and the like. For a particular track, the technique of FIG. 4 is applied to find 501 related tracks 406. Artists for related tracks 406 are identified 502 and stored in related artists database 503 for later reference in generating recommendations. In one embodiment, related artists database 503 is implemented as part of learned artist relationships 1605.

Figure 6:
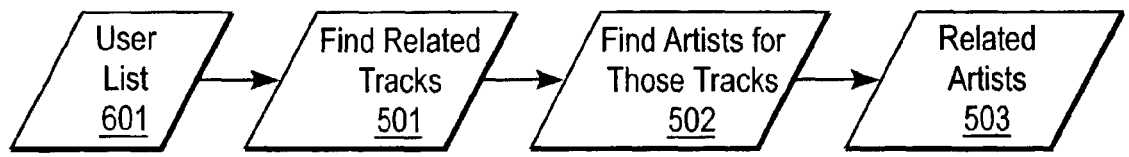
FIG. 6 is a block diagram showing a technique for identifying a mapping between users and artists according to one embodiment of the present invention.

Referring now to FIG. 6, there is shown a block diagram depicting a technique for identifying a mapping between users and artists according to one embodiment of the present invention. The technique illustrated in FIG. 6 may be used, for example, in implementing module 303 of FIG. 3. In one embodiment, the steps of FIG. 6 are performed off-line, and results are saved in user profile database 112 for retrieval when needed. User list 601 contains a list of users to be analyzed. For each user, tracks that the user has listened to are found 501. Artists for those tracks are identified 502 and stored in related artists database 503. In one embodiment, related artists database 503 is implemented as part of learned artist relationships 1605. As described below, artists may be scored with respect to particular users, in order to provide an indication of the degree of affinity between the user and the artist.

Figure 7:
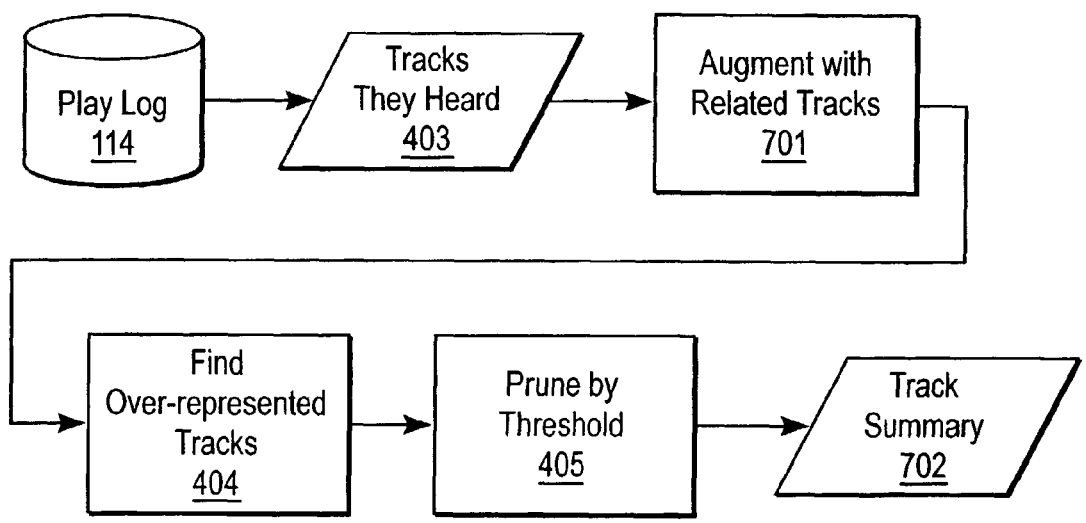
FIG. 7 is a block diagram showing a technique for identifying a mapping between users and music tracks according to one embodiment of the present invention.

Referring now to FIG. 7, there is shown a block diagram depicting a technique for identifying a mapping between users and music tracks according to one embodiment of the present invention. The technique of FIG. 7 is used for generating music track recommendations for users, based on discovered relationships between tracks the user has listened to and other tracks with which the user may not be familiar. The technique illustrated in FIG. 7 may be used, for example, in implementing module 302 of FIG. 3. In one embodiment, the steps of FIG. 7 are performed off-line, and results are saved in user profile database 112 for retrieval when needed. One skilled in the art will note that artist and album recommendations can be made by a process analogous to the described technique for making track recommendations. Artist recommendations can be converted to track or album recommendations by noting which tracks or albums are the most popular for a given artist.

For a particular user, track information 403 is extracted from play log database 114. A list of tracks is thus obtained. The track list is augmented 701 by including additional tracks based on discovered relationships, determined for example using the technique of FIG. 4. Significance scores are associated with the listed tracks. Over-represented tracks may be identified 404 using a statistical test or other means. Low-frequency tracks may be pruned 405 if they have lower than a predefined number of listeners or plays. The resulting list is stored in track summary database 702. In one embodiment, track summary database 702 is implemented as part of learned artist relationships 1605. Personalized programming, advertising, music track suggestions, and the like, may be generated based on the stored list.

In one embodiment, the techniques depicted in FIGS. 4, 5, 6, and 7 are implemented within relationship discovery engine 1604.

Figure 8A:
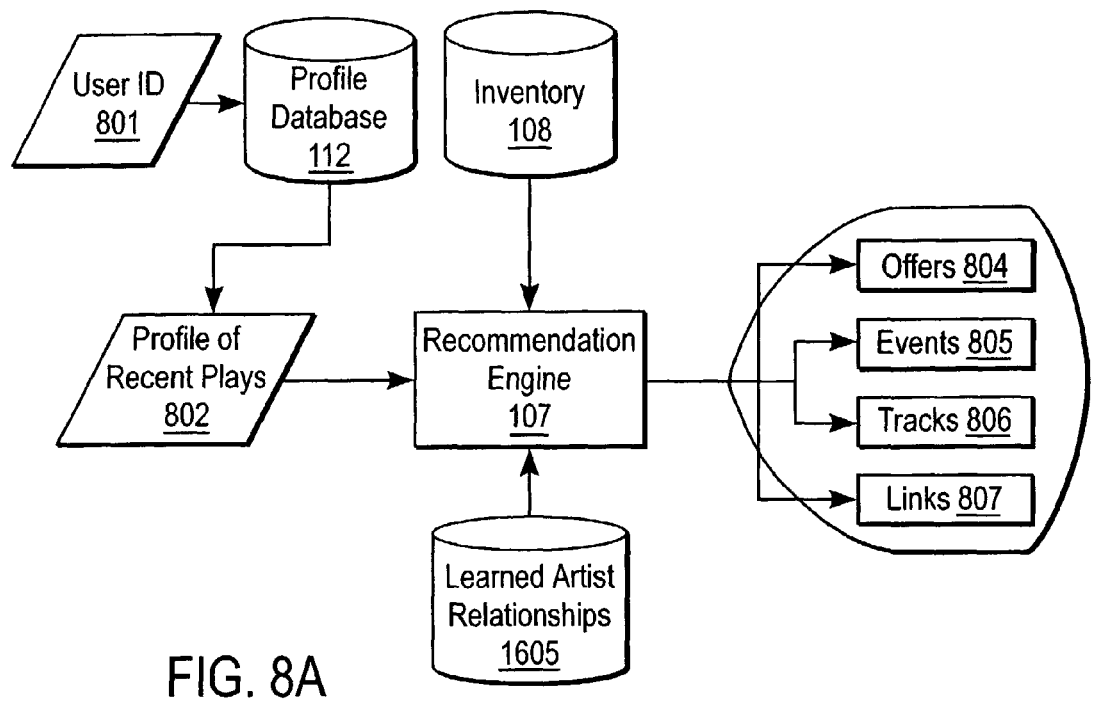
FIG. 8A is a block diagram showing a technique for generating recommendations according to one embodiment of the present invention.

Referring now to FIG. 8A, there is shown a block diagram depicting a technique for generating recommendations according to one embodiment of the present invention. The technique of FIG. 8A may be used, for example, for generating recommendations in real time in response to requests for programming for a personalized radio station. A user ID 801 is obtained, either by user entry of a unique identifier (and password, if desired), or by retrieval of a cookie on a user's machine, or by other means. User information is then retrieved from profile database 112, and a profile 802 of recent behavior (including song selections) is obtained. The profile is used as a query to recommendation engine 107. An available inventory 108 of tracks (as well as other related items) is provided as input to engine 107, along with learned artist relationships 1605. As described above, learned artist relationships 1605 is a database of discovered relationships among tracks and/or artists, based on the relationship discovery techniques described herein. Recommendation engine 107 then generates output containing recommended items, including offers 804, events 805, tracks 806, links 807, and the like.

Figure 8B:
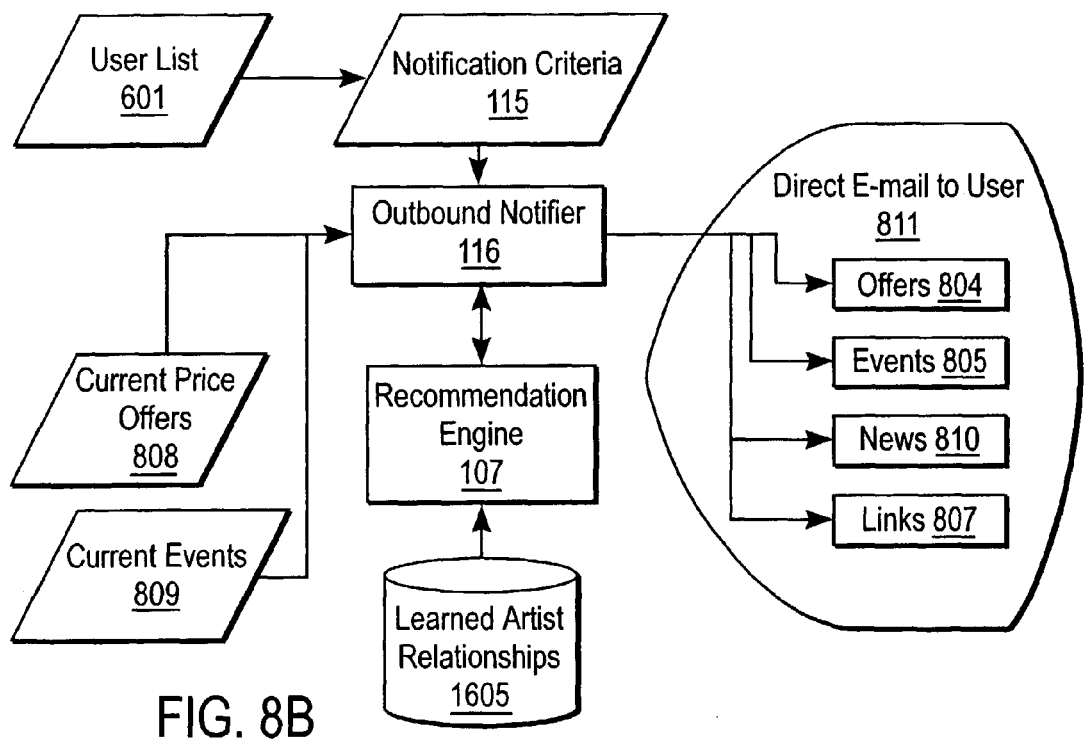
FIG. 8B is a block diagram showing a technique for generating notifications according to one embodiment of the present invention.

Referring now to FIG. 8B, there is shown a block diagram showing a technique for generating notifications according to one embodiment of the present invention. A list of users 601 is provided to notification criteria 115 for selecting which users should receive notifications. Criteria 115 may include, for example, user's stated preferences for receiving notifications, user's purchase threshold as may be determined from past purchasing behavior, length of time since most recent notification, physical location (e.g., for notification of location-specific events such as concerts), specified artists or related artists, and the like. Learned artist relationships 1605 are provided to recommendation engine 107, which determines which items to recommend to outbound notifier module 116. Current price offers 808, events 809, and the like are provided to outbound notifier module 116. Based on input from recommendation engine 107, and based on notification criteria 115, module 116 generates e-mails 811 and transmits them to selected users from user list 601. E-mails 811 may include, for example, descriptions of special offers 804, events 805, news 810, related links 807, and the like. In one embodiment, e-mails 811 may even include selected music tracks or links thereto.

Thus, using the technique illustrated in FIG. 8B, the present invention facilitates direct marketing via e-mail, which selectively targets users based on their implicit and explicit preferences, as processed through recommendation engine 107 to determine which items are likely to appeal to selected users.

Figure 9:
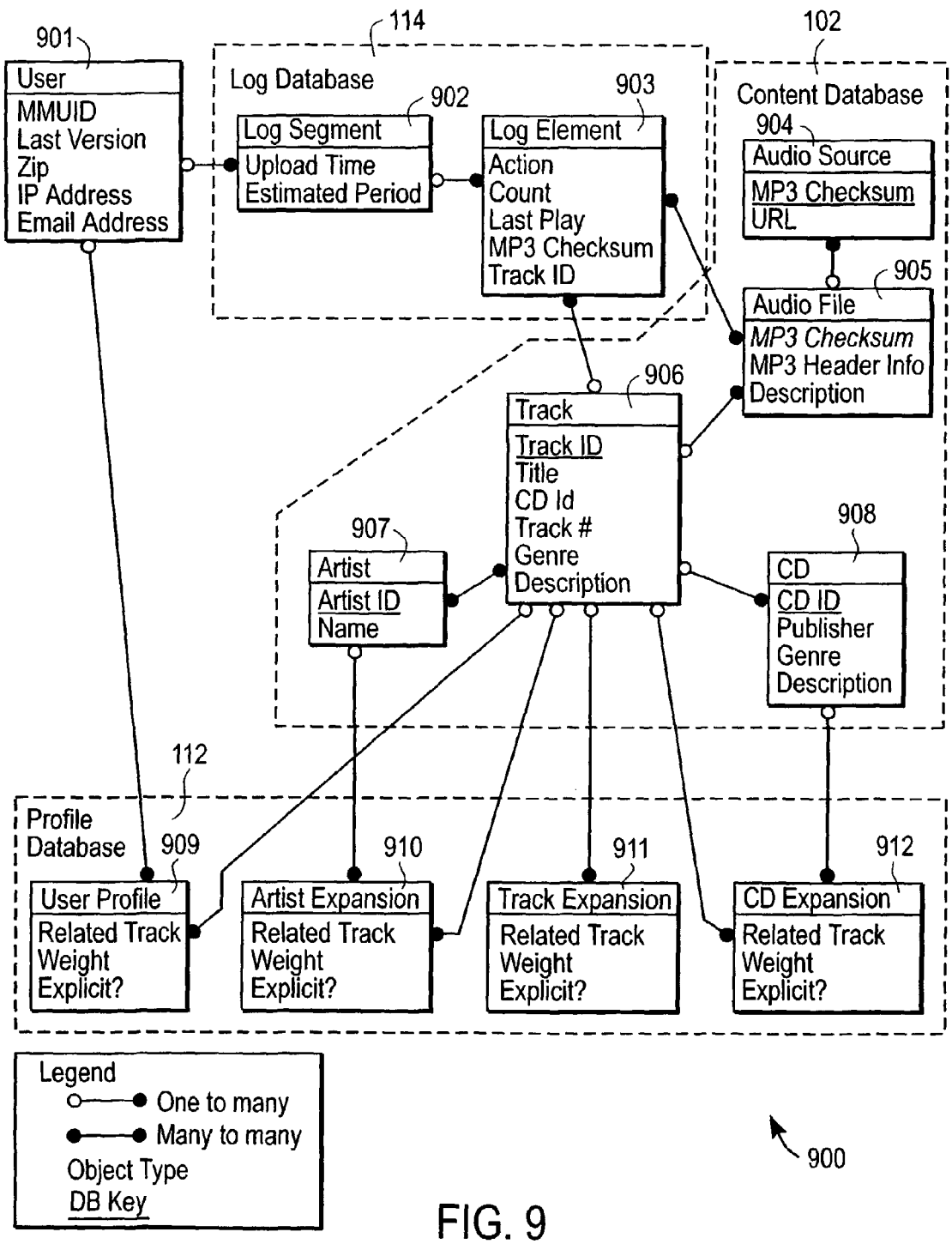
FIG. 9 is a block diagram of a data model according to one embodiment of the present invention.

Referring now to FIG. 9, there is shown a block diagram of a data model 900 according to one embodiment of the present invention. One skilled in the art will recognize that data model 900 is merely one example of an implementation of a data model for the present invention, and that many other organizational schemes and relationship among data files and records may be used without departing from the essential characteristics of the present invention. Accordingly, data model 900 of FIG. 9 is merely intended to be illustrative of a particular embodiment for implementing the invention.

Each component of data model 900 contains fields that are maintained for records in a particular data table. Relationships between components are indicated by connecting lines, with both one-to-many relationships and many-to-many relationships being shown. One skilled in the art will recognize that such tables and relationships can be implemented using any conventional relational database product, such as Oracle.

FIG. 9 shows the following tables:

User table 901 for tracking individual users: Fields include user ID (key field), last version downloaded, ZIP code, IP address, and e-mail address.

Log segment table 902 (in log database 114): In one embodiment, fields include upload time (indicating when the log segment was uploaded) and estimated period (indicating the time period covered by the log segment).

Log element table 903 (in log database 114) for tracking user actions with regard to music tracks: Fields include action, count, last play, checksum, and track ID.

Audio source table 904 (in content database 102) for specifying locations of audio files: Fields include checksum (key field) and URL.

Audio file table 905 (in content database 102) for providing descriptive information regarding audio files: Fields include checksum, header information, and description.

Track table 906 (in content database 102) for providing specifics of tracks: Fields include track ID (key field), title, album ID, track number, genre, and description.

Artist table 907 (in content database 102) for providing artist information: Fields include artist ID (key field) and name.

Album table 908 (in content database 102) for providing information about albums: Fields include album ID (key field), publisher, genre, and description.

User profile table 909 for storing tracks related to users: Fields may include related track, weight, and whether the relationship was explicitly provided by the user. In situations where user information cannot be extracted from observed behavior, such relationships may be provided explicitly by the user (e.g. by feedback forms).

Artist expansion table 910 for storing related artists: Fields include related artist, weight, and whether the relationship was explicitly provided by the user. This table is generated, for example, by relationship discovery engine 1604.

Track expansion table 911 for storing tracks related to other tracks: Fields include related track, weight, and whether the relationship was explicitly provided by the user. This table is generated, for example, by relationship discovery engine 1604.

Album expansion table 912 for storing key tracks on albums: Fields include related track, weight, and whether the relationship was explicitly provided by the user. This table is determined by finding tracks that are played more than the average of all tracks on an album.

In one embodiment, tables 909-912 are stored in profile database 112; in another embodiment, tables 909-912 are stored in learned artist relationships 1605.

In the present description of the invention, references to artists, tracks, and albums are interchangeable. Relationships among such entities can be determined and processed according to any desired degree of granularity and description.

Indexing

Figure 13:
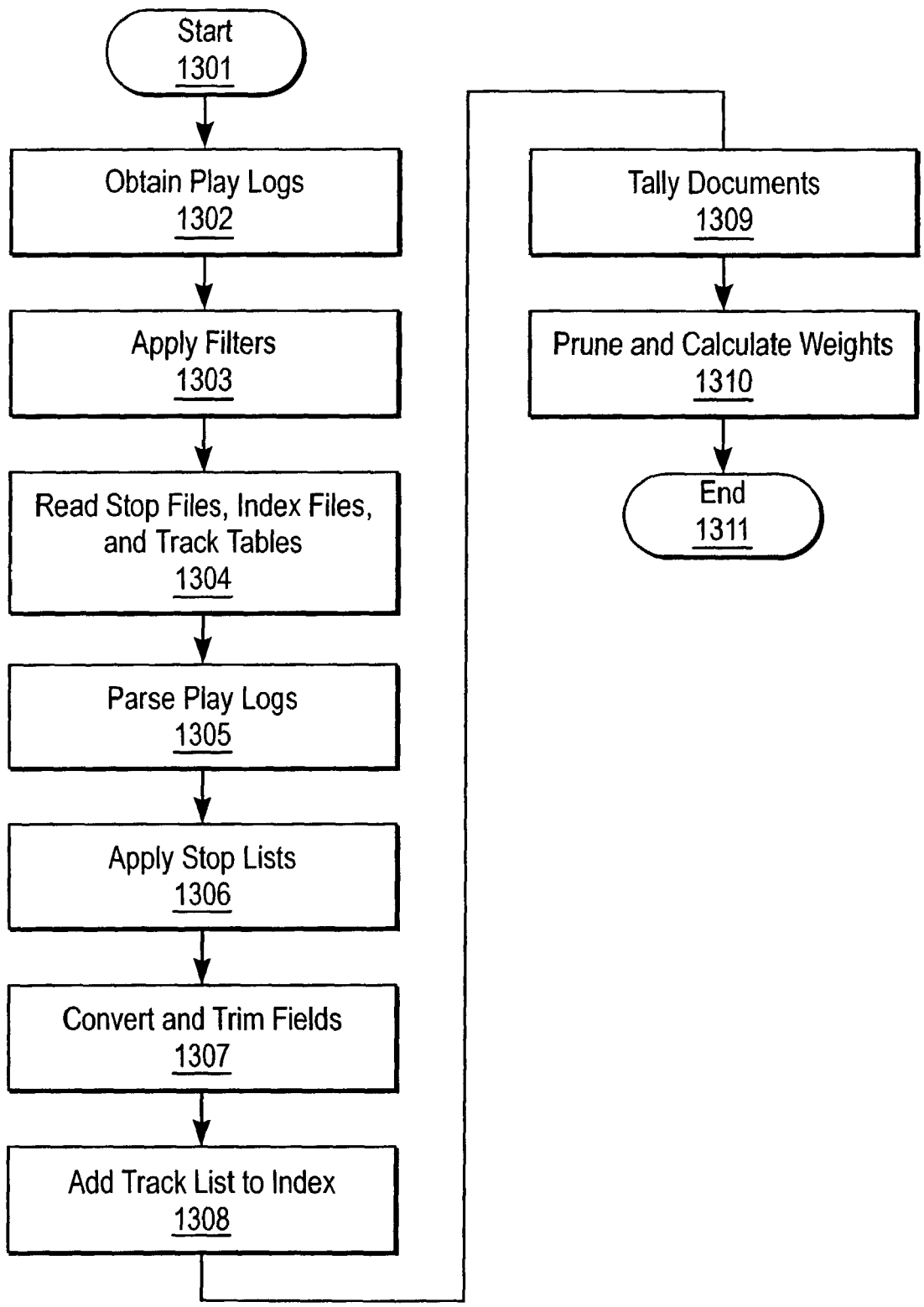
FIG. 13 is a flow diagram of a method of initializing and maintaining a content index.

Referring now to FIG. 13, there is shown a flow diagram of a method of initializing and maintaining an index in relationship discovery engine 1604. Initially, play logs from database 114 are obtained 1302. Content index 110 is generated and maintained based on log analysis 113. Play log files and music library files are associated with particular users based on cross-referencing of User IDs ("MMUIDs"). An exemplary file naming convention is {<MMUID>}{<SEQ_NO>}<VERSION>.

For example:
{00199CE0-8A7D-11D3-AF7C-00A0CC3C67B9}{0}4.30.0058MMD

A filtering program may also be applied 1303 to the list of files to be indexed, in order to:

Filter files not corresponding to a version on the version "go" list (so as to minimize the impact of users testing on development versions);

Filter files from MMUIDs on a pre-specified "kill" list; and

Filter all but the log with the largest sequence number for a particular user (to avoid using obsolete data).

The filtered list of files is read by an indexing script in index and search module 104, which reads each file and adds the play logs to content index 110. Several different indexes can be constructed by the indexing script, depending on whether artist, albums, or tracks are indexed.

The indexing subsystem is initialized using a command that instructs the subsystem to read initialization files from a directory. The subsystem reads 1304 stop files (artist.stop, album.stop, track.stop), index files (artist.index, album.index, track.index), and track tables (artist.tracks, album.tracks, track.tracks) from the specified location. The stop file contains a list of tracks that should be excluded from the index being initialized.

The indexing subsystem reads each play log as a file and parses it 1305 according to file type. For example, artist, album, track, and playcount fields are extracted for each record. Parser/extractors return data in the same format to the indexing subsystem.

The stop lists are applied 1306 to filter unwanted entries. Stop lists cascade, so that placing an artist on the artist stop list prevents all albums and tracks by that artist from indexing. For a finer grain of control, lower level stop lists may be used.

Fields are converted 1307 to all lowercase and trimmed of leading and trailing white space. Leading "the" is stripped from artists, "&" is converted to "and" and artists of the form "lastname, firstname" are transformed to "firstname lastname". Additional processing may also be performed, as appropriate.

The output of parsing and cleaning a play log is a list of tracks for each of the indexes (artist, album, and track).

The cleaned list of tracks for a play log is added 1308 to the appropriate index in relationship discovery engine 1604. Each track is added to the track table and its occurrence count tallied 1309. Adding a play log to the index includes the following steps:

Obtaining an integer trackID for each track;
  Obtaining an integer play log ID for the play log;
  Creating a list of track IDs and a parallel list of occurrence counts for this play log, and storing the lists in the play log index, keyed by the play log ID;
  For each trackID, adding the play log ID and the number of occurrences of the track in the play log to the two lists, listing all play log IDs that a track appears in, and a parallel list containing the occurrence count of the track in each play log; and
  Updating track and play log total counts.

After all logs have been added to the index, the indexing subsystem prunes 1310 indexes and calculates IDF and normalization weights. Pruning includes removing all tracks that occur in fewer than a threshold number of play logs. Parallel indexing operations can be performed for albums and artists in addition to tracks.

User Interface

Web site 106 of the present invention provides a front end for communicating recommendations and other results of the invention to users, and for accepting input from users and tracking their behavior. Particular displays and page designs may be implemented using known techniques of web development and database access, incorporating information and recommendations from the various databases of the present invention. In one embodiment, web site 106 includes pages directed toward the following functions and data:

Lists of new music (context-dependent, filtered and organized by recency of posting);
  Lists of "hot picks" (context-dependent, filtered and organized by popularity);
  Browsing functionality to allow the user to browse artists based on categories, discovered relationships, and other links;
  Recommendations tailored to the individual user;
  Search functionality;
  Links to featured partner sites; and
  Advertising (which may be targeted based on user preferences and discovered relationships).

One skilled in the art will recognize that many other functions, web pages, and interfaces may be provided in connection with the present invention.

Figure 10A:
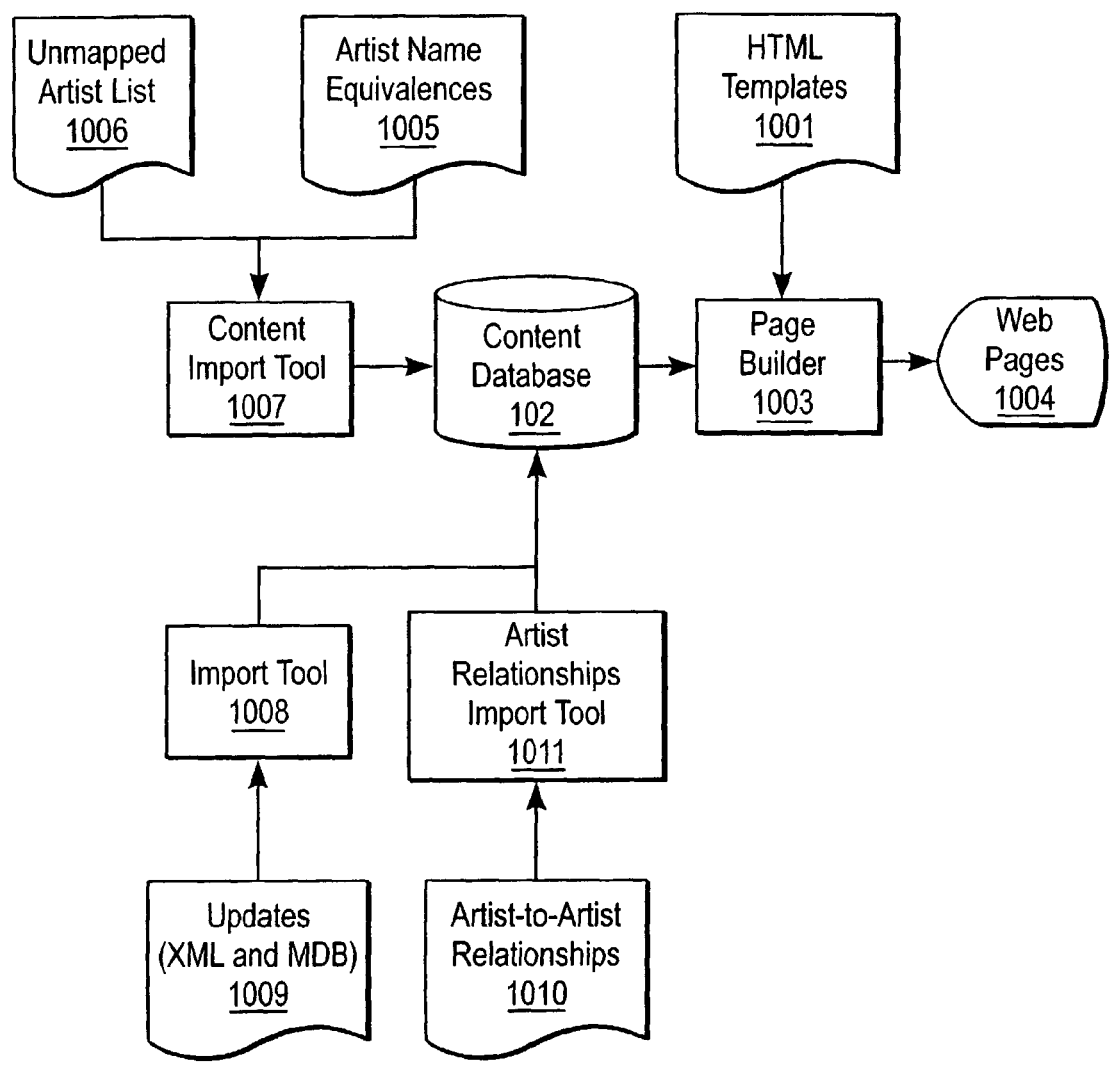
FIG. 10A is a block diagram showing data flow for a browse function according to one embodiment of the present invention.

Referring now to FIG. 10A, there is shown a data flow diagram for a browse function according to one embodiment of the present invention. The browse function allows users to traverse artists and genres by clicking links representing discovered relationships. Database 102 is populated from commercially available entertainment information databases containing music/artist/album descriptions, such as available from Muze Inc. (www.muze.com) or the All Media Guide (AMG) from Alliance Entertainment Group (www.allmusic.com). Such information may be provided, for example, in the form of updates 1009 using an import tool 1008 as provided by the database provider. Information for database 102 may also be provided by artist relationships import tool 1011 and content import tool 1007. Content is stored in database 102 in tables, as described above in connection with the data model of FIG. 9. Unmapped artist list 1006 and artist name equivalences 1005 are provided to content import tool 1007 to generate new records for database 102. Page builder 1003 queries database 102 for top-level genres, and builds pages 1004, using HTML templates 1001 for each top-level genre, containing links to sub-genres. Page builder 1003 queries database 102 for each artist and builds a page or set of pages in 1004 for each, thus providing a linked set of pages for traversal by the user.

Updates 1009 are provided to import tool 1008 for generating updates to stored data in database 102 in accordance with available third-party software as provided by the database provider. In one embodiment, equivalencing is performed to account for different spellings and variations on artist names, track names, and album titles. In another embodiment, heuristic matching or other techniques are employed as well. Artist-to-artist relationships 1010, as developed by relationship discovery techniques described herein, are provided to artist relationships import tool 1011 for storage in database 102.

Figure 10B:
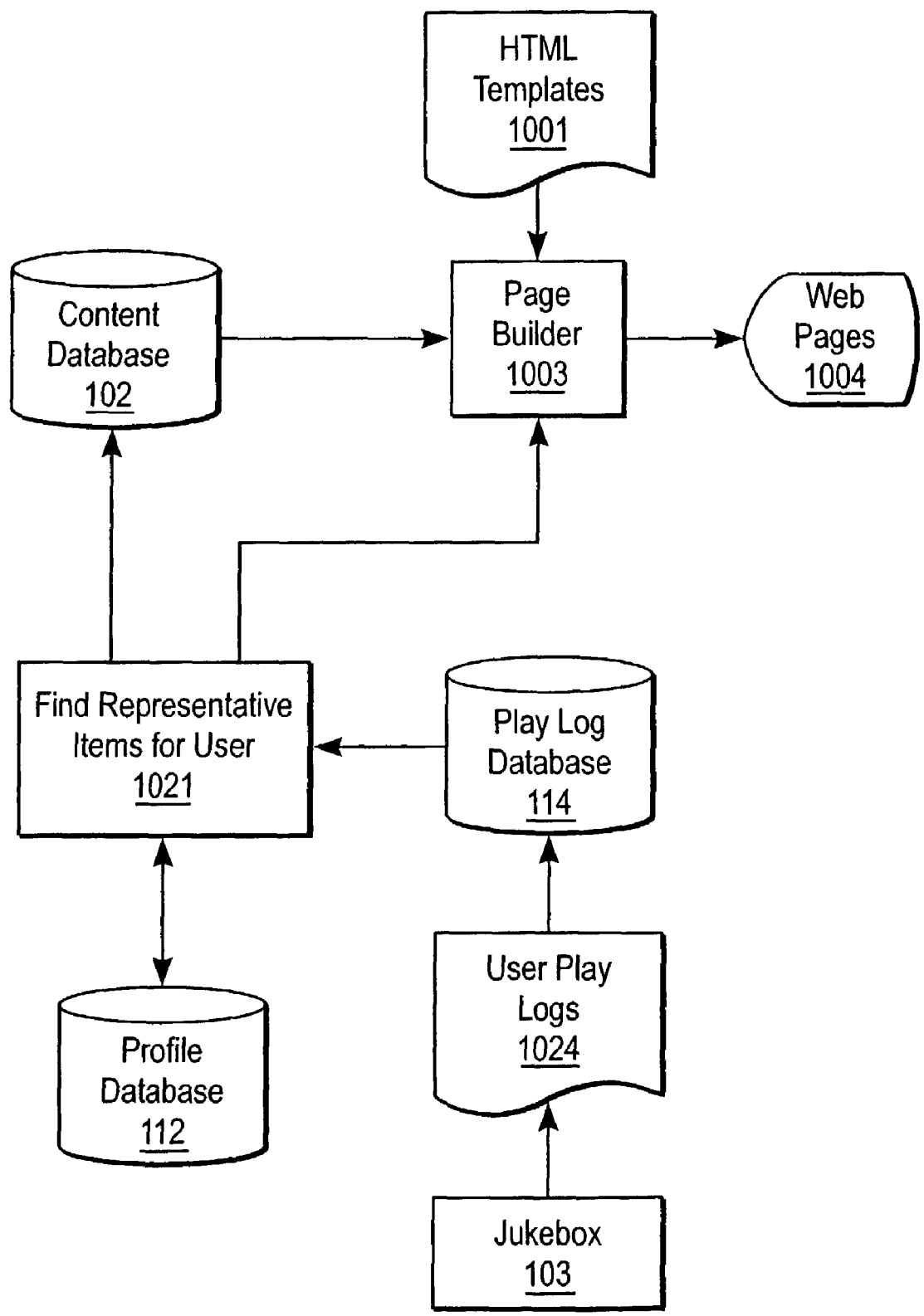
FIG. 10B is a block diagram showing data flow for a recommendation function according to one embodiment of the present invention.

Referring now to FIG. 10B, there is shown a data flow diagram for a recommendation function according to one embodiment of the present invention. Recommendations pages display selected items based on explicit preferences or discovered relationships from 1605. Such pages thus include functionality for suggesting albums that may be purchased on compact disc as well as downloadable music tracks. When play logs 1024 for the user are available, suggestions are made based on the play logs, using the relationship discovery techniques described below. When play logs 1024 are not available, a user may be given an opportunity to upload a play log 1024 to receive recommendations, or alternatively to receive generic recommendations (such as those based on user demographics or overall popularity of music tracks or albums). Recommendations may be refreshed and updated whenever a new play log 1024 is received. In addition, some randomness may be incorporated into the recommendations so as to increase variety and encourage repeat visits to the web site.

Jukebox 103 periodically uploads play logs to play log database 114. If jukebox 103 has obtained any additional relevant information regarding the user, this information may also be uploaded at this time. Periodically, the system retrieves a list of users from profile database 112 for which new play logs are available, and module 1021 determines representative suggestions for each user. The representative suggestions are stored in profile database 112. When the user accesses the suggestion page, representative items are fetched and used to formulate recommendations, using the relationship discovery techniques described herein. If no representative items are available for the user, the play log for that user (if available) is analyzed so that representative items may be determined. Based on the formulated recommendations, and using a format specified in HTML templates 1001, online page builder 1003 generates output web pages 1004 for presentation to the user as part of web site 106.

Operation of Relationship Discovery Engine 1604

Figure 14:
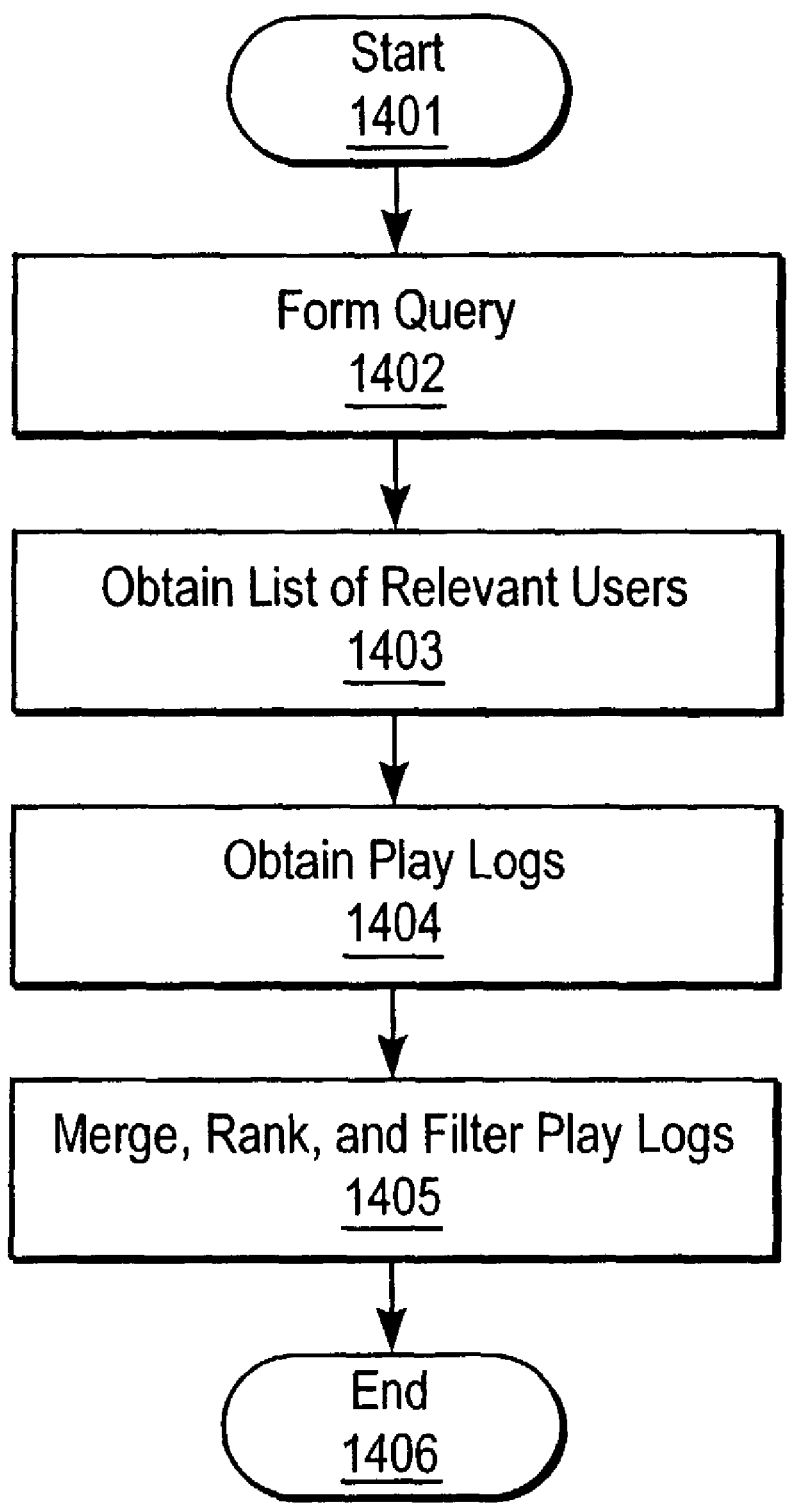
FIG. 14 is a flow diagram of a method of operation for a relationship discovery engine according to the present invention.

As described above, the present invention employs relationship discovery engine 1604, in connection with learned artist relationships 1605, to find related items for generation of suggestions, track lists, and the like. Referring now to FIG. 14, there is shown a flow diagram of a method of operation for relationship discovery engine 1604 according to the present invention. A query is formed 1402 using one or more tracks, artists, or albums, either from a user's play log or from another source. The query may specify tracks, artists, or any other relevant criteria.

Based on the supplied query, a list of relevant users 1403 is obtained. In general, this list includes users that have played the specified tracks, or who have played music by the specified artist, and the list is ordered by the relative prominence of the track or artist in the user's play log. In one embodiment, step 1403 is performed by weighting the tracks in the query using one of several weighting strategies. A list of users having play logs that include one or more of the query tracks is obtained using an inverted index in play log database 114. The matching tracks from each play log are weighted according to the selected play log weighting scheme. If a query track is absent in the play log, its weight is zero. The score of the user with respect to the query is the sum across all query tracks of the query weight multiplied by the user's play log weight for each track.

Play logs for the most significant users are obtained 1404. The tracks in the retrieved play logs are merged, ranked and filtered 1405 by statistical techniques to return the most relevant items. Alternatively, artists or albums for the tracks in the retrieved play logs are determined, and the artist list is merged, ranked and filtered. The resulting list contains the related tracks, albums, or artists for the specified query.

Many types of music retrievals are possible using this system. By using the user's play log as the input for query in step 1402, the method of FIG. 14 discovers relationships based on the observed behavior of the user.

In one embodiment, the present invention employs a binomial log likelihood ratio analysis for finding significantly over-represented tracks, albums or artists in a set of retrieved play logs. The log likelihood ratio is a measure of how well a null hypothesis fits the observed data. If the null hypothesis is the assumed independence of occurrence of two tracks, for example, the log likelihood ratio measures the likelihood that such independence is a valid assumption. It follows, then, that the log likelihood ratio is a useful indicator of the relationship between the occurrences of the two tracks, if any.

The log likelihood ratio is based on a likelihood ratio. A likelihood ratio is the ratio of the maximum likelihood of the observed data for all models where the null hypothesis holds to the maximum likelihood of the observed data for all models where the null hypothesis may or may not hold. The log likelihood ratio is the logarithm of the likelihood ratio.

For the present invention, the log likelihood ratio is employed to determine whether a given track is more likely to appear in track lists of a first subset of users than in track lists of a second subset of users. Based on this measure, subsets of users are defined so as to identify those users most likely to enjoy the track, album, or artist.

In one embodiment, the log likelihood ratio is applied in the present invention to determine whether a particular track occurs more frequently than expected in the selections of a subset of users. Variables are defined as follows:

N=the total number of users;
$N_1$=the number of users in the subset;
$N_2$=the number of users not in the subset;
$k_{11}$=the number of users in the subset that selected the track;
$k_{12}$=the number of users not in the subset that selected the track;
$k_{21}=N_1-k_{11}$=the number of users in the subset that did not select the track; and
$k_{22}=N_2-k_{12}$=the number of users not in the subset that did not select the track The following equations are applied:

$$\pi_{ij} = \frac{k_{ij}}{N_j}, \quad \mu_j = \sum_i \frac{k_{ij}}{N}$$

The log likelihood ratio is then given as:

$$LLR \text{ for the track} = \sum k_{ij} \log \frac{\pi_{ij}}{\mu_j}$$

Figure 15:
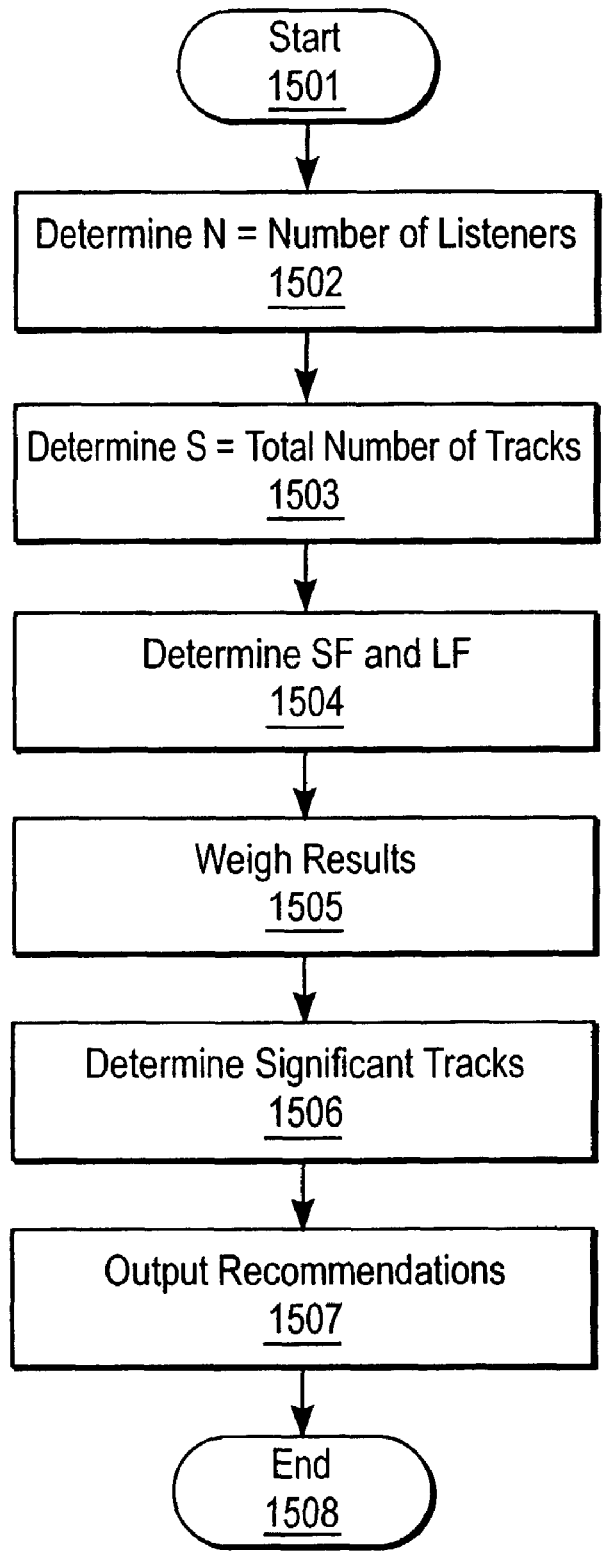
FIG. 15 is a flow diagram of a method of extracting significant information according to the present invention.

Referring now to FIG. 15, there is shown a flow diagram of a method of extracting significant information according to the present invention. The method illustrated in FIG. 15 is shown in terms of matching tracks in a music recommendation system. One skilled in the art will recognize that the method may be adapted and applied to many other domains and techniques.

A total number of users N is determined 1502. A total number of tracks S is determined 1503. For each track, the system determines 1504 a track frequency (the number of times the track was played by all users, or $$SF_j = \sum_i n_{ij})$$

and a listener frequency (the number of users that listened to the track at least once, or $$LF_j = \sum_i (n_{ij} > 0)).$$

The results are weighted 1505 according to a product of up to three components: α=how many times the user has listened to the particular track; β=how rare the track is among all users; and γ=a normalizing factor based on how many tracks the user has listened to, in total.

The first weighting factor, α, represents the frequency of the track within the user's play log. It may be represented and defined according to the following alternatives:

$\alpha_T=k_{ij}$=Number of occurrences of the track in the user's play log; or
$\alpha_L=\log k_{ij}$ (or $\log(k_{ij}+1)$); or
$\alpha_x=1$ (a constant, used if this weighting factor is not to be considered).

α may be adjusted to account for repeat play, aborted play, high or low volume level, and the like. Other functions are also possible and are well known in the literature describing information retrieval.

The second weighting factor, β, represents the frequency of the track within all users' play logs. It may be represented and defined according to the following alternatives:

$$\beta_l = \log\frac{N+1}{LF_j+1}$$

(inverse listener frequency, i.e. the log of the number of users divided by the number of users that listened to the track); or $\beta_x=1$ (a constant, used if this weighting factor is not to be considered).

β may be adjusted in a similar manner as is α.

The third weighting factor, γ, represents a normalizing factor, which serves to reduce the bias for scoring long play logs higher than short ones. Using a normalizing factor, a short relevant play log should score at least as well as a longer play log with general relevance. γ may be represented and defined according to the following alternatives:

$$\gamma_C = \frac{1}{\sqrt{\sum(S_j W_{ij})^2}},$$

where $S_j=\beta$ and $W_{ij}=\alpha$; or $\gamma_x=1$ (a constant, used if this weighting factor is not to be considered).

By employing the above-described combination of three weighting factors in generating scores for tracks and artists, and then finding 1506 significantly over-represented elements using a test like the generalized log-likelihood ratio test, the present invention avoids the problems of overstating "best sellers" (i.e. those items that appeal to nearly all users) and overstating coincidental co-occurrence. If a track is a best seller, the second weighting factor will tend to diminish its overpowering effect. In addition, the effect of coincidental co-occurrence is lessened by the γ coefficient.

In one embodiment, the system of the present invention generates scores as follows. For each track of interest, a large m-dimensional vector is determined. For each listener, another m-dimensional vector is determined. The techniques of assigning meaning to such vectors and training the vector set to represent similarities among vectors are well known in the art, as described for example in Salton et al., "The SMART information retrieval system," 1983. In such a scheme document weights can be defined as $w_{ij}=\alpha\beta\chi$ where $k_{ij}$ is as defined above, i is the document and j is the term.

Query weights $q_j$ can defined where $k_{ij}$ now represents the word counts. Given these document and query weights, the score for each user log is:

$$score_i = \sum_j w_{ij} q_j$$

A score can be generated for each listener's play logs relative to a query, and the highest-scoring listeners can be added to the listener list. A score for a listener with respect to a query is determined by taking the dot product of the query vector and the vector for a listener's play logs. In one embodiment of the present invention, the above-described weighting factors are applied to the vector terms in order to improve the results of the scoring process.

Once play logs have been scored for retrieval using weighting factors, play logs are retrieved, based on the relationships to the query. These play logs contain artists, albums, and/or tracks. Over-represented artists, albums, and/or tracks are extracted based on measured significance using the log likelihood ratio. These over-represented items are output as recommendations.

Once the resultant tracks have had their significance measured, a subset of tracks, albums or artists in the resulting play-logs is output 1507 as recommendations. The subset may be determined by taking a fixed number of the top-scoring play logs and/or by taking all play-logs that have a higher score than a threshold value. In either case, the generalized log-likelihood ratio test can be used to find tracks, albums or artists that are significantly over-represented in this subset of play-logs relative to the set of all play-logs. These over-represented items constitute a recommendation set. In this manner, the present invention is able to provide recommendations that are most likely to be of interest to the particular user.

Further processing of the output of engine 1604 may be provided, in order to filter the results. For example, tracks that the user has already played may be omitted from recommended tracks. Alternatively, some tracks that have already been played may be included, so as to improve the credibility (from the user's point of view) of the output results. Output may be ranked in order of score, or may be randomized and further filtered, in order to obtain a desired level of variety in suggested tracks. Output may be proved to recommendation engine 107 for presentation to the user.

Figure 11:
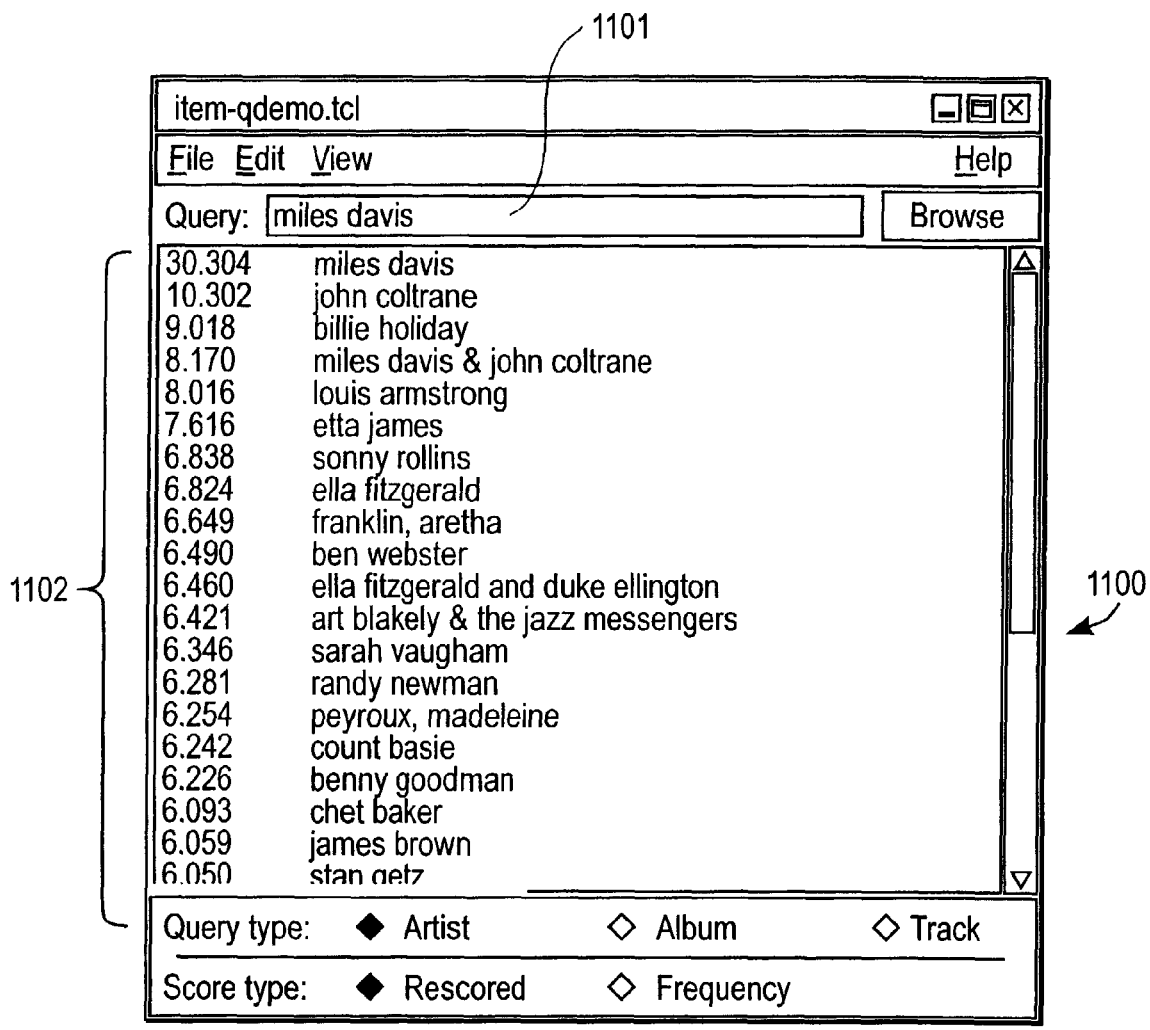
FIG. 11 is an example of a screen shot depicting sample artist-level relationships.

Referring now to FIG. 11, there is shown an example of a screen shot 1100 depicting sample artist-level relationships. Query term 1101 is shown, along with list 1102 of recommended artists, generated by engine 107. For each recommended artist, screen 1100 depicts a score as well as the name of the artist; higher-scoring artists are those that have a closer discovered relationship to query term 1101.

The present invention is able to refine the discovered relationships and user preferences as often as desired. For example, user behavior may be monitored after recommendations are made, so that play logs can be updated based on the user's selection of tracks, as well as the user's skipping and/or repeating of tracks. In one embodiment, more recent behavior may be assigned a greater weight than previous behavior. In this manner, the present invention provides a technique for continually updating user preference data, so as to take into account changing tastes or moods.

By making suggestions based on observed behavior with respect to music track selections, the above-described methods of the present invention avoid many of the limitations of the prior art. Specifically, the user data may be dynamically updated with each track selection, so that more data points are available than in prior art schemes. By contrast to online commerce environments where user behavior may be monitored only when the user chooses to make a purchase (or, at best, when he or she browses a title), the present invention is able to monitor individual track selections and thus achieve a much greater degree of granularity. In other words, user preference data may be collected at a higher bandwidth than in prior art systems.

In addition, users' selection of music tracks is for their own personal enjoyment; such selections are not generally made on behalf of other people (as might be the case in online stores, where a user may purchase a gift for some other person). Thus, the developed user preferences, embodied in the user play logs, are more likely to accurately reflect the user's tastes.

Finally, play logs may include information as to which tracks were repeated, which were aborted or skipped, and at what volume level the tracks were played. Weights can be assigned to tracks in the log, based on such observations. For example, the system may assign a higher weight to a track that was repeated on the assumption that the user probably enjoyed that track, while a lower weight may be assigned to a track that was skipped halfway through, on the assumption that the user probably did not enjoy the track.

Applications

The above-described methods for implementing relationship discovery engine 1604 generate output that may be used for a variety of applications. In addition to generating artist and track recommendations based on a user's play log, the present invention may be employed for the following applications as well:

Recommendations based on explicit preferences: Input to engine 1604 may be presented in terms of the user's specified preferences, such as may be obtained via an online questionnaire. Such input may be employed to supplement data describing observed behavior, so as to diminish the undesired effect of best sellers and other less-meaningful influences.

Improved text searches: Input to engine 1604 may be a text search term for a particular artist or track. Output may then include tracks and artists that engine 1604 deems likely to be of interest. Thus, a user may search for artist A and be presented with works by artist B as well, based on a relationship between artists A and B that is discovered by analysis of user listening behavior. Alternatively, such relationships may be determined in advance and stored in database records, so that textual searches for tracks and artists can return information about related tracks and artists based on the stored fields in the database records. Such an application may be particularly useful, for example, in an online commerce environment.

Improved text searches may alternatively be implemented by augmenting the pages to be searched by including tags for related artists or tracks. Conventional search engines will then automatically include the pages in search results for the related artists or tracks, without any additional processing.

Personalized radio station programming: In another application, the present invention may be employed in connection with conventional radio station programming techniques, to implement an improved personalized radio station. As is known in the art, conventional radio stations typically divide a programming block into a number of segments. Each segment is assigned a programming category, such as "power hit," "new release," "recurrent hit," and the like. For a particular programming block, music tracks are assigned to each of the segments based on the particular programming format of the radio station. Music scheduling software, such as Selector® by RCS Sound Software, applies heuristic rules for repetition limits and classes of songs, to automatically generate track lists for use by radio stations. The present invention may be combined with such existing radio station programming techniques, to populate the defined segments with music tracks that are likely to appeal to a particular listener. Additional rules may be applied in generating track lists, so as to limit undesired repetition and to comply with limiting legislation (such as the Digital Millennium Copyright Act) and other restrictions.

To implement such an application including a personalized radio station using suggestions from engine 1604, the present invention uses slot definitions (which may be generated manually or by a software application), together with descriptive information for each track, to generate a list of candidate tracks for each defined slot. Tracks are then ranked, based on several factors including the output of engine 1604. Ranked order may then be perturbed to a specified degree, in order to introduce a selected level of randomness to the resultant program. For each slot, a track from the ranked list is selected, either by strict rank-selection, or by a rank-weighted randomization.

In one embodiment, selections for each defined slot are generated as follows. A "penalty" value is associated with playing each track at a particular time. For example, playing a power track during a power slot might carry a penalty of zero, while playing a gold track during a power slot might carry a penalty of 1000 points. Other penalty values would similarly be established. The penalty value would then be combined with track scores to generate a ranked list of preferred tracks.

Randomness can also be added so as to provide variety and unpredictability. A random number can be generated within the range [0,1). The score might then be adjusted by $-\mu \log(1-u)$, where $\mu$ is a scale factor.

Additional constraints, restrictions, and rules might be added, in order to influence track selection and arrangement. For example, point values for a track might be reduced by 2000 if the track is played more than twice per hour, or if more than three tracks from a particular artist are played within an hour. Such constraints may be applied for aesthetic reasons, or to comply with Digital Millennium Copyright Act requirements, or for any other reason.

Once the score is established, penalties applied, and randomness applied, the track having the smallest penalty (or largest score) is selected and added to the track list. The above-described application for implementing radio station programming provides distinct benefits over the prior art technology described previously. Traditional programming techniques involving selection and placement of slots are combined with the advantages of user personalization, to implement an improved personalized radio listening experience.

Advertisement targeting: Once relationships between music tracks and/or artists have been developed, users may be presented with ads that are most likely to be of interest to them. Particular ads may be associated with particular tracks, albums, or artists, and relationships among tracks, albums, or artists may then be exploited using the output of engine 1604 of the present invention. In one embodiment, such an application may be implemented by generating keywords describing user preferences (based on the output of engine 1604), and providing such keywords to conventional ad purchasers, so that the selected advertisements are selected based on the discovered keywords.

One skilled in the art will recognize that, in addition to the above applications, many other applications of the present invention may be contemplated. For example, in an online commerce environment where users may browse albums or other products, advertisements may be targeted to particular users based on discovered relationships between the products being browsed and other products that are likely to be of interest. In addition, user behavior regarding web surfing, volume levels of music tracks, repeats and skips, and/or any other observable behavior, may be used as input to engine 1604. Weights can be assigned to different types of behaviors.

Sample User Interface

For illustrative purposes, a number of user interface elements, including menus, commands, dialog boxes, and screens, are described below. These user interface elements provide an example of an implementation of the present invention in the context of an online jukebox application 103, as may be made available over the Internet. One skilled in the art will recognize that the particular functions, commands, layouts, and design of the illustrated user interface are merely exemplary of such an application. Many other arrangements, features, and designs are possible. Accordingly, the following description and accompanying drawings are in no way intended to limit the scope of the invention, which scope is defined solely by the claims herein.

Figure 12:
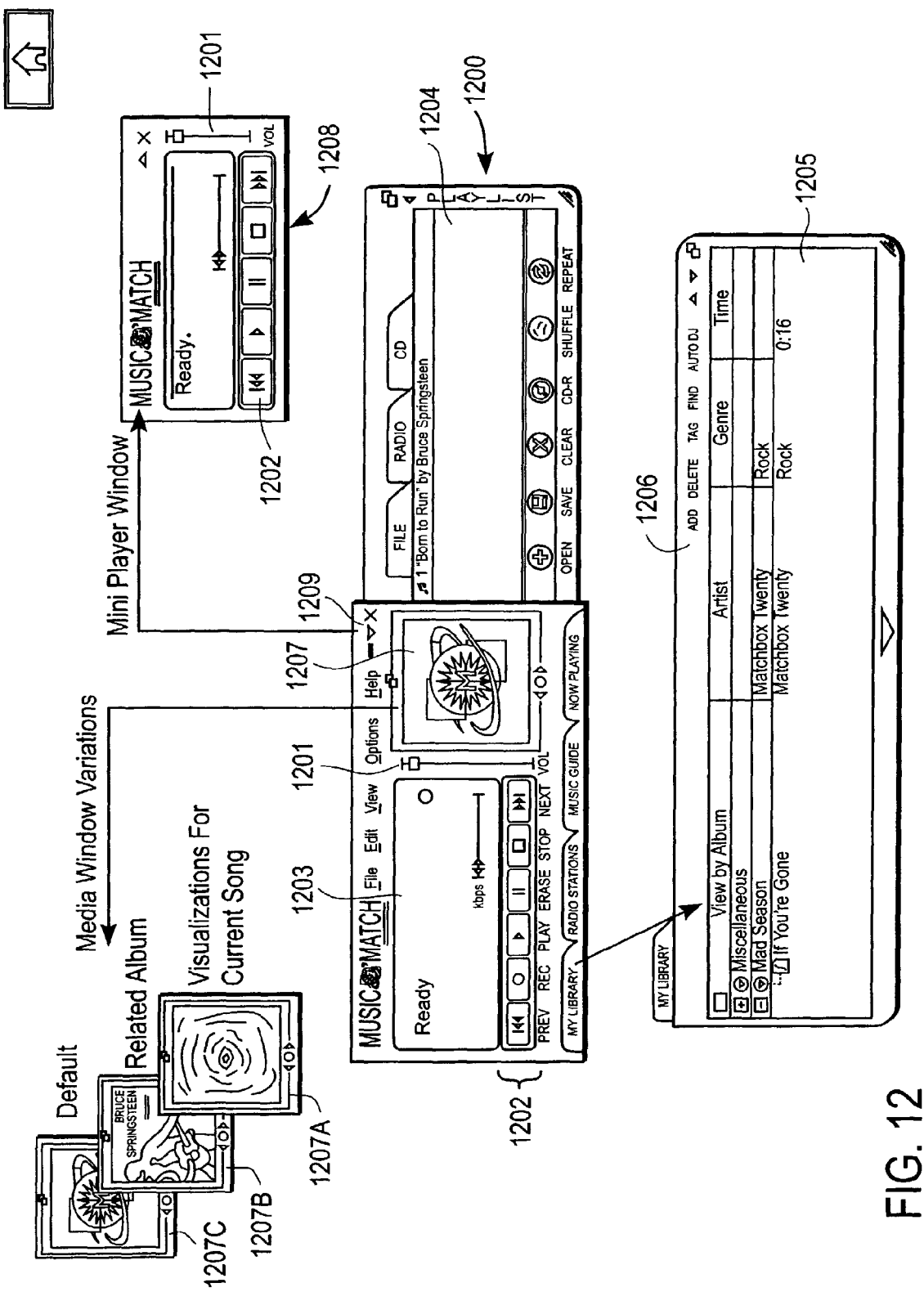
FIG. 12 depicts main components for a sample user interface of a jukebox that implements the present invention.

Referring now to FIG. 12, there is shown a screen shot 1200 of main components for a jukebox 103 interface according to one embodiment. Jukebox 103 provides buttons for skipping and repeating tracks 1202, volume control 1201, track display information 1203, and track program list 1204. A listing of the tracks in the user's music library 1205 is also provided, along with controls 1206 for adding, deleting, and reorganizing the list. Media window 1207 may also be provided, for displaying current song visualizations 1207A, album cover art 1207B for the currently playing or a related album, or other artwork 1207C. A miniaturized version 1208 of a player window may also be provided upon activation of a mini-player button 1209, to provide a subset of the features and controls of main screen 1200.

Figure 17A:
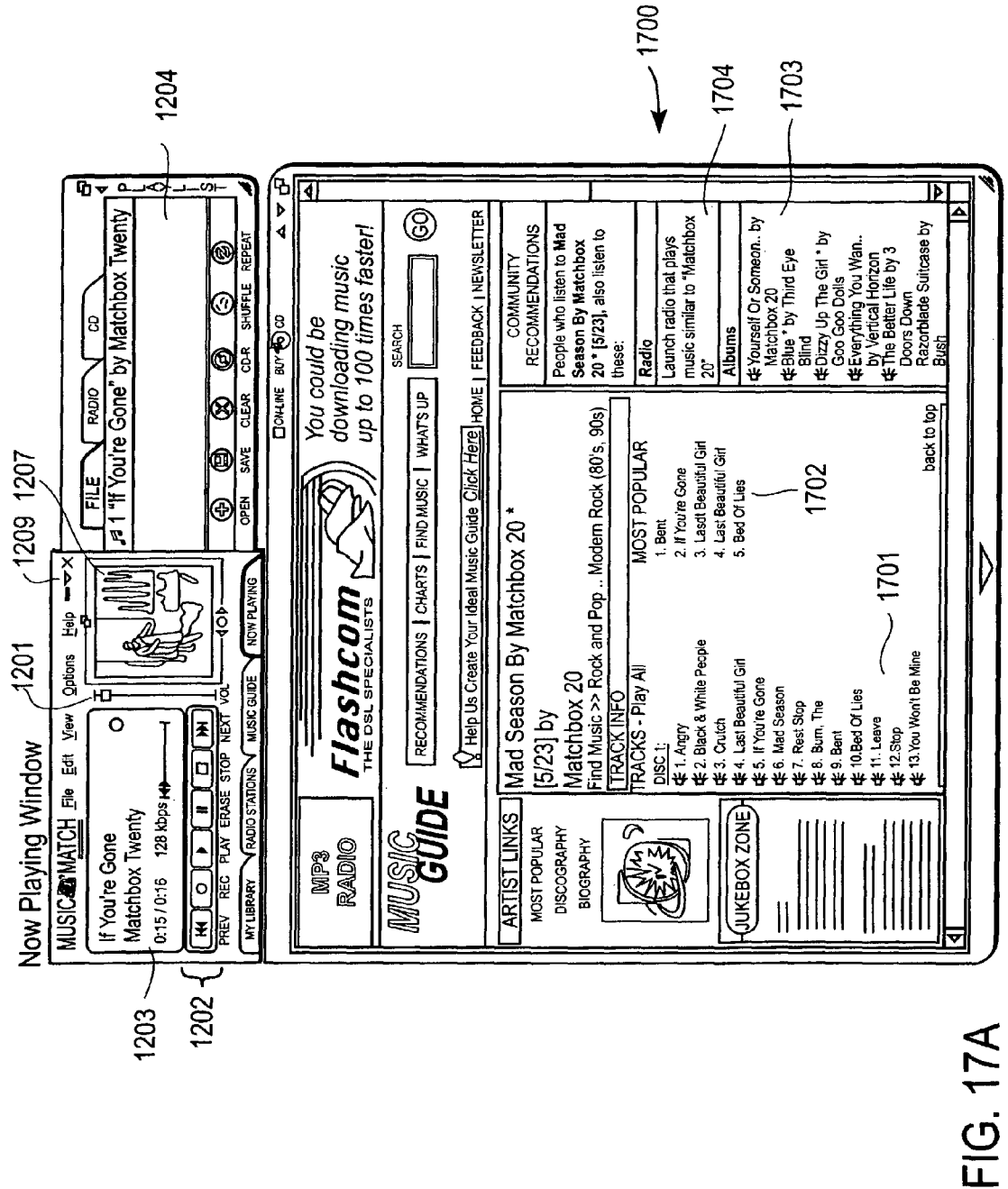
FIGS. 17A, 17B, and 17C depict additional main components for a sample user interface of a jukebox that implements the present invention.
Figure 17B:
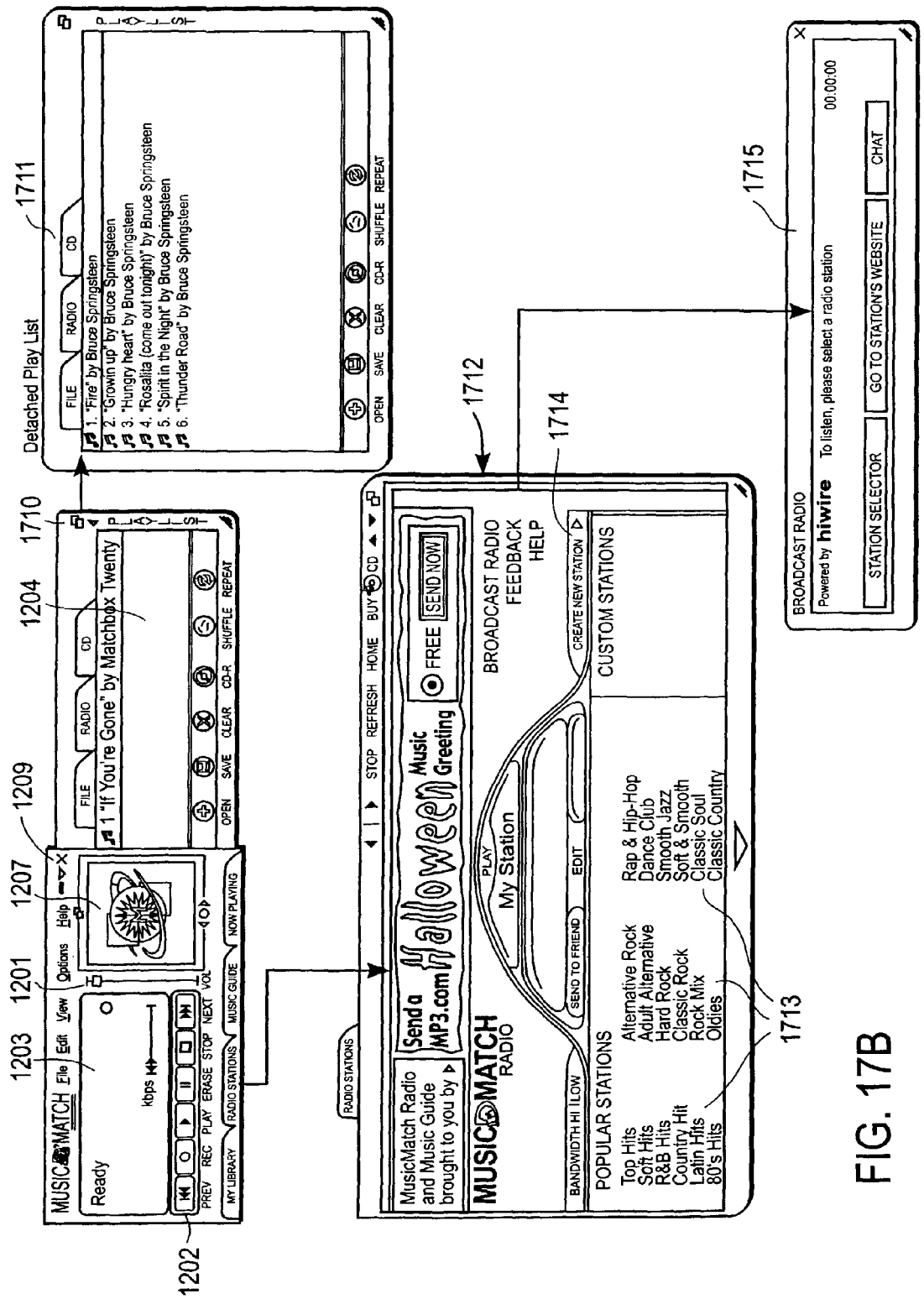
Figure 17C:
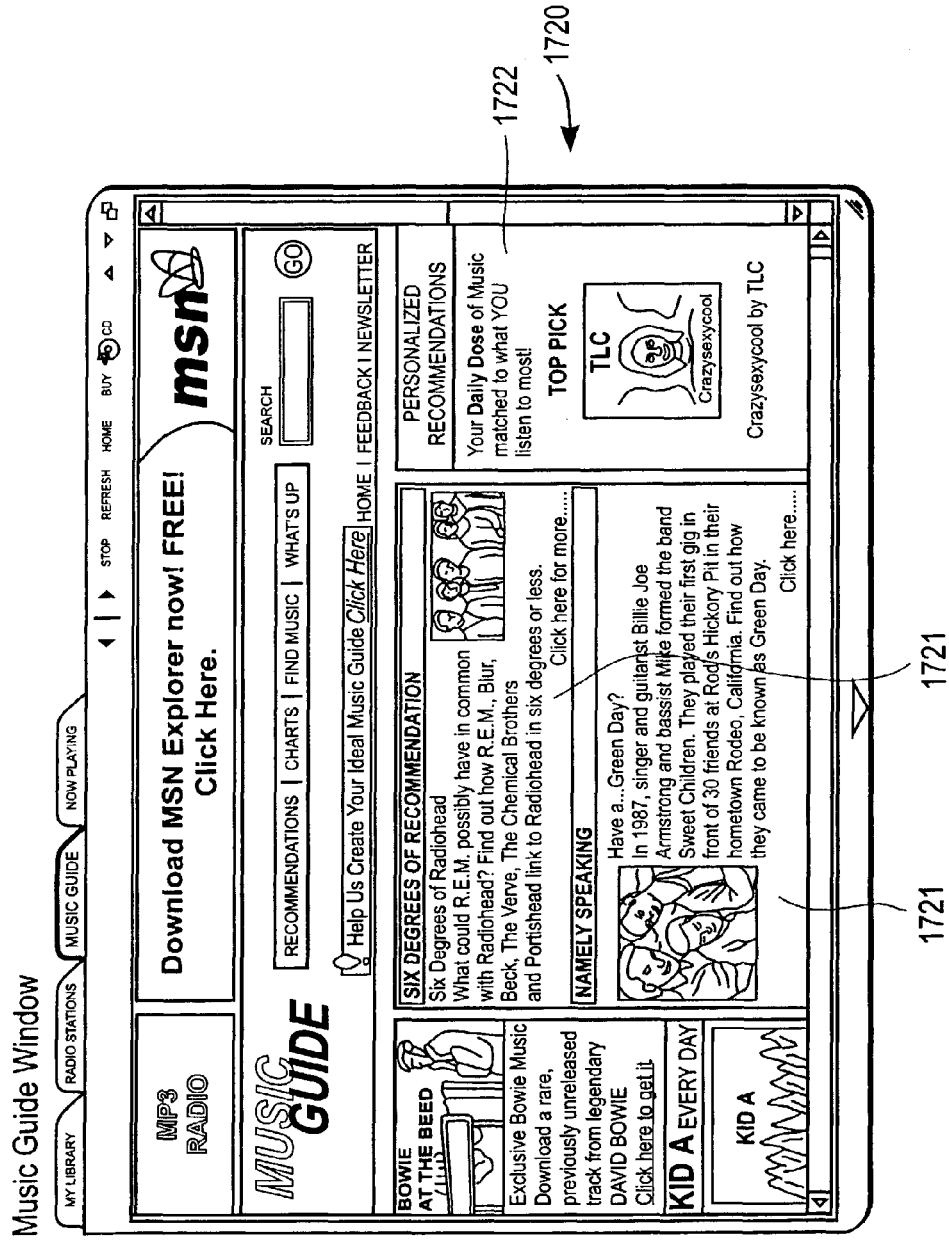

Referring now to FIGS. 17A through 17C, there are shown additional main components for a sample user interface of a jukebox 103 that implements the present invention.

FIG. 17A depicts a "Now Playing" screen 1700, which provides information describing and related to a musical track that is currently playing. Information displayed within screen 1700 may be provided from a web page, for example. Such information may include, for example, a track listing 1701 for the currently playing album, a listing of the most popular tracks 1702 for the currently playing album, a list of album recommendations 1703 (as may be determined using the above-described techniques of the present invention), and a link 1704 to an online radio station that may be personalized according to the preferences of the individual listener, using techniques described above. Additional information, advertisements, and controls may also be displayed in various areas of screen 1700.

FIG. 17B depicts a detached track listing 1711 that shows an exploded view of the information in track listing 1701. Detached listing 1711 may be activated by a user control 1710. Radio station screen 1712 provides access to a number of online radio stations, as listed 1713. The user can activate any selected online radio station, or may create (i.e. configure) a new station by activating control 1714 and interacting with broadcast radio window 1715 for selecting parameters for a new station.

FIG. 17C depicts a music guide screen 1720. Screen 1720 contains additional information related to the currently playing track or to other musical selections that the user may be interested in. Information may include articles 1721 as well as access to personalized recommendations 1722 that may be determined using the above-described techniques of the present invention. Articles 1721 may be selected by reference to artists, albums, or tracks that the system of the present invention determines are likely to be of interest to the user.

Figure 18:
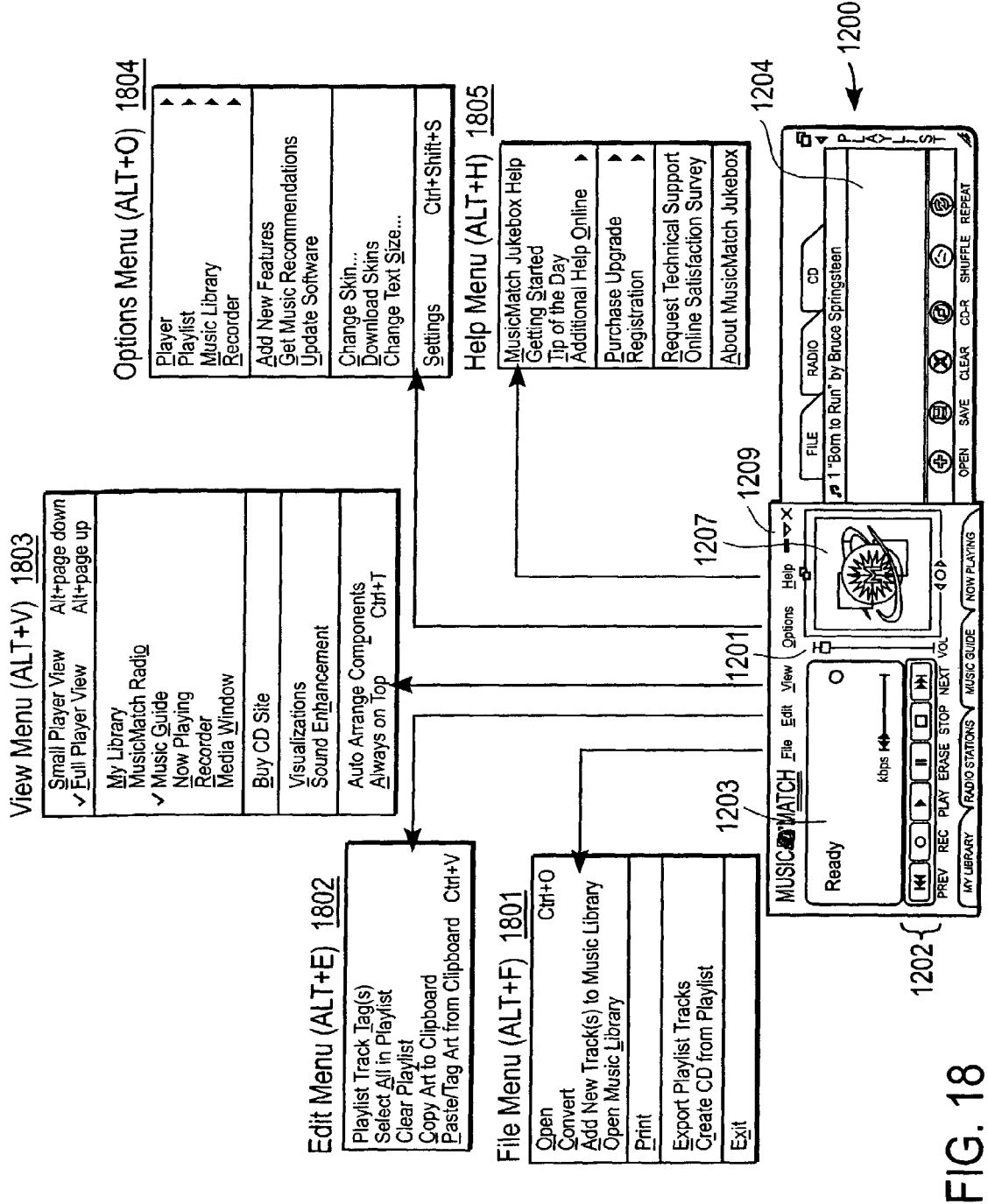
FIG. 18 depicts a series of menus for a sample user interface of a jukebox that implements the present invention.

Referring now to FIG. 18, there is shown a series of menus 1801-1805 for a sample user interface of a jukebox that implements the present invention. Menus 1801-1805 of FIG. 18 may be available, for example, in a menu bar as part of screen 1200 of the user interface. The user may select items from menus 1801-1805 to activate various commands and functions of the online jukebox, including those related to the present invention. The particular menus of FIG. 18, which are merely exemplary, include File menu 1801, Edit menu 1802, View menu 1803, Options menu 1804, and Help menu 1805. Several commands and screens related to menus 1801-1805 will be described in more detail below, for illustrative purposes.

Figure 19A:
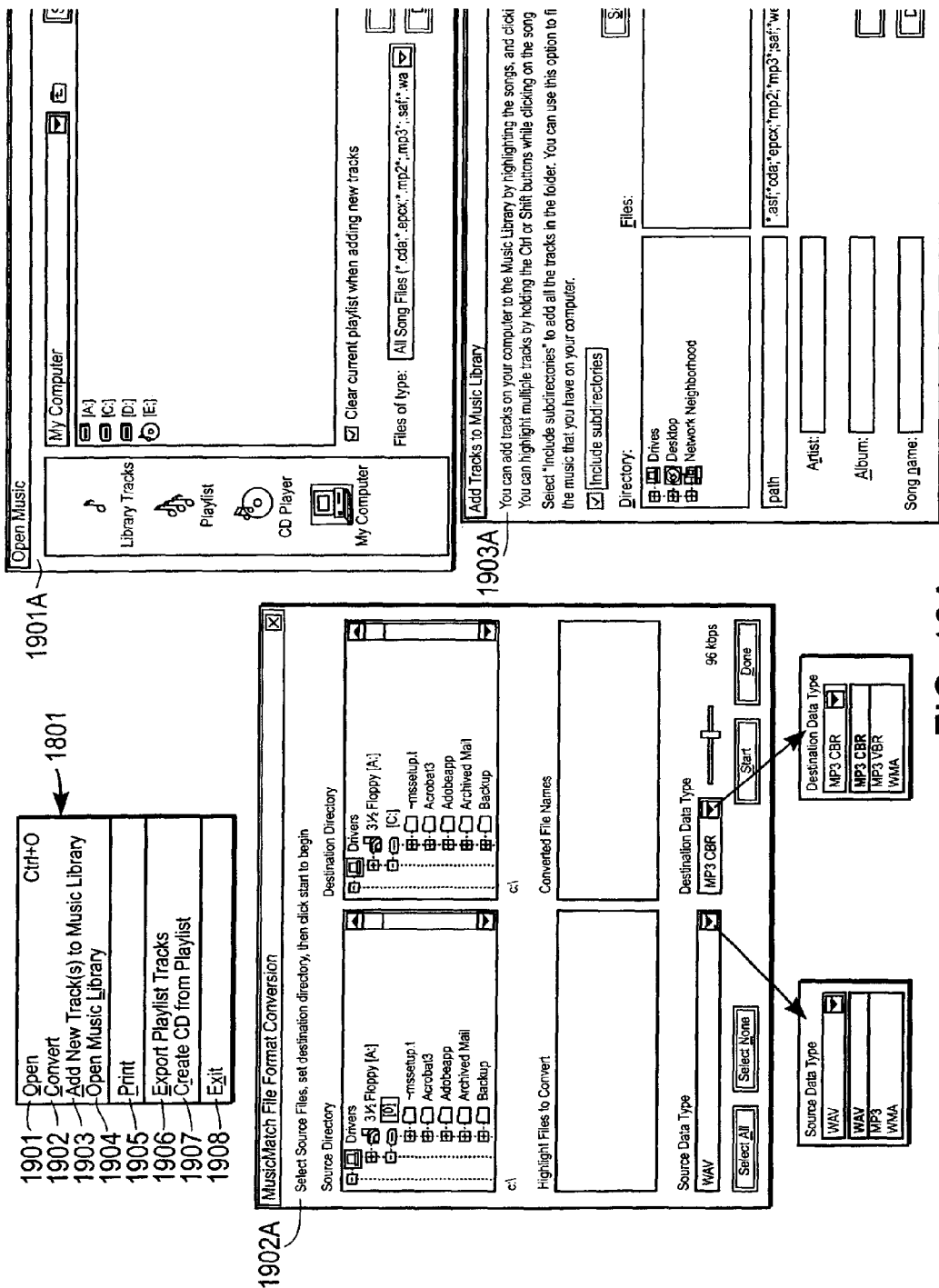
FIGS. 19A and 19B depict interface elements for File menu items of a sample user interface of a jukebox that implements the present invention.
Figure 19B:
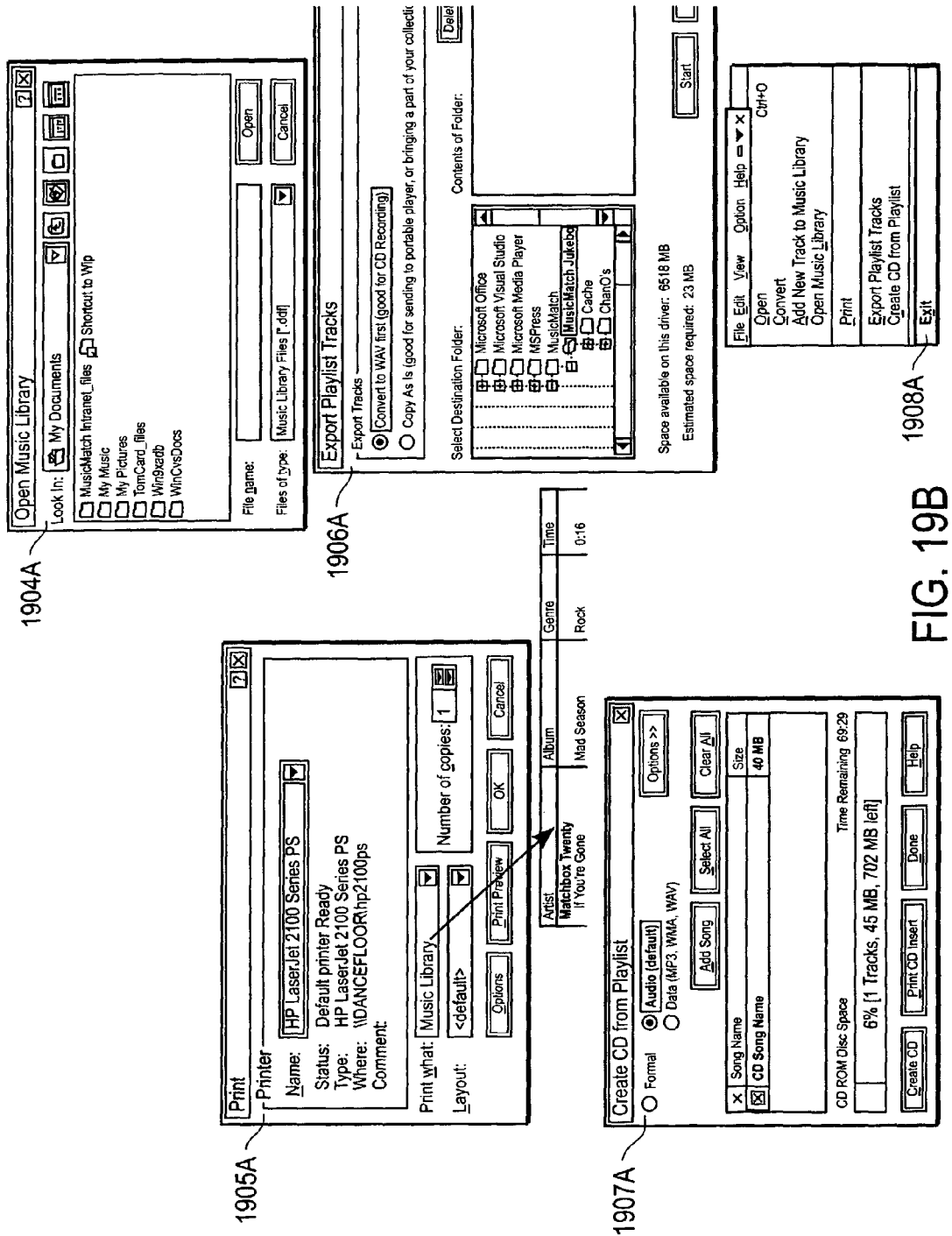

Referring now to FIGS. 19A and 19B, there are shown various interface elements for File menu 1801 items. Open command 1901 activates an Open Music screen 1901A for navigating among and selecting files containing music tracks, such as may be located on the user's hard drive, or on a compact disc, or the like. Convert command 1902 activates a File Format Conversion screen 1902A for converting files from one format to another, using techniques that are known in the art. Add New Track(s) to Music Library command 1903 activates an Add Tracks to Music Library screen 1903A for adding music tracks, found on hard drives, compact discs, and the like, to the user's library as shown in 1205.

Open Music Library command 1904 activates Open Music Library screen 1904A for navigating among and selecting music library files. Music library files may be selected and opened by the user to provide a set of music tracks. Print command 1905 activates Print screen 1905A for printing various lists, tracks, and libraries. Export Playlist Tracks command 1906 activates Export Playlist Tracks screen 1906A for converting and/or exporting tracks from playlists to other formats and locations. Create CD from Playlist command 1907 activates Create CD from Playlist screen 1907A for providing access to features for creating compact discs from selected playlists. Exit command 1908, 1908A exits the application.

Figure 20A:
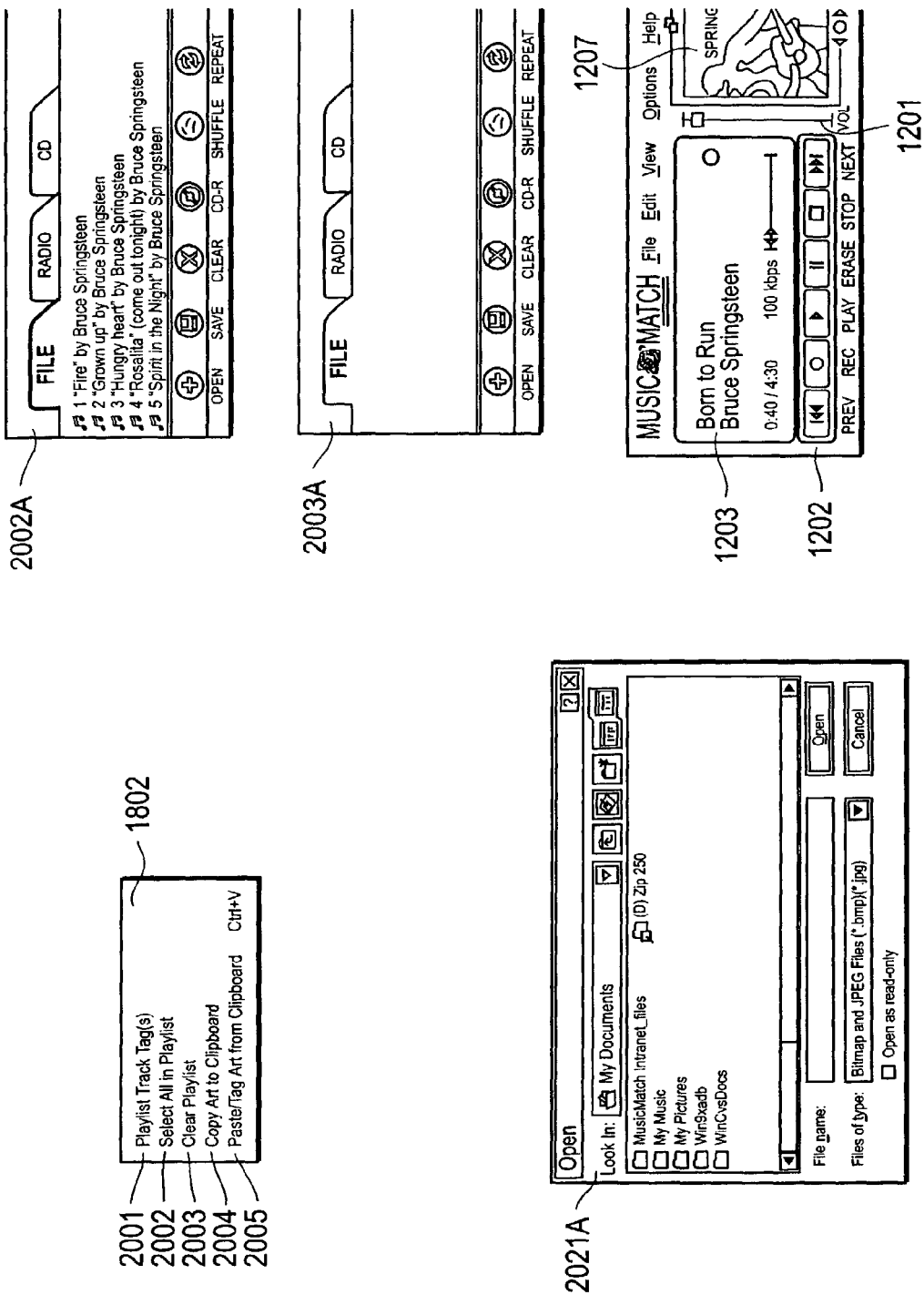
FIGS. 20A, 20B, and 20C depict interface elements for Edit menu items of a sample user interface of a jukebox that implements the present invention.
Figure 20B:
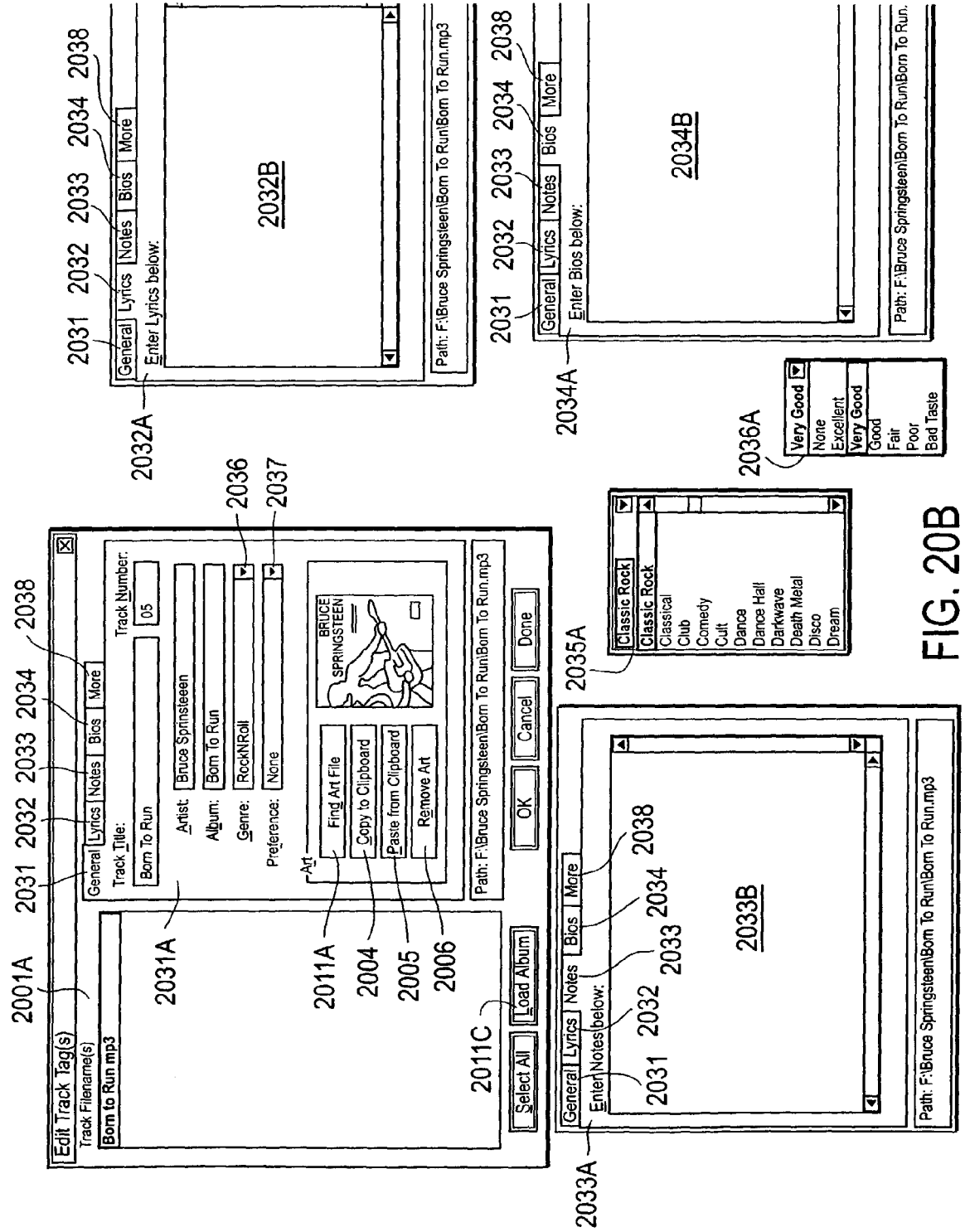
Figure 20C:
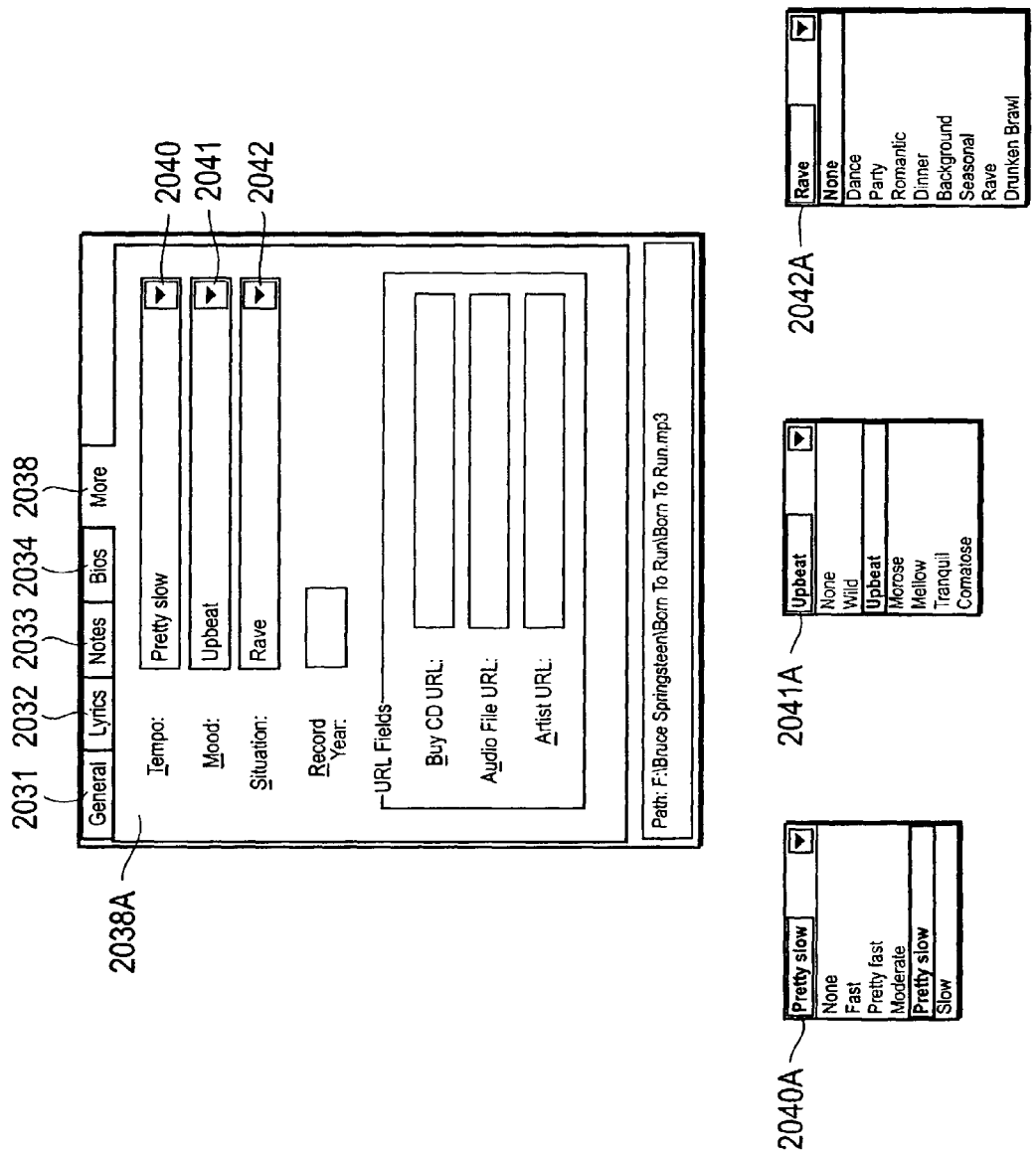
Figure 21A:
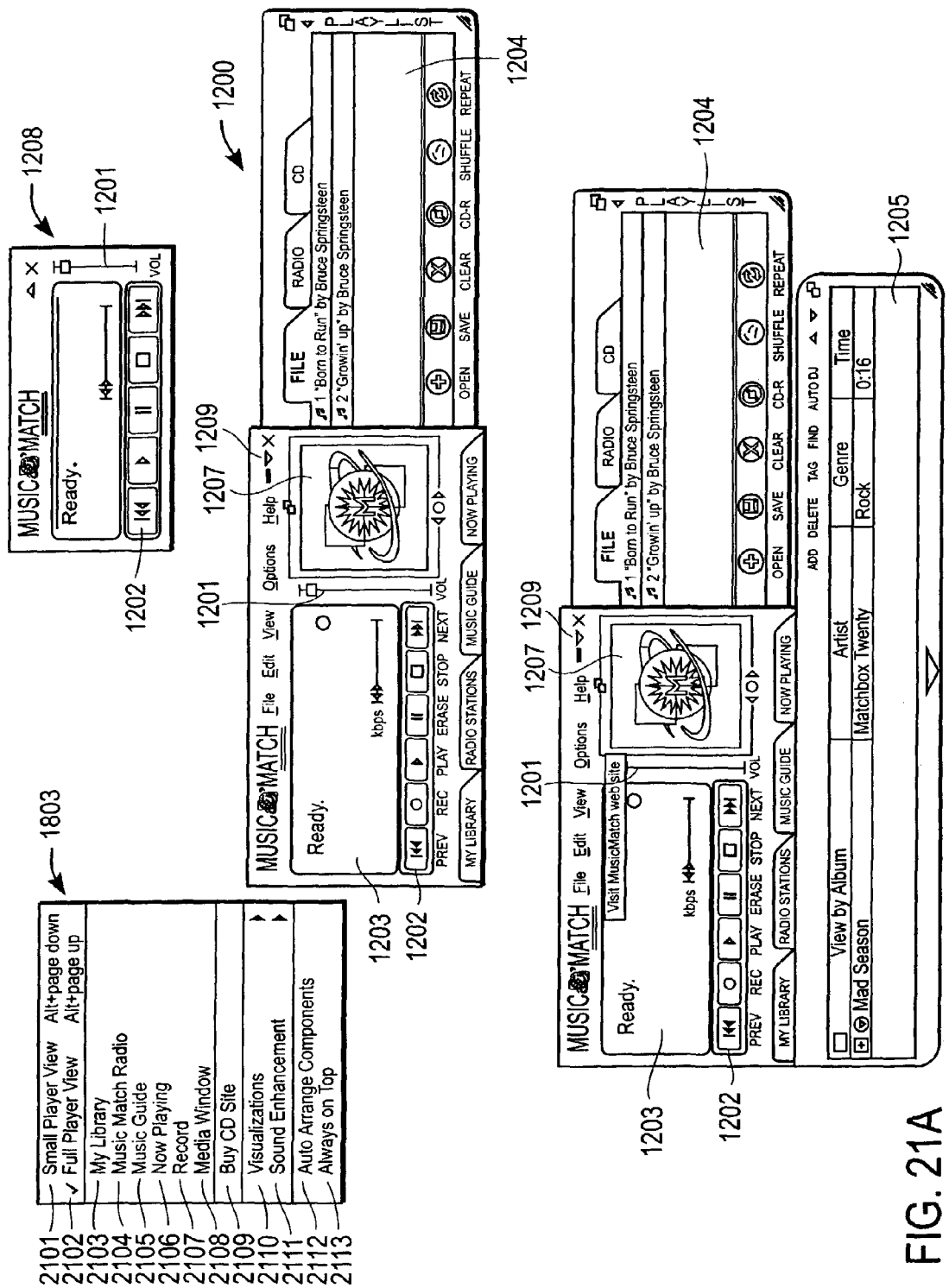
Figure 21B:
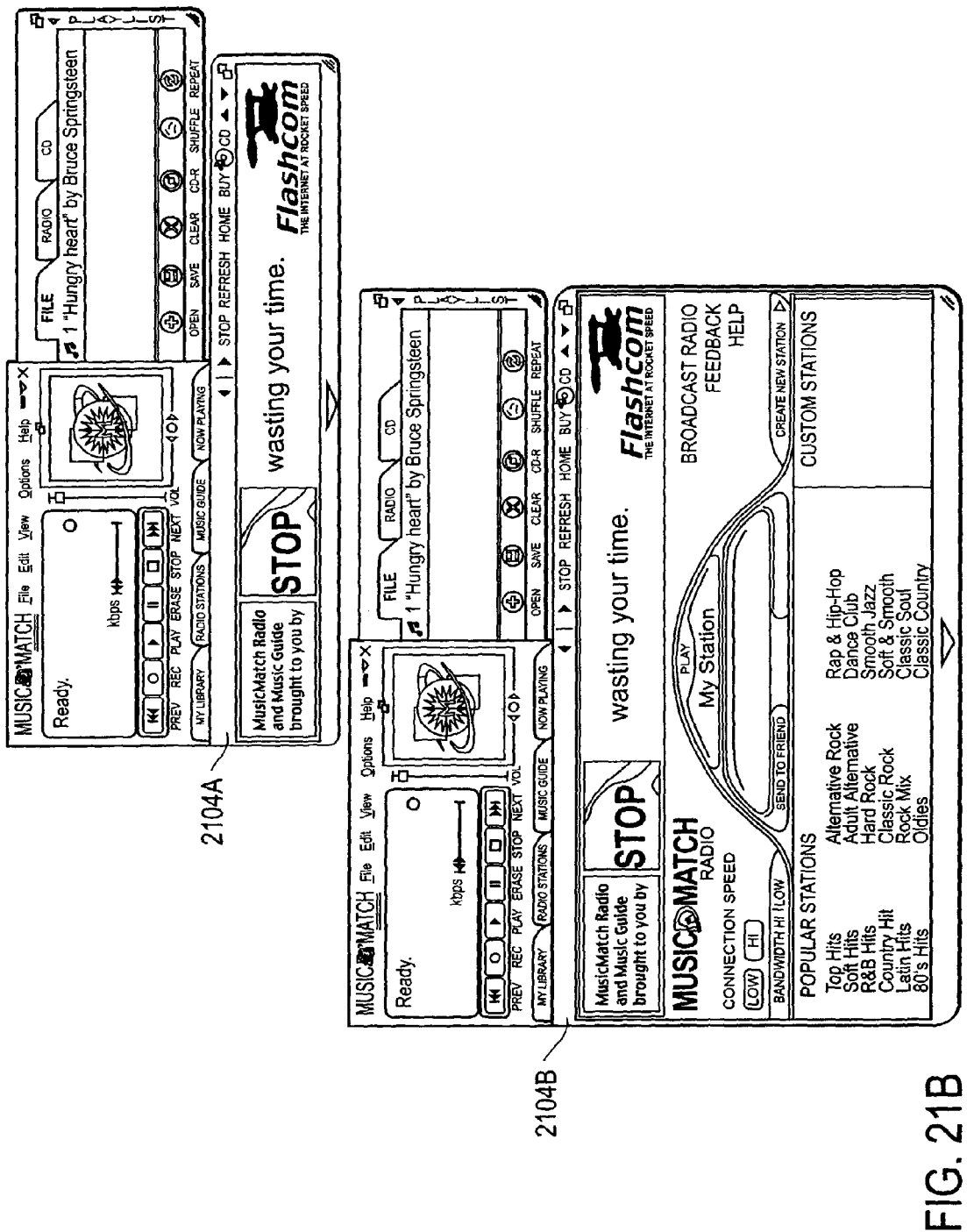
Figure 21D:
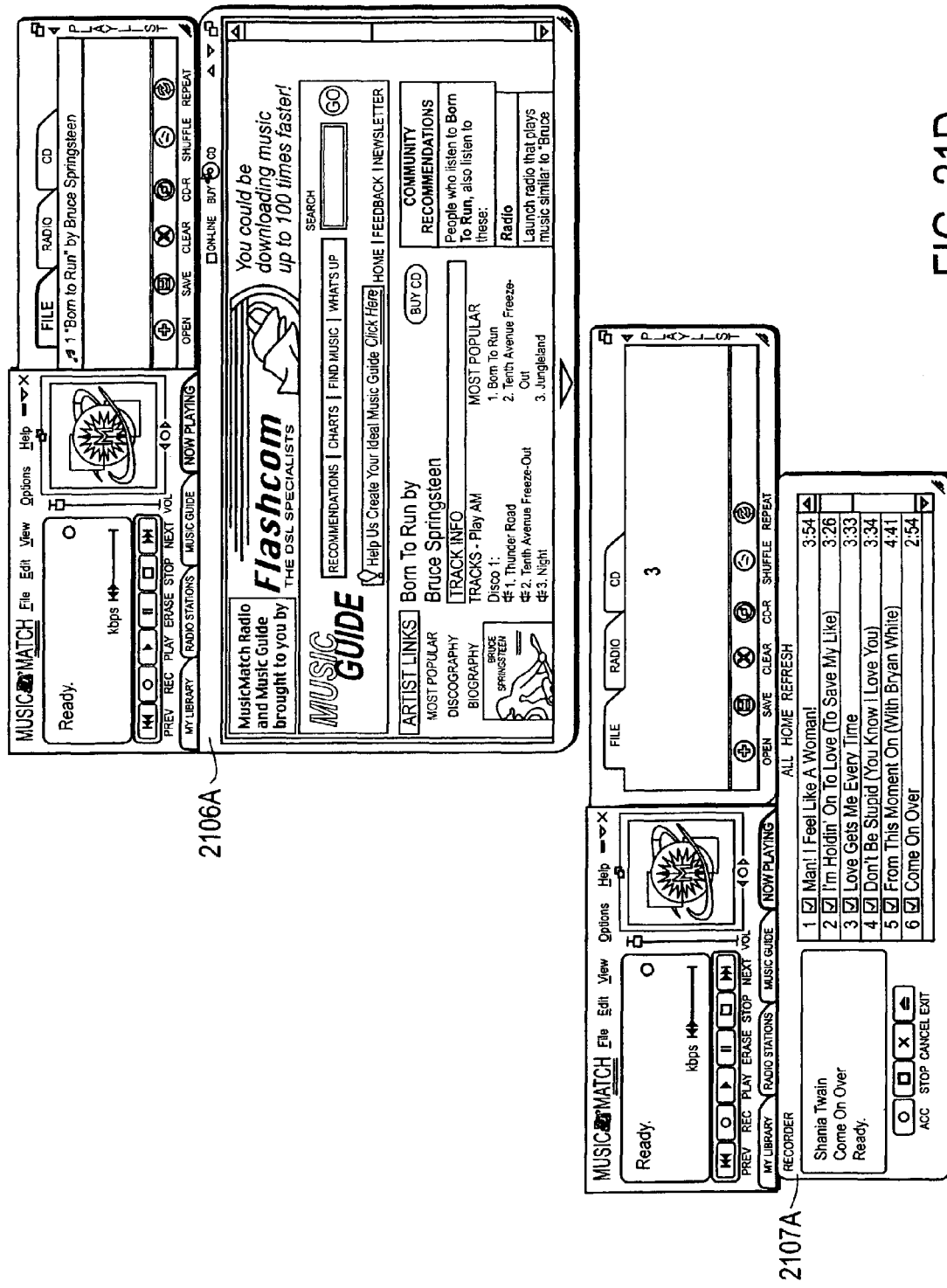
Figure 21E:
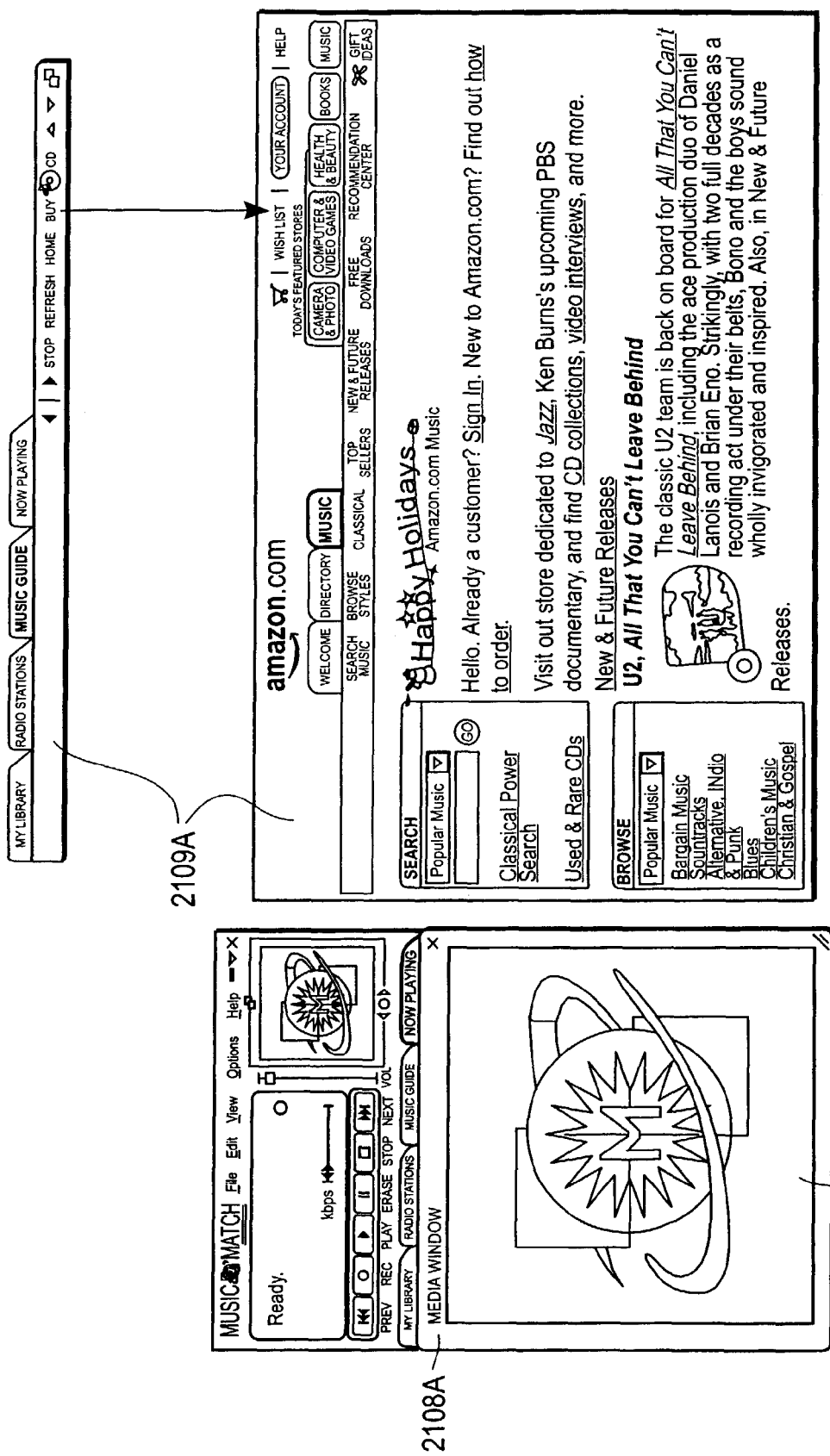
Figure 21F:
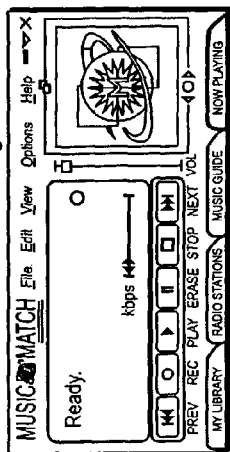
Figure 21F:
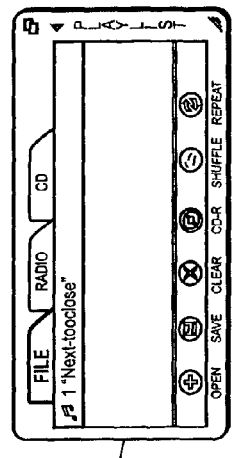
Figure 21F:
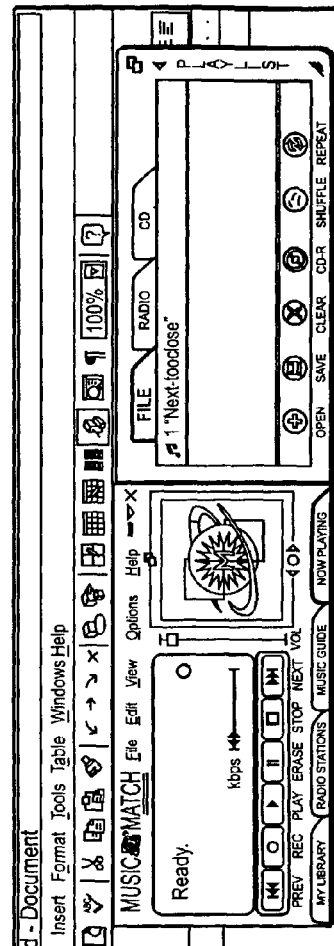
Figure 21F:
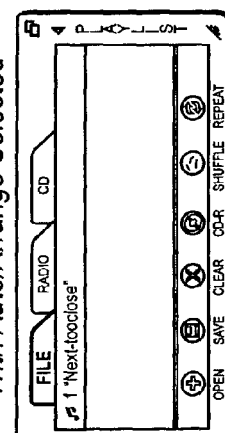

Referring now to FIGS. 20A, 20B, and 20C, there are shown various interface elements for Edit menu 1802 items of a sample user interface of a jukebox that implements the present invention. Playlist Track Tag(s) command 2001 activates Edit Track Tag(s) screen 2001A that allows a user to view and edit descriptive information concerning a particular track. Screen 2001A contains tabs 2031, 2032, 2033, 2034, and 2038 for accessing various subscreens as shown in FIGS. 20B and 20C. General tab 2031 provides access to subscreen 2031A, which provides fields and controls for entering general information concerning the track, including track title, track number, artist, album, genre, and the like. Genre field 2036 is presented as a pull-down menu 2035A for selecting among genres. Preference field 2037 is presented as a pull-down menu 2036A for selecting the user's degree of liking of the track. Find Art File button 2011A activates Open screen 2021A for browsing a hard drive or other sources for artwork related to the track. The user may select an artwork file using screen 2021A, and the software then associates the selected artwork with the track. The artwork may then appear in media window 1207, if desired. Copy to Clipboard command 2004, which is accessible from Edit menu 1802 as well as from subscreen 2031A, copies the artwork to the operating system clipboard, so that it may be pasted in other applications as desired. Paste from Clipboard command 2005, which is accessible from Edit menu 1802 as well as from subscreen 2031A, pastes artwork that was previously stored in the operating system clipboard to subscreen 2031A, thereby associating the artwork with the track. Remove Art button 2006 removes the artwork from association with the track. Load Album button 2011C loads an entire album into screen 2001A. Select All in Playlist command 2002 selects all the tracks in the current playlist, as shown in screen 2002A. Clear Playlist command 2003 removes all tracks from the current playlist, as shown in screen 2003A.

Lyrics tab 2032 provides access to subscreen 2032A, which provides a field for viewing and editing lyrics for the track. Notes tab 2033 provides access to subscreen 2033A, which provides a field for viewing and editing notes for the track. Bios tab 2034 provides access to subscreen 2034A, which provides a field for viewing and editing biographical information for the track.

More tab 2038 provides access to subscreen 2038A, which provides fields for viewing and editing additional information and characteristics describing the track. Subscreen 2038A contains Tempo field 2040 which allows selection from menu 2040A, Mood field 2041 which allows selection from menu 2041A, and Situation field 2042, which allows selection from menu 2042A.

Referring now to FIGS. 21A, 21B, 21C, 21D, 21E, and 21F, there are shown various interface elements for View menu 1803 items of a sample user interface of a jukebox that implements the present invention. Small Player View command 2101 activates miniaturized version 1208 of the player window. Full Player View command 2102 activates full-sized player window 1200. My Library command 2103 shows the user's music library 1205.

MusicMatch Radio command 2104 activates radio screens 2104A and 2104B for operating and controlling a personalized online radio station. Music Guide command 2105 activates Music Guide screen 2105A that displays information, offers, and recommendations related to the currently playing track. Now Playing command 2106 activates Now Playing screen 2106A showing track listing and other information related to the currently playing track. Recorder command 2107 activates Recorder screen 2107A providing controls for making recordings of tracks and track lists. Media Window command 2108 activates Media Window screen 2108A containing media window 1207 for displaying artwork, graphics, and other material. Buy CD Site command 2109 provides access to e-commerce web page 2109A where the user may purchase music related to the currently playing track.

Visualizations command 2110 provides access to functionality for presenting visual accompaniments to tracks being played (not shown). Sound Enhancement command 2111 provides access to controls for altering and enhancing the sound presentation (not shown). Auto Arrange Components command 2112 toggles between freeform arrangement 2112A of windows and structured arrangement 2112B. Always on Top command 2113 keeps the jukebox application on top of other windows, as shown in 2113A.

Figure 22A:
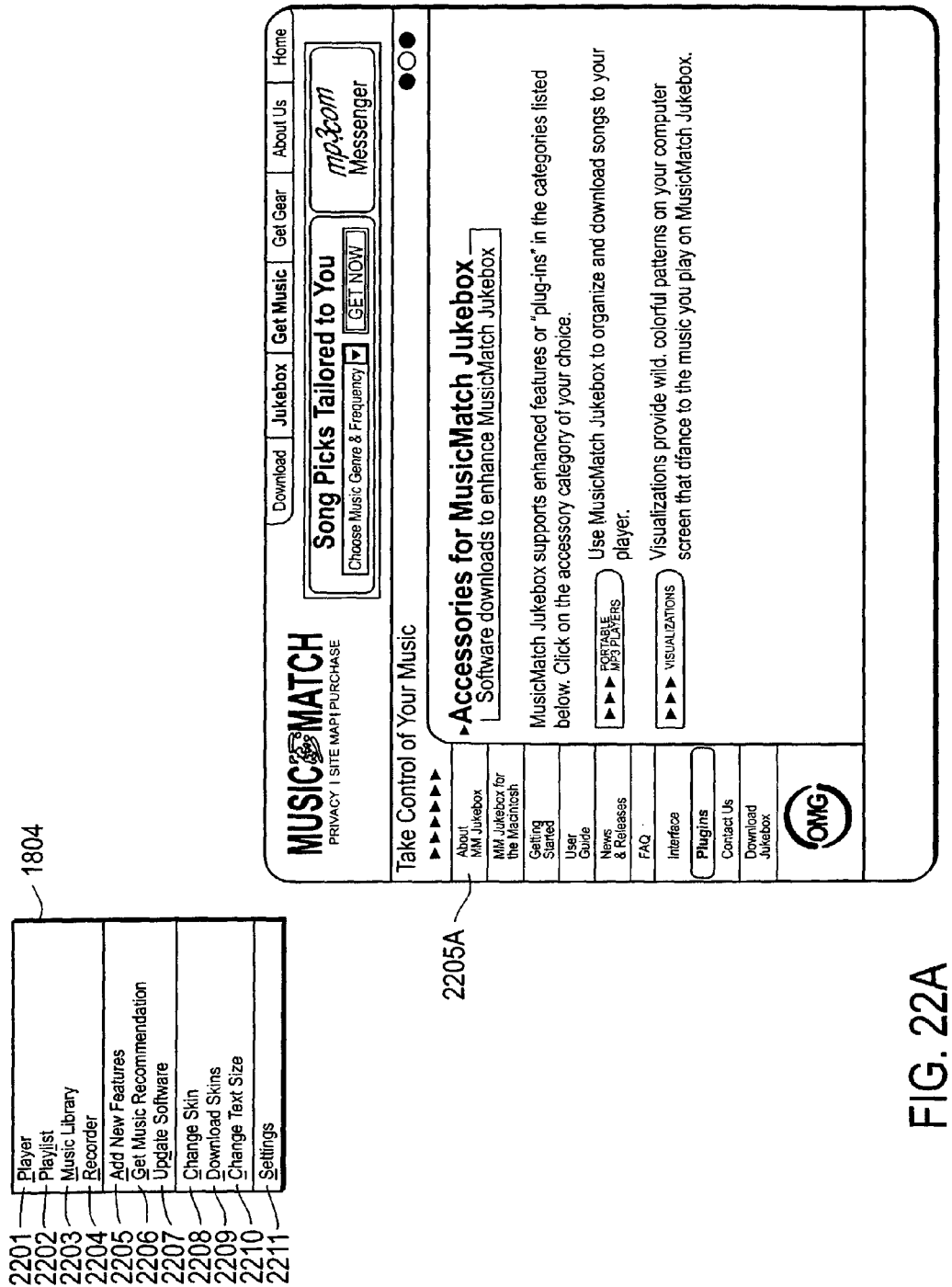
Figure 22B:
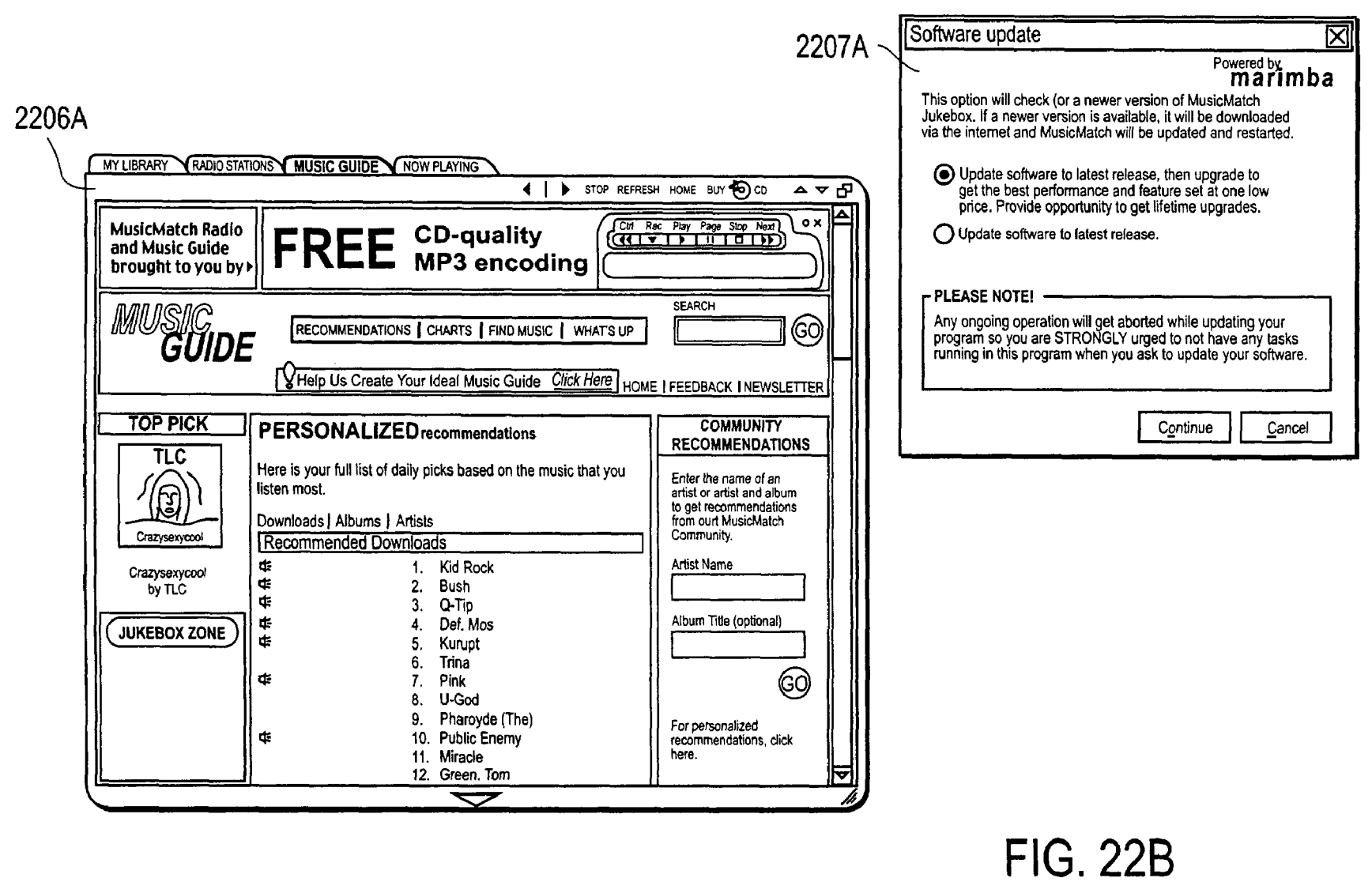
Figure 22C:
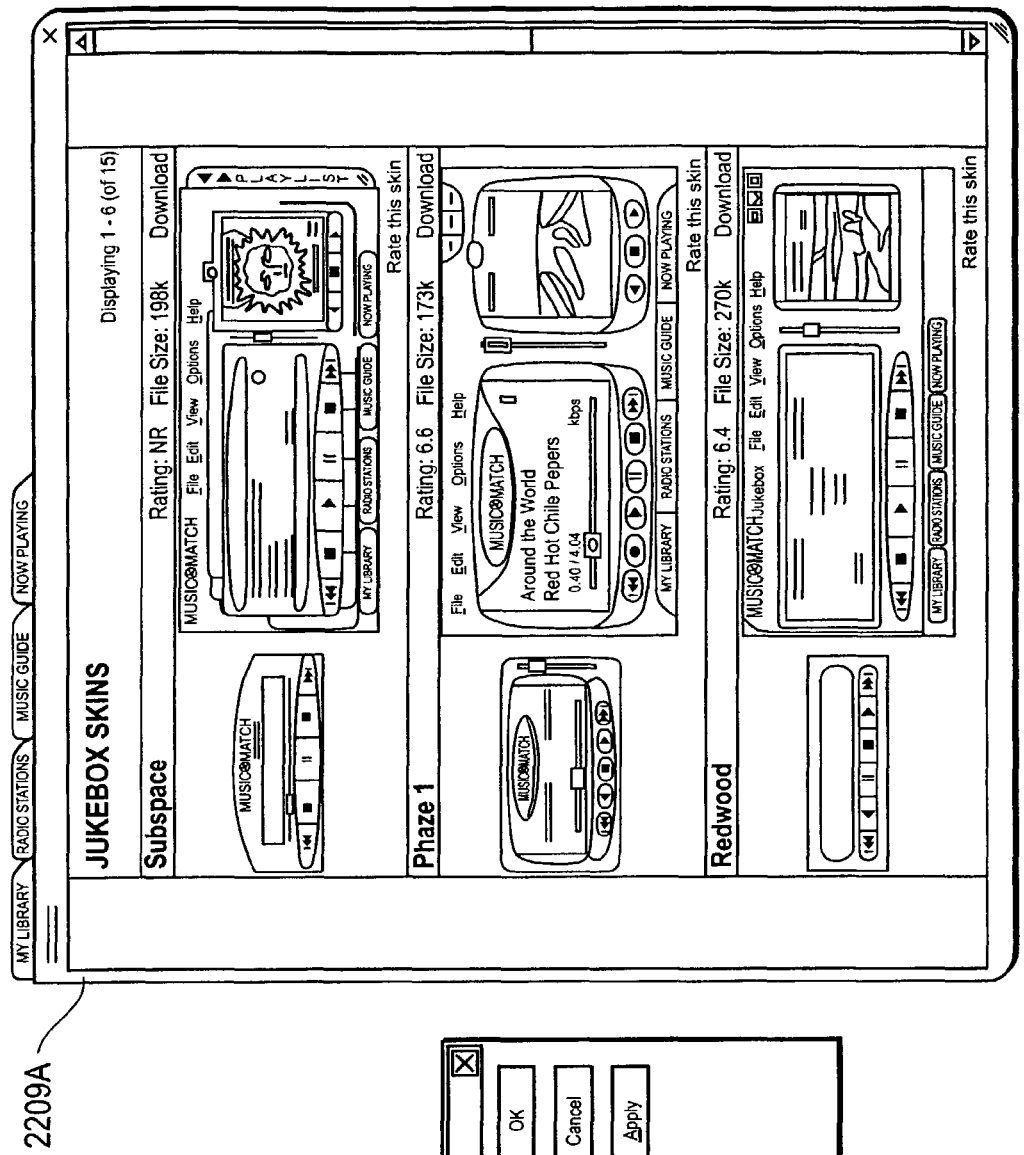
Figure 22C:
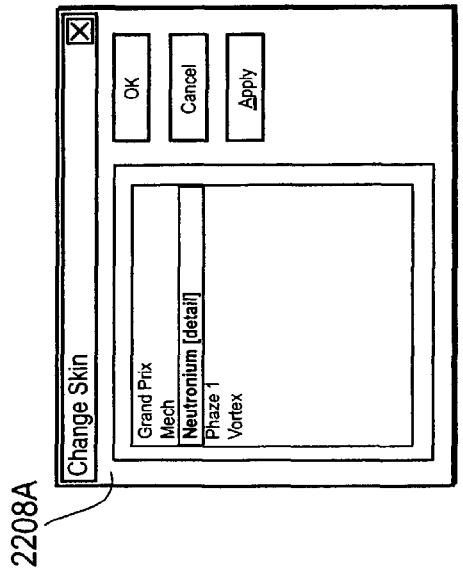
Figure 23A:
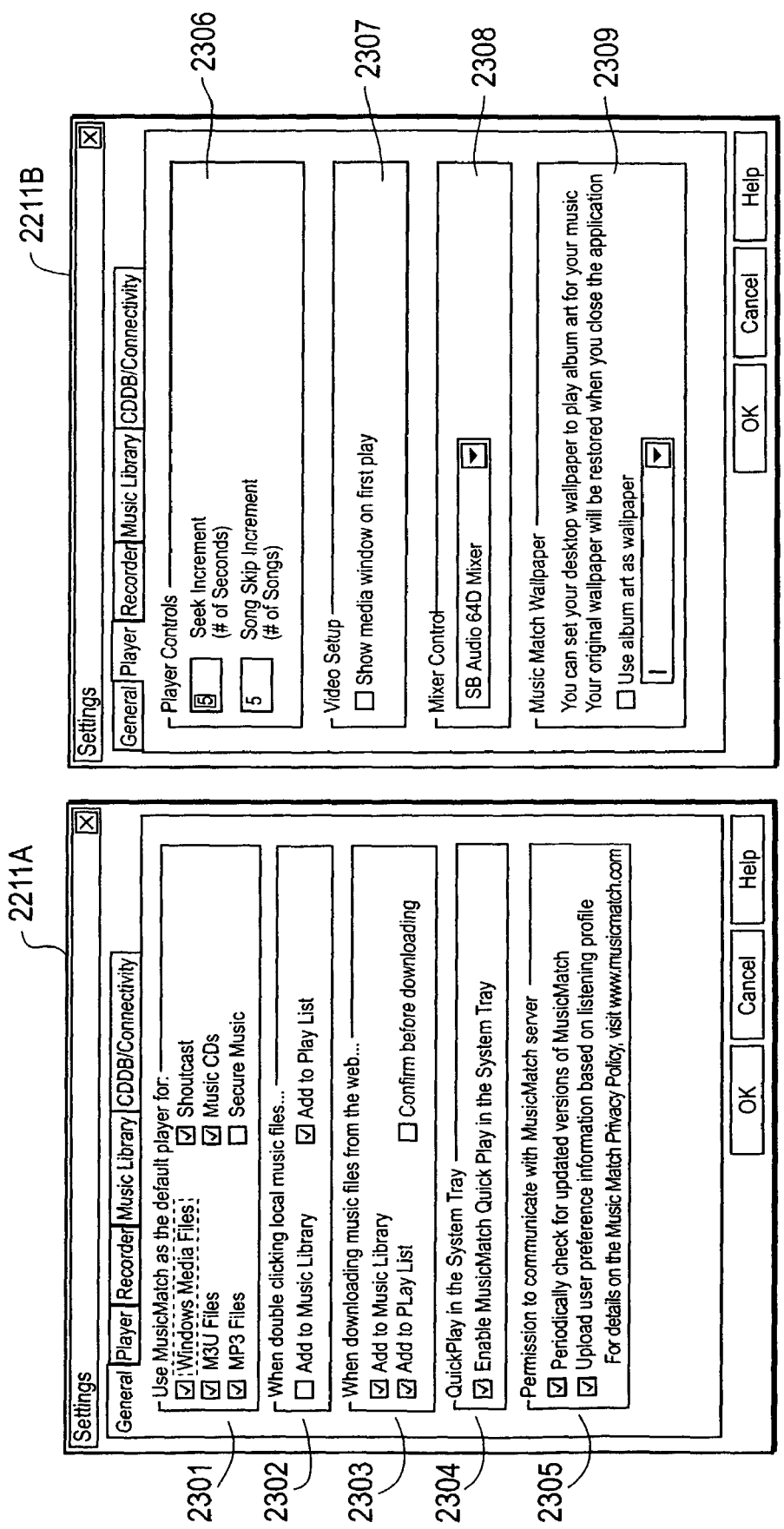

Referring now to FIGS. 22A, 22B, and 22C, there are shown various interface elements for Option menu 1804 items of a sample user interface of a jukebox that implements the present invention. Player command 2201 provides access to various commands described below in connection with FIG. 23D. Playlist command 2202 provides access to various commands described below in connection with FIGS. 23E and 23F. Music Library command 2203 provides access to various commands described below in connection with FIGS. 24A through 24C. Recorder command 2204 provides access to various commands described below in connection with FIGS. 25A through 25E. Add New Features command 2205 activates or provides access to screen 2205A for downloading and installing plug-ins providing additional functionality for the jukebox application.

Get Music Recommendations command 2206 activates music recommendations screen 2206A, which provides recommendations based on observation of user behavior, as described above. Update Software command 2207 activates Software Update screen 2207A, which provides functionality for downloading and installing the latest release of the client software in response to user instructions.

Change Skin command 2208 activates Change Skin screen 2208A, which provides alternatives for "skins," or themes for decorative user interface elements for selection by the user, as is known in the art. Download Skins command 2209 activates Download Skins screen 2209A, which allows the user to access, download, and install additional "skins" as desired.

Change Text Size command 2210 activates Change Text Size screen (not shown), which provides functionality for changing the size of text displayed in various user interface screens. Settings command 2211 provides access to Settings screens 2211A-2211E, which allow the user to specify various settings and preferences for operation of the software application.

General Settings screen 2211A allows the user to specify various general settings. In 2301, the user may specify which file types are to be played by the software application. In 2302, the user may specify the result of a double-click action. In 2303, the user may specify settings for downloading music files. In 2304, the user may specify whether a QuickPlay function is enabled in the System Tray. In 2305, the user may specify permission settings for communication with the central server.

Player Settings screen 2211B allows the user to specify various settings concerning the player application. In 2306, the user may specify seek increments and song skip increments. In 2307, the user may specify whether the media window appears on first play. In 2308, the user may specify the mixer to be used. In 2309, the user may enable and configure a wallpaper function that converts album art to background wallpaper.

Figure 23B:
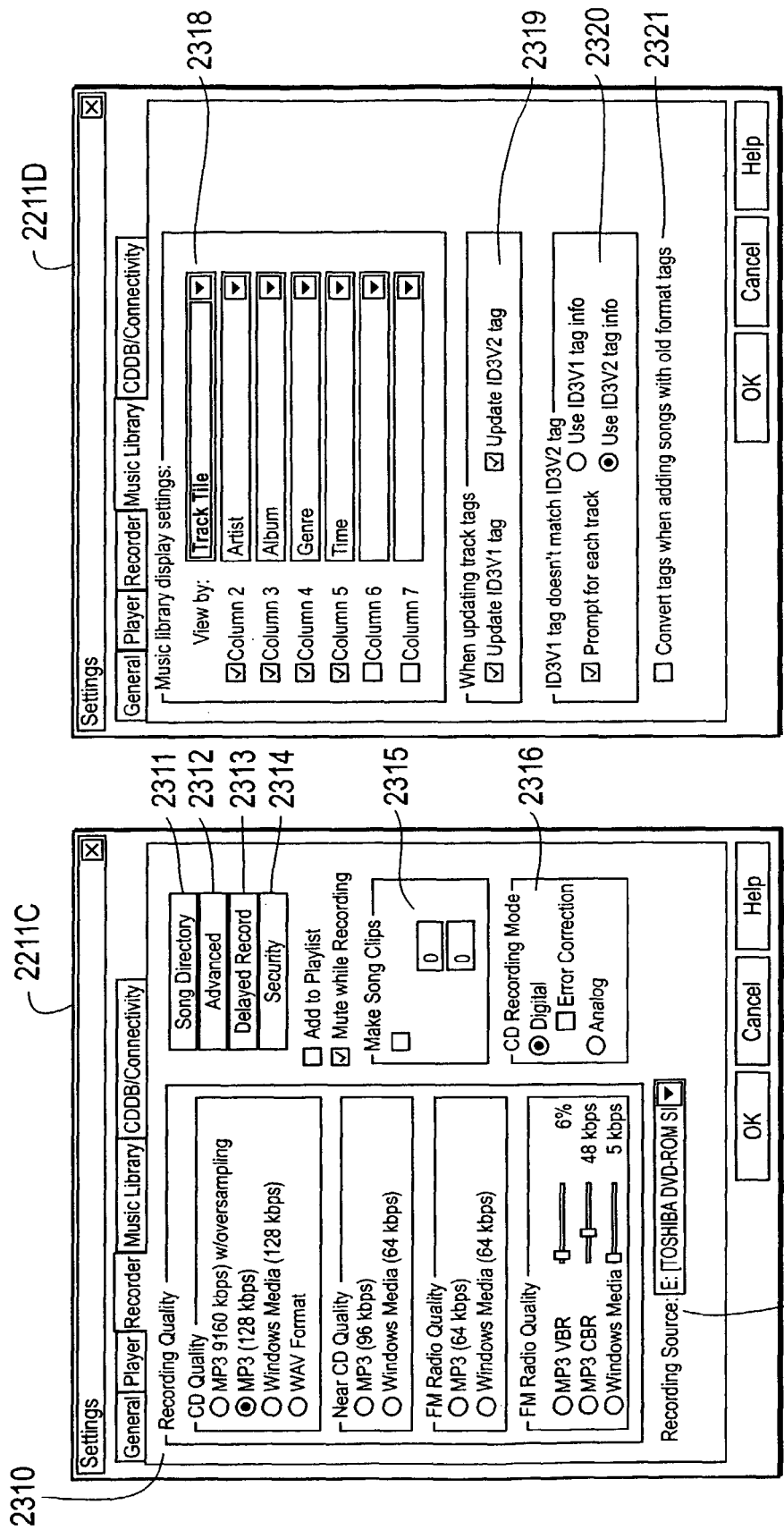
Figure 23C:
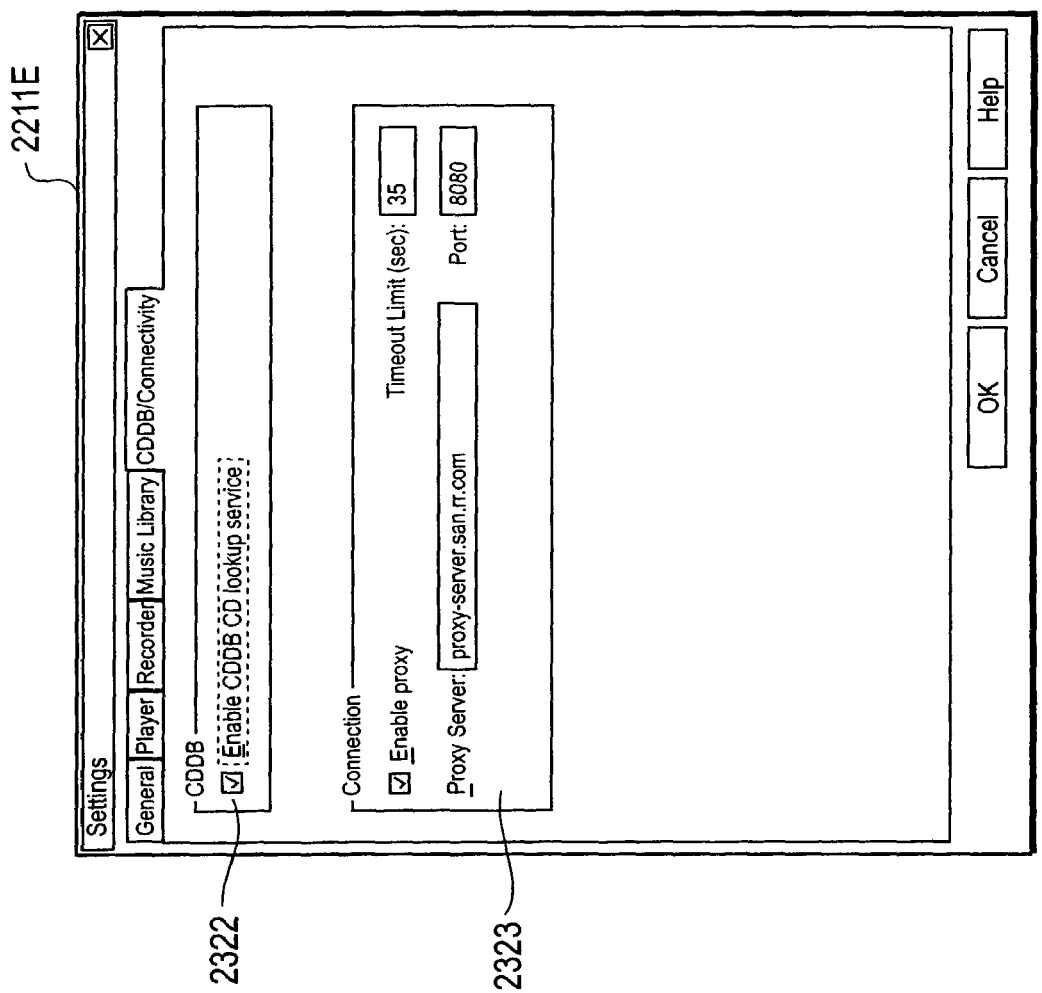

Recorder Settings screen 2211C allows the user to specify various settings concerning recording of music. In 2310, the user may specify and configure the recording quality. Button 2311 activates a navigation screen (not shown) for accessing a songs directory. Button 2312 activates a screen (not shown) for specifying advanced features. Referring also to FIG. 23G, button 2313 activates Delayed Recording screen 2313A for specifying delayed recordings. Button 2314 activates Digital Rights Management screen 2314A for configuring security attributes. In 2315, the user may enable and configure the creation of song clips. In 2316, the user may specify the recording mode for compact disc recording.

Music Library screen 2211D allows the user to specify various settings concerning the music library. In 2318, the user may specify display settings. In 2319, the user may specify tag updates. In 2320, the user may specify which tag is to be used when conflicts occur. In 2321, tag conversion may be enabled.

CDDB/Connectivity screen 2211E allows the user to specify various settings concerning compact disc database connectivity. In 2322, the user can enable the CDDB album lookup service. In 2323, the user can specify and configure the connection to the central server.

Figure 23D:
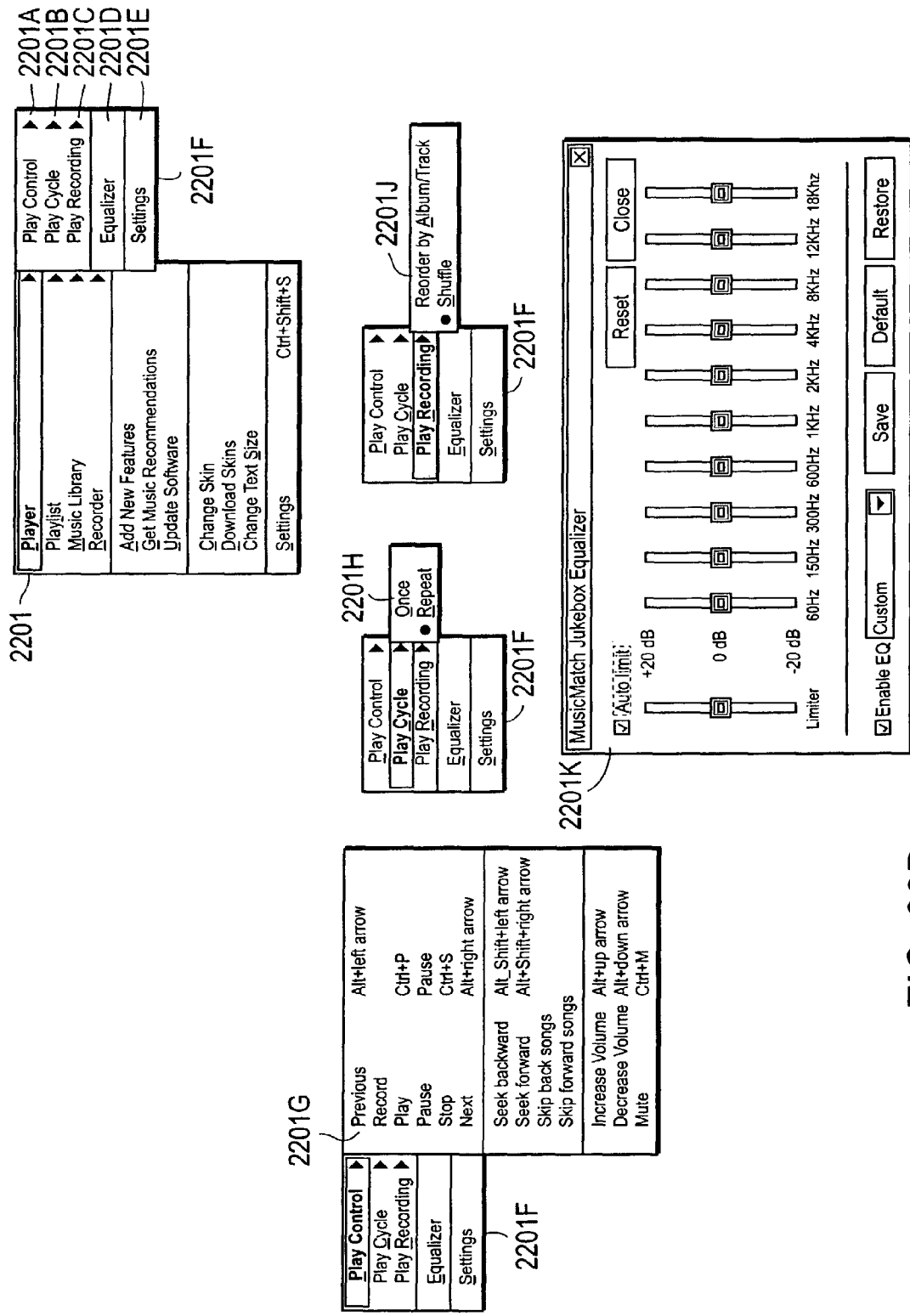

Referring now to FIG. 23D, there are shown various screens and menus associated with Player command 2201 of Options menu 1804. Player command 2201 provides access to Player submenu 2201F, which contains Play Control command 2201A, Play Cycle command 2201B, Play Reordering command 2201C, Equalizer command 2201D, and Settings command 2201E. Play Control command 2201A provides access to Play Control submenu 2201G, which contains commands related to the operation of the player application. Play Cycle command 2201B provides access to Play Cycle submenu 2201H, which allows the user to select between single play ("once") and repeated play ("repeat"). Play Reordering command 2201C provides access to Play Reordering submenu 2201J, which allows the user to select how tracks are to be reordered. Equalizer command 2201D activates Equalizer screen 2201K containing controls for a graphic equalizer. Settings command 2201F provides access to Settings screen 2211A as described above in connection with FIG. 23A.

Figure 23E:
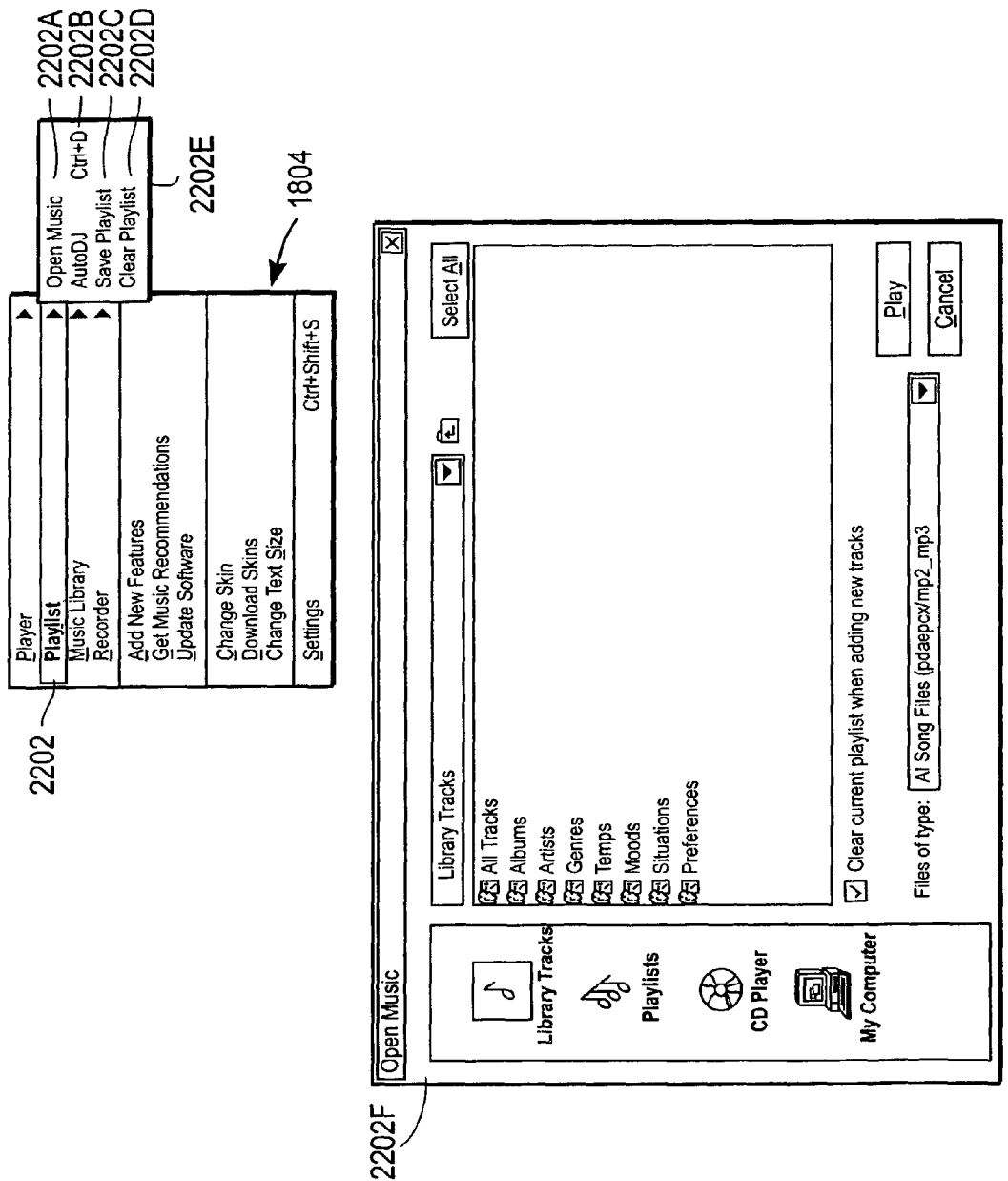
Figure 23F:
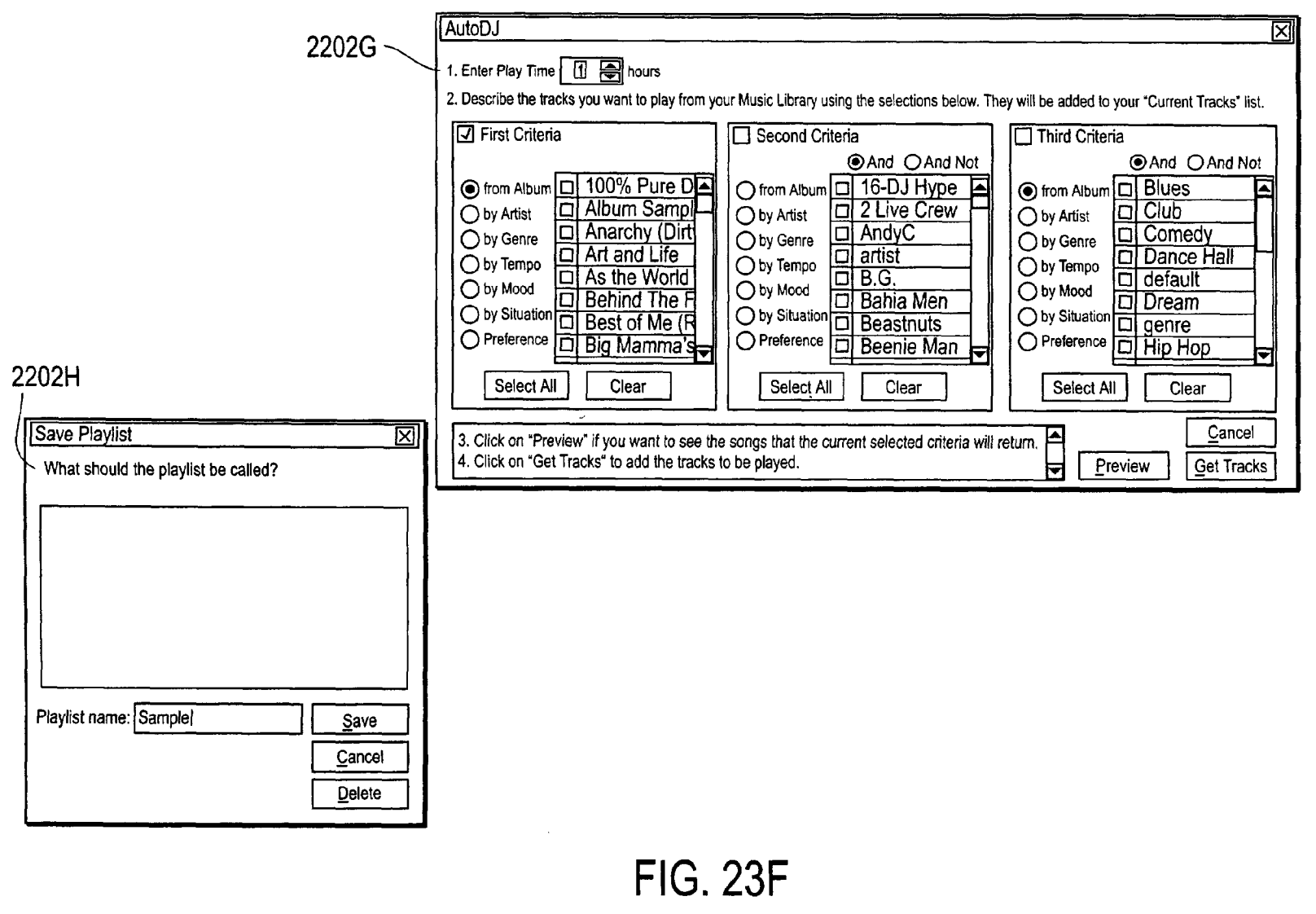
Figure 23G:
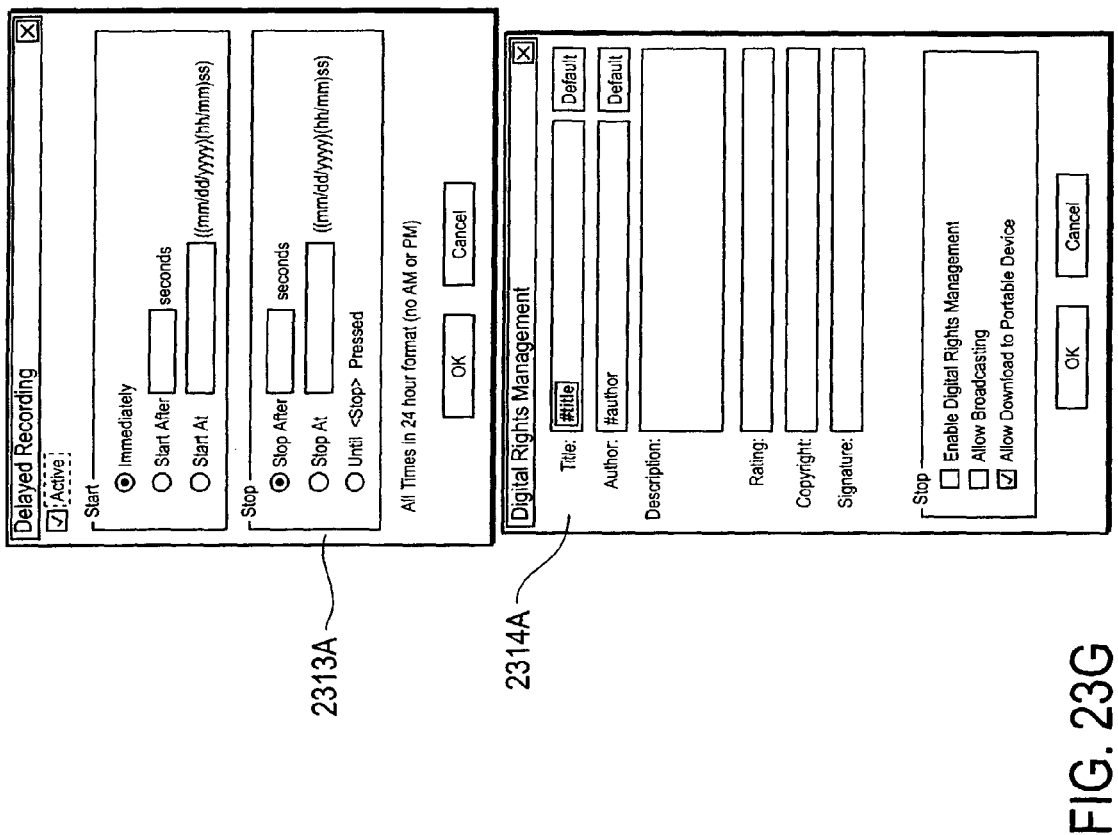

Referring now to FIGS. 23E and 23F, there are shown various screens and menus associated with Playlist command 2202 of Options menu 1804. Playlist command 2202 provides access to Playlist submenu 2202E, which contains Open Music command 2202A, AutoDJ command 2202B, Save Playlist command 2202C, and Clear Playlist command 2202D. Open Music command 2202A activates Open Music screen 2202F, which allows the user to open files containing music, located on a hard drive, remote server, compact disc, and the like. AutoDJ command 2202B activates AutoDJ screen 2202G, which allows the user to specify various criteria for adding musical selections to the music library. As seen in FIG. 23F, screen 2202G includes entry fields for specifying total play time, album preference, artist preference, genre preference, tempo preference, and the like. The software application retrieves tracks corresponding to the specified preferences. Save Playlist command 2202C activates Save Playlist screen 2202H, which allows the user to specify a name and location for the saved playlist file. Clear Playlist command 2202D clears the user's playlist.

Figure 24A:
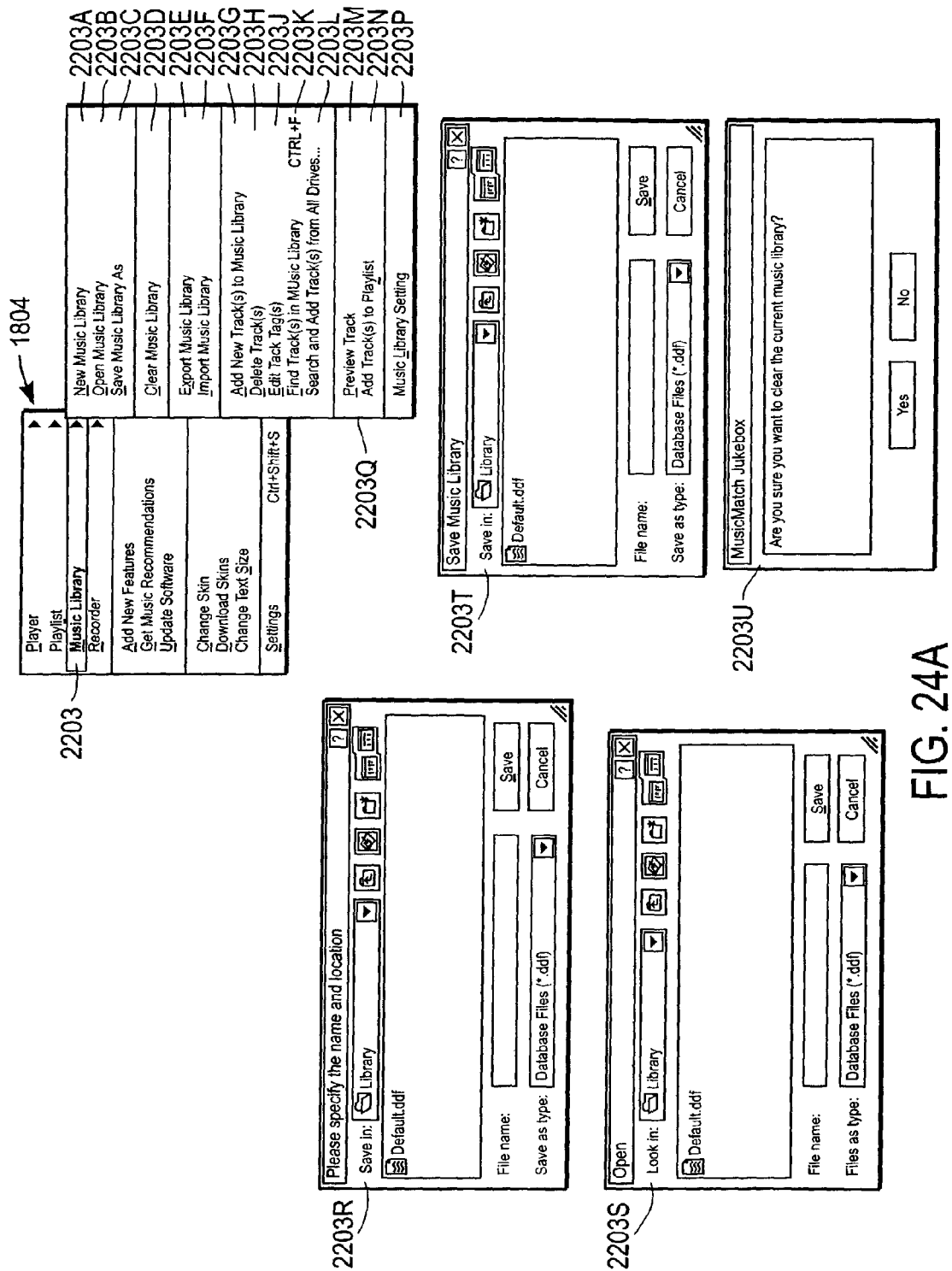
FIGS. 24A through 24C depict interface elements for Music Library menu items of a sample user interface of a jukebox that implements the present invention.
Figure 24B:
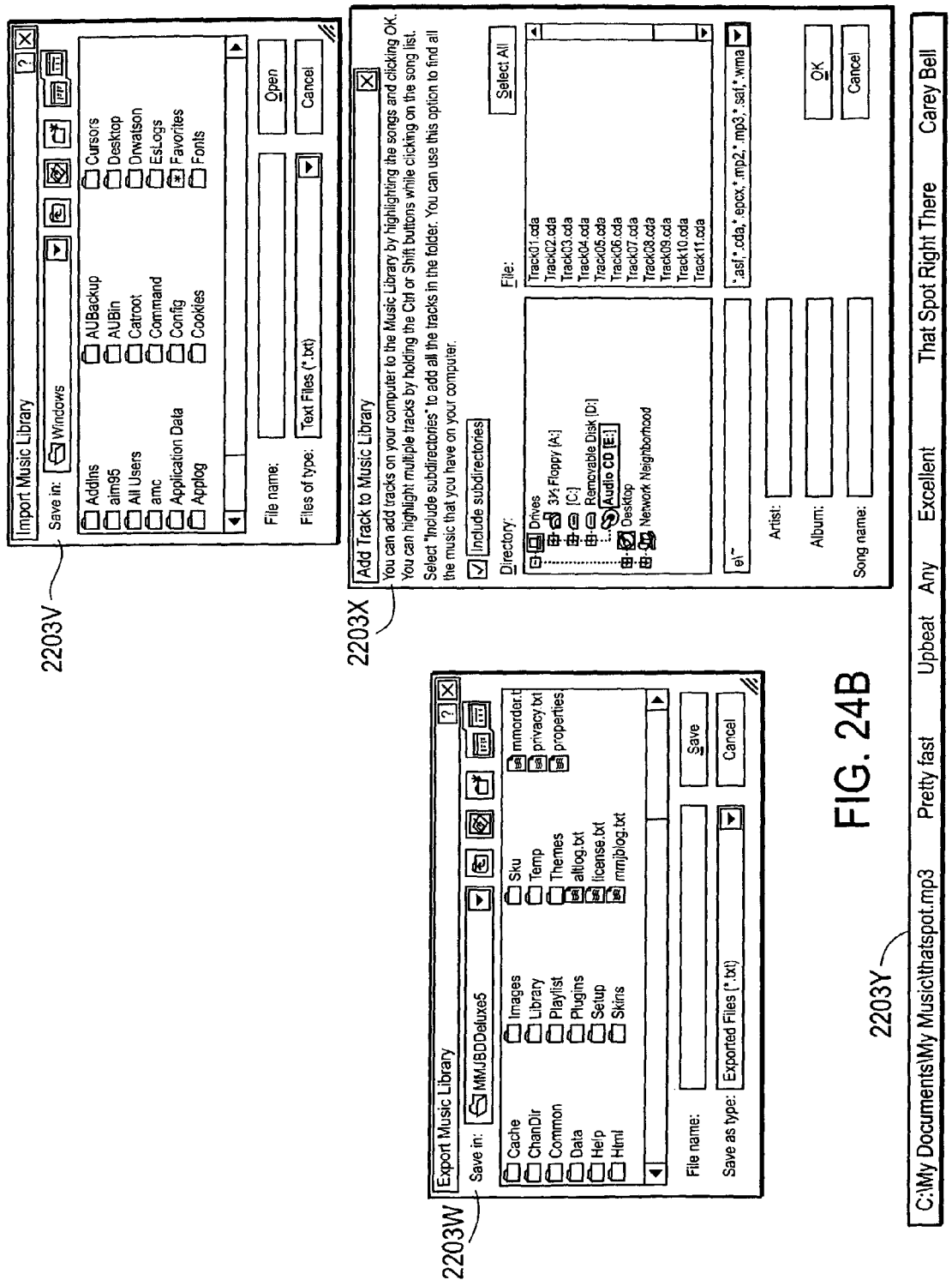
Figure 24C:
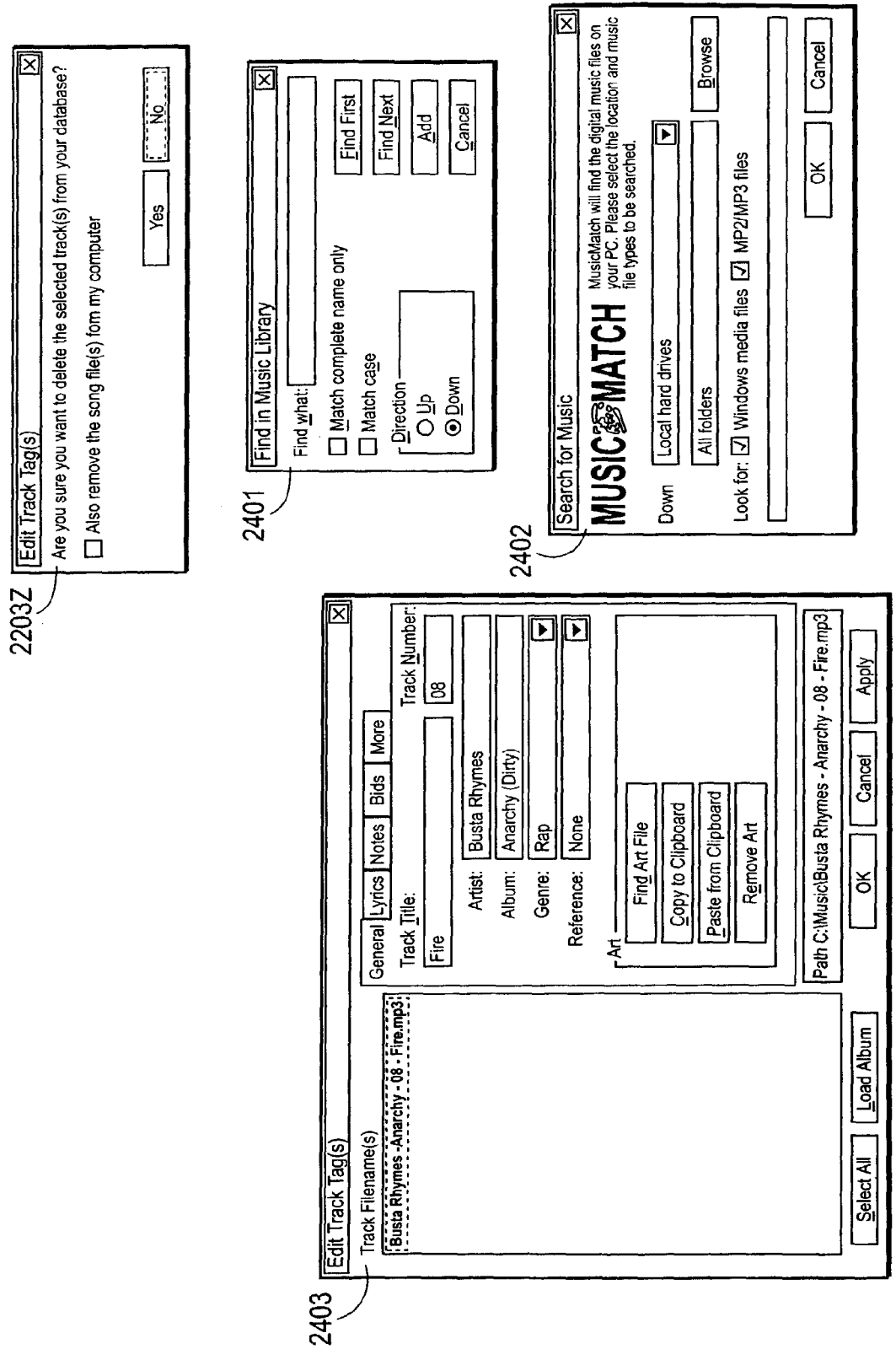

Referring now to FIGS. 24A through 24C, there are shown various screens and menus associated with Music Library command 2203 of Options menu 1804. Music Library command 2203 provides access to Music Library submenu 2203Q, which contains commands 2203A through 2203P, as described below.

New Music Library command 2203A activates screen 2203R for specifying the name and location of a new music library to be created. Open Music Library command 2203B activates Open screen 2203S for navigating among stored files and folders and indicating a music library file to be opened. Save Music Library As command 2203C activates Save Music Library screen 2203T for specifying a name and location for a music library to be saved. Clear Music Library command 2203D presents confirmation screen 2203U allowing the user to confirm that the currently open music library is to be cleared.

Export Music Library command 2203E activates Export screen 2203W for specifying the name, location, and file type for an exported copy of the music library. This command thus provides functionality for generating, storing, and transmitting music library files in any of a number of file formats. File excerpt 2203Y illustrates an example of a line of an exported file in a text format, as may be generated and saved in connection with Export Music Library command 2203E. Import Music Library command 2203F activates Import screen 2203V for specifying the name, location, and file type for a file to be imported as a music library. This command thus provides functionality for accessing music library files in any of a number of file formats. Add New Track(s) to Music Library command 2203G activates Add Tracks to Music Library screen 2203X, which provides functionality for identifying individual tracks, as may be stored on a hard drive, server, compact disc, or the like, to be added to the music library.

Delete Track(s) command 2203H presents confirmation screen 2203Z allowing the user to confirm that the selected track or tracks are to be deleted from the user's database. The user may also specify whether the associated song file or files should be removed from the user's computer. Edit Track Tag(s) command 2203J activates Edit Track Tag(s) screen 2403 providing functionality similar to screen 2001A described above in connection with FIG. 20B. Find Track(s) in Music Library command 2203K activates Find screen 2401 providing functionality for keyword searches in the user's music library. Search and Add Track(s) from All Drives command 2203L activates Search for Music screen 2402 providing functionality for searching the user's computer for digital music files so that the files may be added to the user's music library.

Preview Track command 2203M plays a track in a preview mode. Add Track(s) to Playlist command 2203N adds selected tracks to the user's current playlist. Music Library Settings command 2203P activates Music Library screen 2211D as described above in connection with FIG. 23B.

Figure 25A:
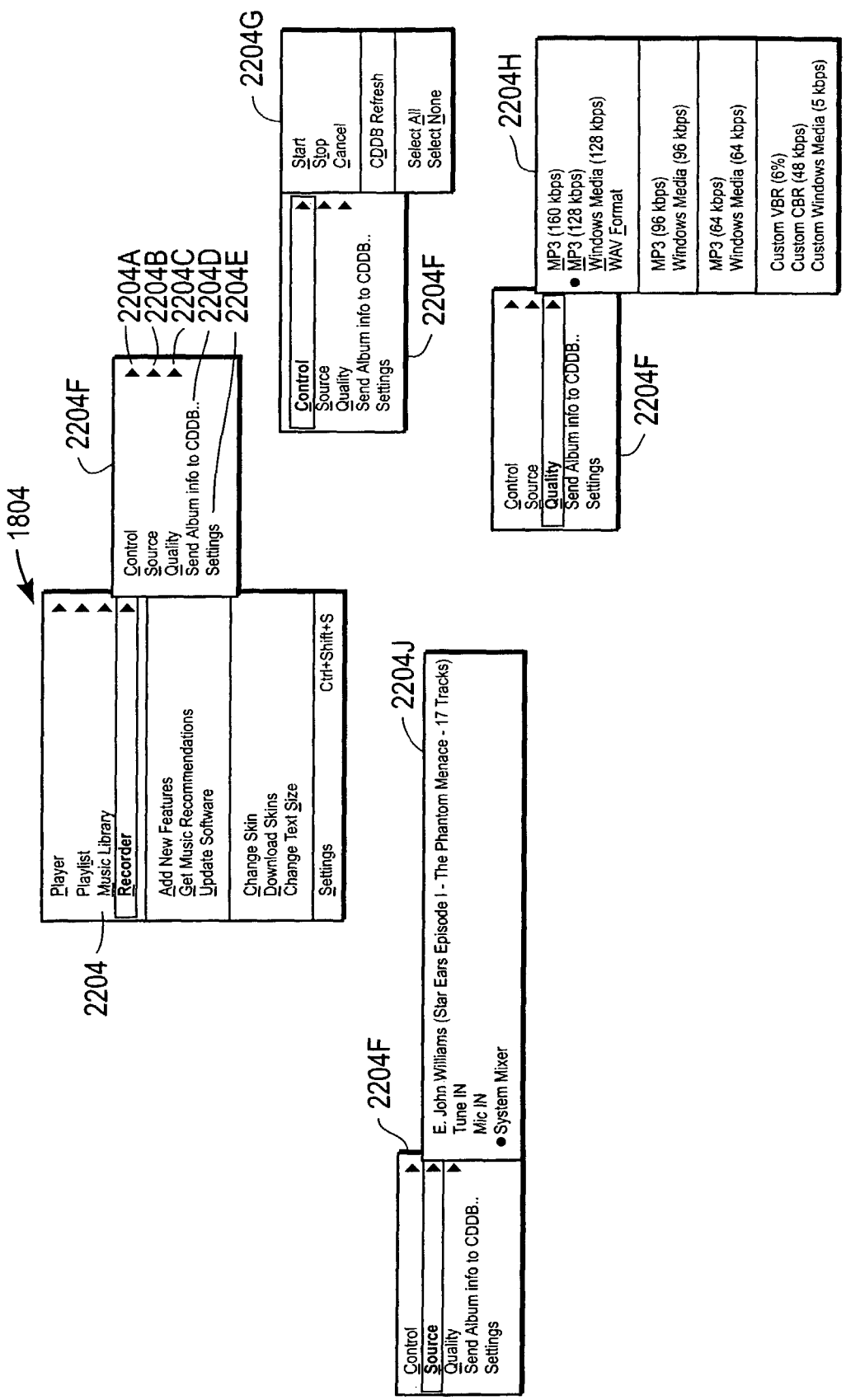
FIGS. 25A and 25B depict interface elements for Recorder menu items of a sample user interface of a jukebox that implements the present invention.
Figure 25B:
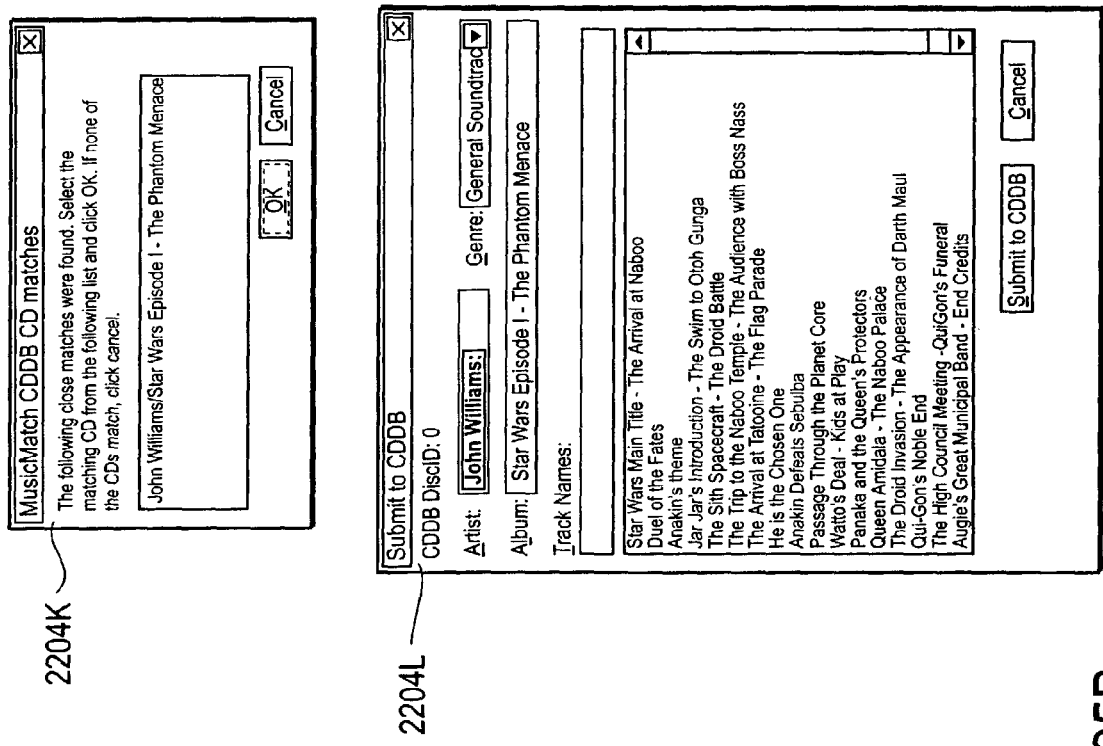
Figure 26A:
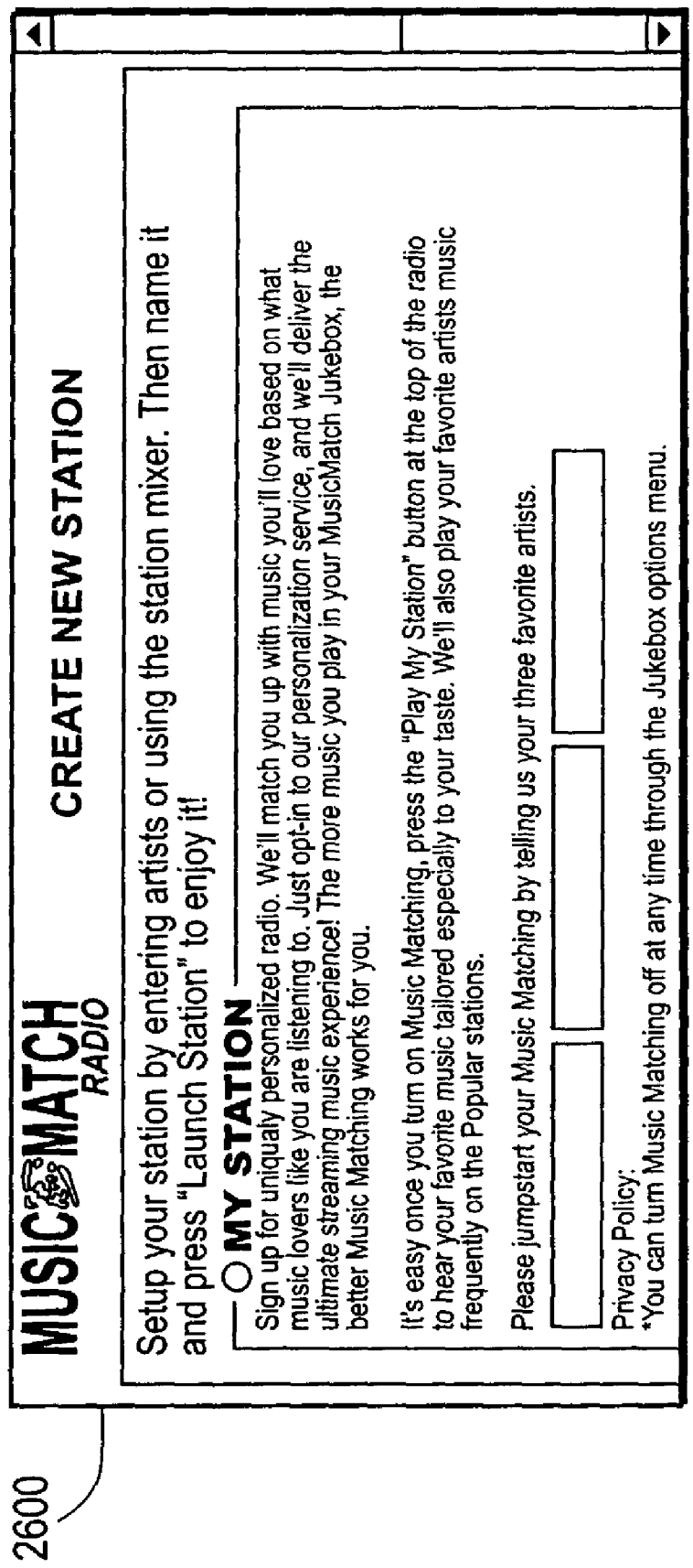
FIGS. 26A, 26B, 26C, and 26D depict interface elements for Radio menu items of a sample user interface of a jukebox that implements the present invention.
Figure 26B:
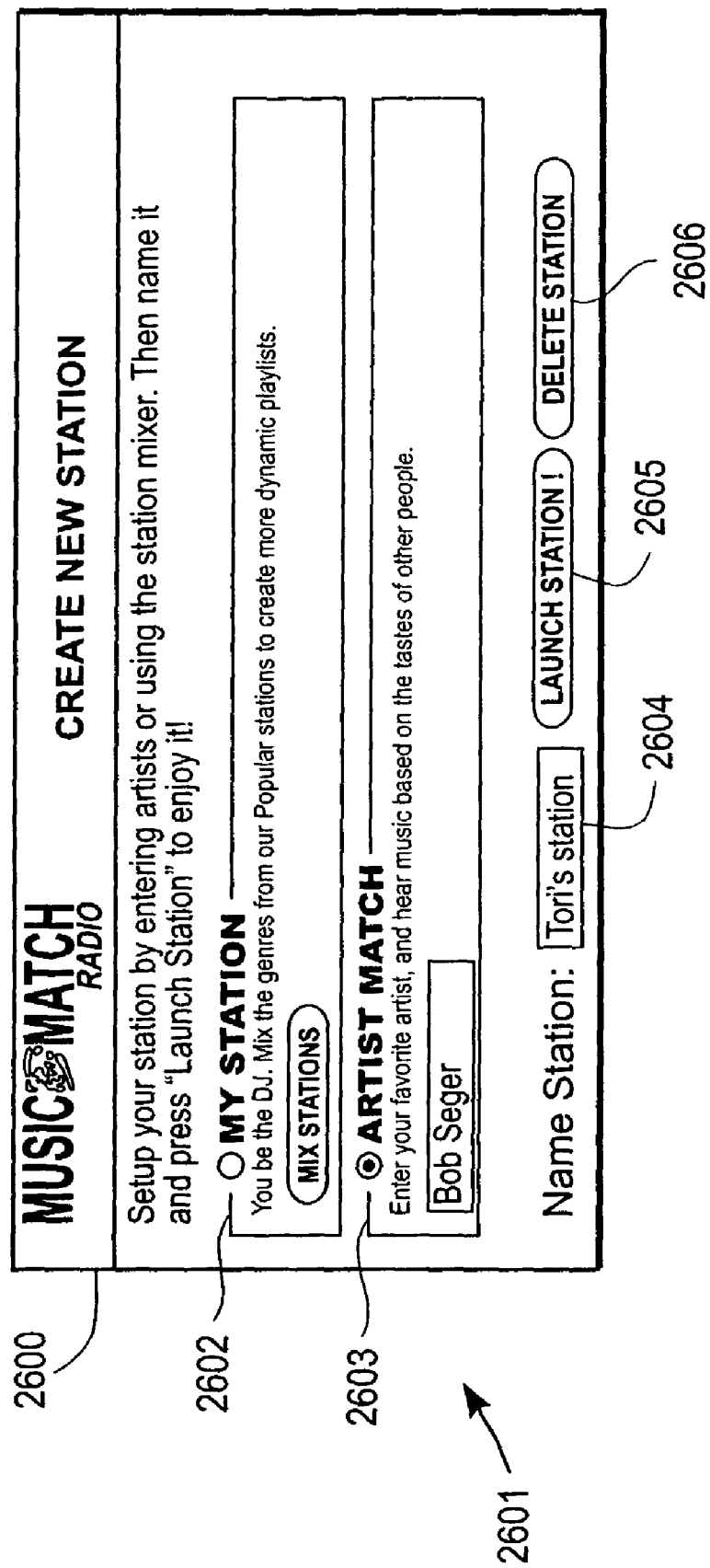
Figure 26C:
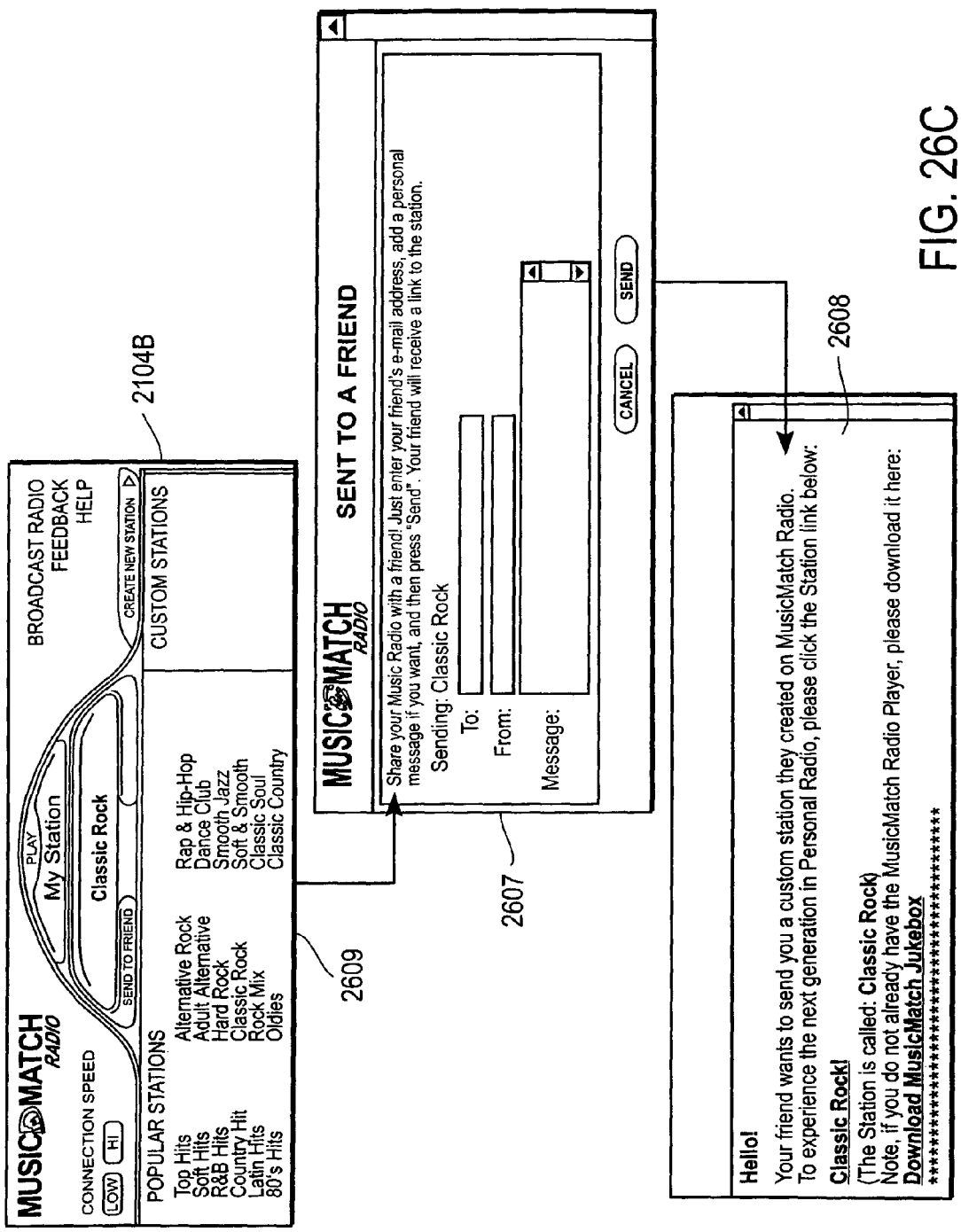
Figure 26D:
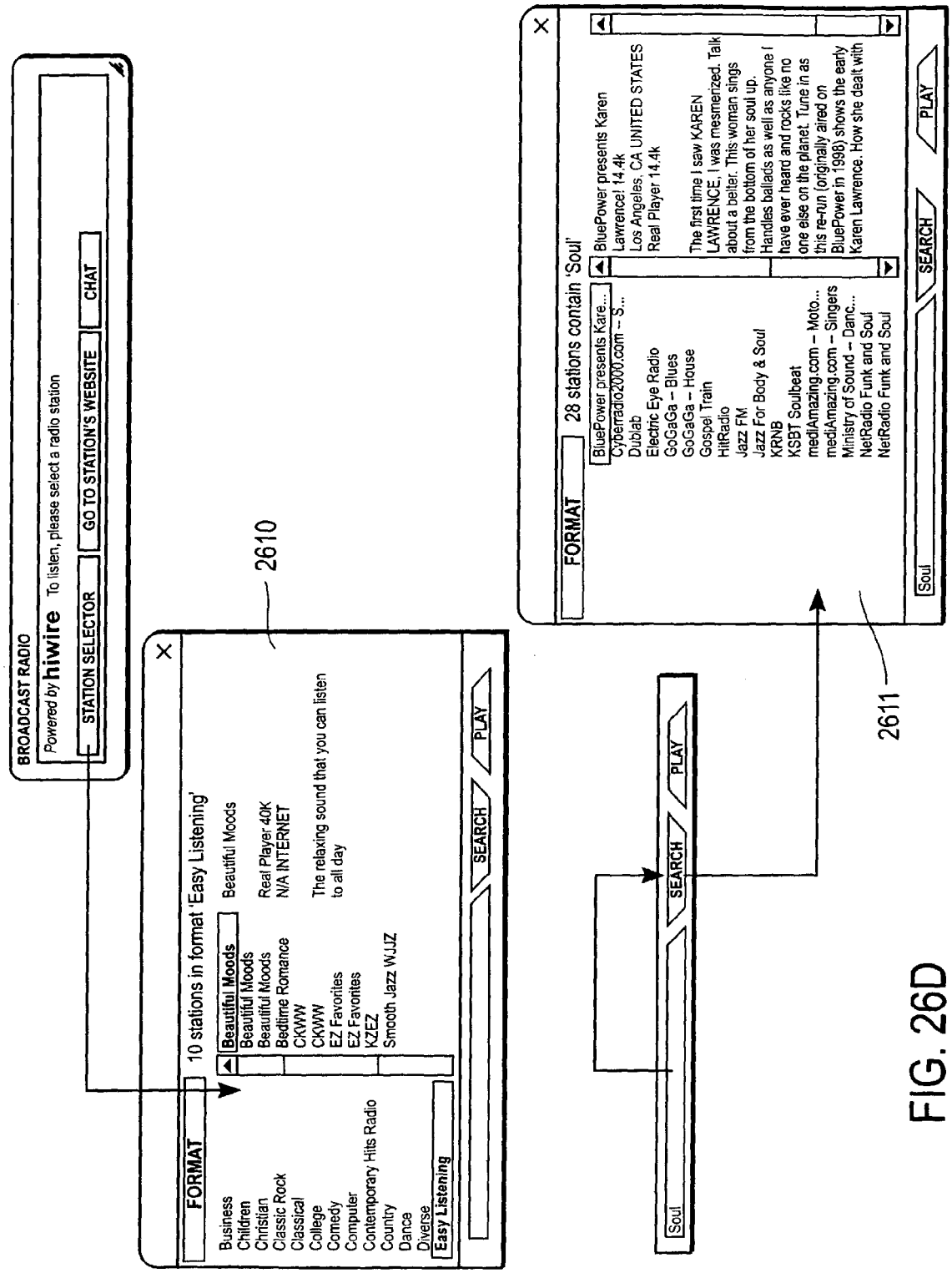

Referring now to FIGS. 25A and 25B, there are shown various screens and menus associated with Recorder command 2204 of Options menu 1804. Recorder command 2204 provides access to Recorder submenu 2204F, which includes Control command 2204A, Source command 2204B, Quality command 2204C, Send Album info to CDDB command 2204D, and Settings command 2204E. Control command 2204A provides access to submenu 2204G containing various commands related to control of the recorder. Source command 2204F provides access to submenu 2204J containing commands for selecting the source to be recorded, including for example a CD, line in, microphone in, and the like. Quality command 2204F provides access to submenu 2204H containing commands for specifying the format and quality level of the recording to be made.

Send Album info to CDDB command 2204D activates screen 2204K, which displays results of a search for database records matching the track being recorded. The user is given an opportunity to confirm the match, and, in Submit screen 2204L, to modify the information being transmitted. Settings command 2204E activates Recorder Settings screen 2211C described above in connection with FIG. 23B.

Referring now to FIGS. 26A through 26D, there are shown various screens and user interface elements for implementing a personalized radio station according to the techniques of one embodiment of the present invention. Screen 2600 provides controls for initializing a personalized radio station by accepting three favorite artists from the user. Alternatively, the user may initialize a personalized radio station based on the user's listening profile; this option may be specified in section 2305 of General Settings screen 2211A, as described above in connection with FIG. 23A. One advantage to this alternative method is that the user's history of music selections provides a more accurate profile of the user's preferences.

Create New Station screen 2601 provides functionality for configuring the personalized radio station. The user can select a Station Match function 2602, which allows the user to match existing predefined radio stations and to mix genres from two or more predefined stations. The user can also select an Artist Match function 2603, which provides musical selections based on the user's input regarding his or her favorite artist, as determined using the above-described techniques of the present invention. Input controls are also provided for naming the station 2604, launching the station 2605, and deleting the station 2606.

The user may also e-mail a link to the newly created station to another user, such as a friend. Screen 2104B provides various controls related to the operation of the personalized radio station. Send to Friend button 2609 activates screen 2607 for providing an e-mail address and message. The software application sends an e-mail message 2608 to the specified recipient, and includes a link to the personalized radio station. The recipient can then listen to the personalized radio station by clicking on the link.

Screens 2610 and 2611 provide functionality for selecting among predefined radio stations. The user can browse among various formats, as shown in screen 2610, or may view search results in screen 2611, based on a keyword search. The functionality of screens 2610 and 2611 may be used by the user to select two or more predefined radio stations to be combined to generate a personalized radio station.

Stream Delivery

As described above, the relationship discovery engine of the present invention may be implemented in conjunction with a personalized online radio station. In one embodiment, music is delivered to users in a streamed audio format. For example, radio sequence transmitter 121 may deliver units of data to jukebox 103 in a format wherein each unit encodes a period of music. Since radio stations typically repeat their programming several times, it is beneficial to cache the data units in order to reduce the amount of transmitted data. In addition, if a sufficiently large time scale is used, different channels of the radio station may have considerable overlap among currently playing selections that are being delivered to various users. By identifying these common units, transmitter 121 can take advantage of further economies of transmission, so as to provide more efficient delivery of audio data.

Using known compression methods, FM-quality music delivery can be provided with a bandwidth of approximately 32,000 bits per second, and AM-quality music delivery can be provided with a bandwidth of approximately 20,000 bits per second. CD-quality music delivery can be provided with a bandwidth of approximately 128,000 bits per second. Conventional channel capacities for users' Internet connections range from approximately 14,400 to 56,000 bits per second for dial-up modems, to one million (or more) bits per second for cable modems and ADSL connections. Channel capacities can vary from moment to moment, depending on current network conditions. Variability is particularly evident in shared access environments, such as LAN-based or cable modem connections. Thus, audio delivery as provided by transmitter 121 is, in one embodiment, designed to function despite such variations in channel capacities from user to user and from moment to moment.

In one embodiment, transmitter 121 employs scalable coding to increase the quality of audio output despite limitations in channel capacity. Audio data is categorized so that low-quality audio can be produced using the primary information, while secondary information can be combined with the primary information to enhance output quality. In one embodiment, additional levels of information may also be provided, each of which can be combined with the lower levels to further enhance output quality. Thus, by caching lower-quality audio and later combining it with subsequently received secondary information, jukebox 103 is able to increase the quality of the audio output.

Specifically, the first time an audio track is transmitted, transmitter 121 provides jukebox 103 with the primary information first. Secondary (and additional) information is transmitted as time permits. Jukebox 103 outputs the audio track with whatever level of information it has received at the time output is to commence. If only primary information has been received, jukebox 103 outputs lower-quality audio. If secondary information has been received, it is combined with the primary information and jukebox 103 outputs higher-quality audio.

In addition, jukebox 103, in one embodiment, caches the received information. If the same audio track is requested at a later time, transmitter 121 provides jukebox 103 with the next level of information. Therefore, even if jukebox 103 was unable to provide higher-quality audio during the first listening, it may be able to provide higher-quality audio during subsequent listenings, by combining secondary (and/or additional) information with the previously cached primary information to generate the higher-quality audio output. Such a technique facilitates the output of high quality audio even when network transmission capacities are limited.

Figure 27A:
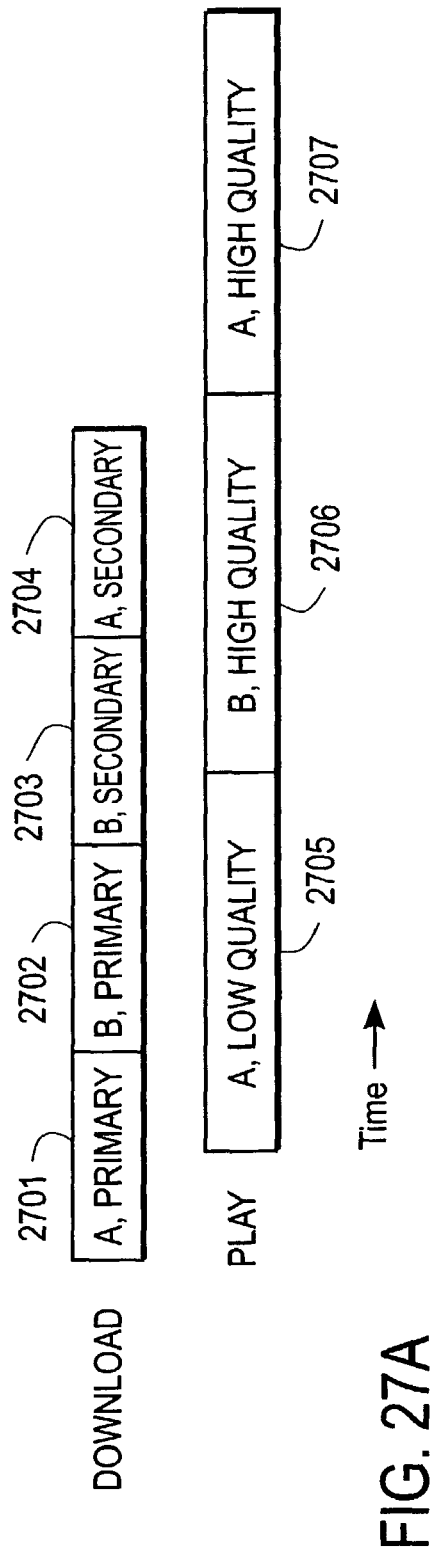
FIGS. 27A and 27B depict examples of scalable coding according to one embodiment of the present invention.

Referring now to FIG. 27A, there is shown an example of a transfer sequence for a channel with moderate bandwidth. Initially, tracks A and B are requested. Primary information for track A 2701 is downloaded. As primary information 2701 is downloaded, a low-quality version of track A 2705 is played, according to conventional streaming audio techniques. Downloaded primary information 2701 is cached.

Once the download of primary information for track A 2701 is complete, jukebox 103 begins to download primary information for track B 2702. This download may begin even though track A is still playing 2705. In the example shown in FIG. 27A, the download of primary information for track B 2702 is completed while track A is still playing 2705. Therefore, jukebox 103 begins to download secondary information for track B 2703. Then, when playback 2705 of track A is finished, jukebox 103 is able to output a high quality version of track B 2706, by combining secondary information 2703 with previously downloaded primary information 2702. The output of the high quality version 2706 may take place while secondary information 2703 is still being downloaded, again using streaming techniques.

In the example of FIG. 27A, a request to play track A a second time is received. Therefore, once secondary information 2703 has been downloaded, jukebox 103 begins to download secondary information for track A 2704. Once the high quality version of track B 2706 is finished playing, jukebox 103 outputs a high quality version of track A 2707, by combining secondary information 2704 with previously downloaded primary information 2701.

Figure 27B:
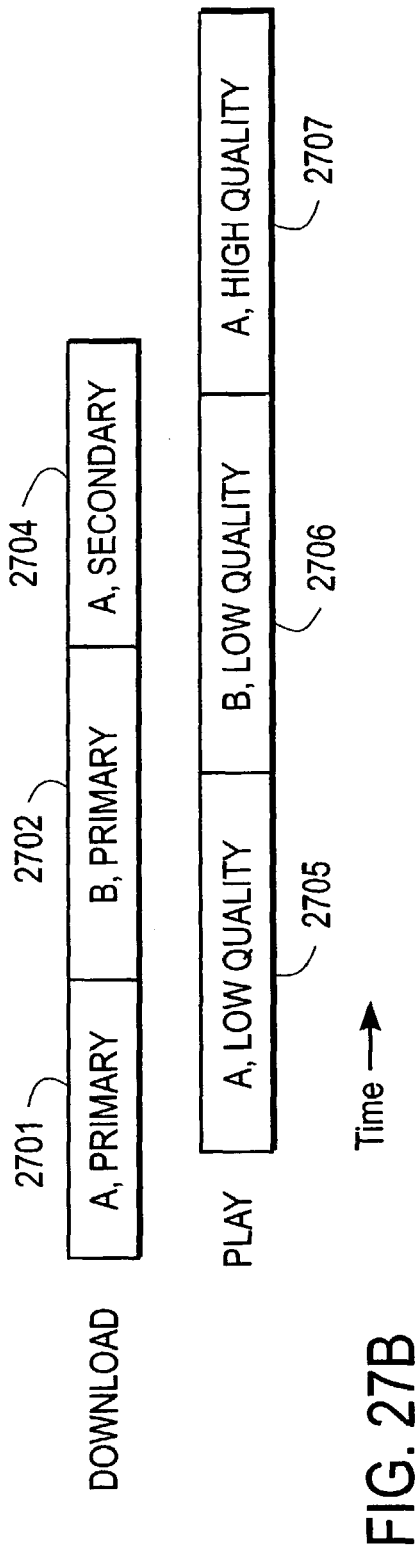

Referring now to FIG. 27B, there is shown another example of a transfer sequence for a channel with a lower bandwidth than that of FIG. 27A. Here, the secondary information for track B 2703 is not downloaded, because it would not arrive in time to improve the output of track B. Accordingly, a lower quality version of track B 2708 is output in lieu of the higher quality version 2706 of FIG. 27A. However, the higher quality version of track A 2707 can still be presented, since there is sufficient time to download secondary information for track A 2704 before the second playback of track A commences.

One skilled in the art will recognize that the tracks depicted in FIGS. 27A and 27B may refer to individual songs, or song segments, or any other unit of information. One skilled in the art will further recognize that the scalable coding techniques described to video data, or to any other type of data, and are not limited to audio data.

The scalable coding techniques of the present invention thus facilitate the trading off of quality in bandwidth-limited situations, without requiring complex bandwidth estimation and determination. If insufficient bandwidth exists for the delivery of higher-quality versions, the system simply continues playing lower quality versions of tracks. No skipping, pausing, or other interruption of the audio stream is necessary. Jukebox 103 can determine whether to continue any particular transfer to improve the available quality or to download the next requested track, based on upcoming track selections. At any given moment, the next data segment to request can be determined by requesting th highest priority data segment from the next few audio segments. In one embodiment, priorities are defined to either play audio at a maximum short-term quality level or at a consistent quality level.

In one embodiment, jukebox 103 requests data for downloading according to the following order of priorities:

| Priority | Type of value |
|---|---|
| 1 | Primary information, next track |
| 2 | Secondary information, next track |
| 3 | Primary information, track after next |
| 4 | Secondary information, track after next |
| 5 | Tertiary information, next track |
| 6 | Tertiary information, track after next |
| 7 | Data for subsequent tracks |

One skilled in the art will recognize that any desired priority list may be provided. For example, if item 5 in this table is moved up to the third rank, the system will give more priority to high quality presentation at the possible expense of inconsistent quality on lower bandwidth connections.

In one embodiment, locally-cached downloaded data is stored in an encrypted or otherwise protected form, so as to prevent its abuse and to inhibit copyright infringement. In another embodiment, primary information is stored in an encrypted or otherwise protected form, but secondary and subsequent information is not, since the secondary and subsequent information is unusable without access to the primary information.

In one embodiment, jukebox 103 downloads audio files when the user is not actually listening to music, so as to facilitate improved usage of an otherwise idle network connection. Jukebox 103 determines which items are likely to be requested by a user, so that at idle times it can transfer data that is likely to be useful for rendering audio segments in the future. Such determination may be made, for example, using the learned artist relationships described above, in order to "guess" which tracks the user is most likely to request in the future. In one embodiment, secondary information for such "predicted" audio segments is downloaded first, so that encryption is not required unless and until the user actually requests the tracks and the primary information is to be downloaded.

Scalable coding may also be used to process, a signal of a conventional broadcast radio station that plays music. An audio recognition device, as is conventional, pre-processes the signal in order to identify individual songs. Those portions of audio information that are not music are compressed and stored, and a transfer sequence is sent to jukebox 103 that references these recently encoded non-music segments as well as previously known and cached musical segments. The recently encoded segments can be encoded at a lower quality level in order to allow a jukebox 103 connected by a low speed line to transfer the recently encoded segments in real-time while still playing the cached musical segments at a higher quality level.

From the above description, it will be apparent that the invention disclosed herein provides a novel and advantageous system and method for relationship discovery. The foregoing discussion discloses and describes merely exemplary methods and embodiments of the present invention. As will be understood by those familiar with the art, the invention may be embodied in other specific forms without departing from the spirit or essential characteristics thereof. For example, the invention may be applied to other domains and environments, and may be employed in connection with additional applications where personalized recommendations are desirable. Accordingly, the disclosure of the present invention is intended to be illustrative, but not limiting, of the scope of the invention, which is set forth in the following claims.

What is claimed is:

1. A computer-implemented method comprising:
   accepting, by at least one computer, input specifying at least one track;
   selecting, by the at least one computer, a set of play logs from a corpus of play logs, each play log in the corpus corresponding to a user and being used to identify track occurrences from observed behavior of the user, each play log in the set is selected by taking into account a number of occurrences of the at least one track in the play log; and
   selecting, by the at least one computer, a set of tracks for a playlist from a corpus of tracks comprising tracks found in the set of play logs selected, wherein selecting the set of tracks comprises analyzing track occurrences identified from observed behavior indicated in each play log in the selected set and track occurrences identified from observed behavior indicated in the corpus of play logs, each track in the selected set of tracks is determined to be overrepresented in the selected set of play logs based on a significance measurement for the track that takes into account multiple occurrences of the track in a play log.

2. The computer-implemented method of claim 1, wherein selecting the set of tracks further comprises:
   selecting a track to be a part of the set of tracks using a degree of co-occurrence of the track with the specified at least one track in the selected set of play logs.

3. The computer-implemented method of claim 1, wherein learned relationships exist among the tracks found in the selected set of play logs, and wherein selecting the set of tracks further comprises:
   selecting the set of tracks using the learned relationships among tracks.

4. The computer-implemented method of claim 1, wherein selecting the set of tracks further comprises:
   selecting a set of tracks responsive to parameters provided by one user.

5. The computer-implemented method of claim 1, wherein each track comprises a music track.

6. The computer-implemented method of claim 1, wherein each track comprises a video track.

7. The computer-implemented method of claim 1, further comprising transmitting, by the at least one computer, the set of tracks.

8. The computer-implemented method of claim 1, wherein selecting the set of tracks further comprises :
   selecting a track to be a part of the set of tracks using information indicating a frequency with which the track has been played for one user.

9. The computer-implemented method of claim 1, wherein selecting the set of tracks further comprises:
   selecting a track to be a part of the set of tracks using information indicating a frequency with which the track has been played for a group of users.

10. The computer-implemented method of claim 1, wherein selecting the set of tracks further comprises:
    selecting a track to be a part of the set of tracks using information indicating an overall popularity of the track.

11. The computer-implemented method of claim 1, wherein selecting the set of tracks further comprises:
    selecting a track to be a part of the set of tracks using information indicating a popularity of the track within a demographic group.

12. The computer-implemented method of claim 1, wherein selecting the set of tracks further comprises:
selecting a track to be a part of the set of tracks using information indicating how recently the track has been played for one user.

13. The computer-implemented method of claim 1, wherein selecting the set of tracks further comprises:
selecting a track to be a part of the set of tracks using information indicating how recently the track has been played for a group of users.

14. The computer-implemented method of claim 1, wherein selecting the set of tracks further comprises:
selecting a track to be a part of the set of tracks using information indicating that the track has not yet been played for one user.

15. The computer-implemented method of claim 1, wherein selecting the set of tracks further comprises:
selecting a track to be a part of the set of tracks using information indicating that the track has not been played for a user within a predefined period of time.

16. The computer-implemented method of claim 1, wherein selecting the set of tracks further comprises:
selecting a track to be a part of the set of tracks using information indicating user preferences.

17. The computer-implemented method of claim 1, wherein selecting the set of tracks further comprises:
selecting a track to be a part of the set of tracks using information indicating user genre preferences.

18. The computer-implemented method of claim 1, wherein selecting the set of tracks further comprises:
selecting a track to be a part of the set of tracks using information indicating a detected user action with respect to the track.

19. The computer-implemented method of claim 18, wherein the detected user action comprises changing a volume level during playback of the track.

20. The computer-implemented method of claim 18, wherein the detected user action comprises skipping at least a portion of the track.

21. The computer-implemented method of claim 18, wherein the detected user action comprises repeating at least a portion of the track.

22. A computer-implemented method comprising:
accepting input specifying at least one artist;
selecting, by at least one computer, a set of play logs from a corpus of play logs, each play log in the corpus corresponding to a user and being used to identify artist occurrences from observed behavior of the user, each play log in the set is selected by taking into account a number of occurrences of the at least one artist found in the play log; and
selecting, by the at least one computer, a set of artists for a playlist from a corpus of artists comprising artists found in the set of play logs selected, wherein selecting the set of artists comprises analyzing artist occurrences identified from observed behavior indicated in each play log in the selected set and artist occurrences identified from observed behavior indicated in the corpus of play logs, each artist in the selected set of artists is determined to be overrepresented in the selected set of play logs based on a significance measurement for the artist that takes into account multiple occurrences of the artist in a play log.

23. The computer-implemented method of claim 22, wherein selecting the set of artists further comprises:
selecting an artist to be a part of the set of artists using a degree of co-occurrence of the artist with the specified at least one artist in the selected set of play logs.

24. The computer-implemented method of claim 22, wherein learned relationships exist among the artists found in the selected set of play logs, and wherein selecting the set of artists further comprises:
selecting the set of artists using the learned relationships among artists.

25. The computer-implemented method of claim 22, wherein selecting the set of artists further comprises:
selecting a set of artists responsive to parameters provided by one user.

26. The computer-implemented method of claim 22, wherein each artist comprises a musical artist.

27. The computer-implemented method of claim 22, wherein selecting the set of artists further comprises:
selecting an artist to be a part of the set of artists using information indicating a frequency with which one or more tracks by the artist have been played for one user.

28. The computer-implemented method of claim 22, wherein selecting the set of artists further comprises:
selecting an artist to be a part of the set of artists using information indicating a frequency with which one or more tracks by the artist have been played for a group of users.

29. The computer-implemented method of claim 22, wherein selecting the set of artists further comprises:
selecting an artist to be a part of the set of artists using information indicating an overall popularity.

30. The computer-implemented method of claim 22, wherein selecting the set of artists further comprises:
selecting an artist to be a part of the set of artists using information indicating a popularity of the artist within a demographic group.

31. The computer-implemented method of claim 22, wherein selecting the set of artists further comprises:
selecting an artist to be a part of the set of artists using information indicating how recently one or more tracks by the artist have been played for one user.

32. The computer-implemented method of claim 22, wherein selecting the set of artists further comprises:
selecting an artist to be a part of the set of artists using information indicating how recently one or more tracks by the artist have been played for a group of users.

33. The computer-implemented method of claim 22, wherein selecting the set of artists further comprises:
selecting an artist to be a part of the set of artists using information indicating that one or more tracks by the artist have not yet been played for one user.

34. The computer-implemented method of claim 22, wherein selecting the set of artists further comprises:
selecting an artist to be a part of the set of artists using information indicating that one or more tracks by the artist have not been played for the user within a predefined period of time.

35. The computer-implemented method of claim 22, wherein selecting the set of artists further comprises:
selecting an artist to be a part of the set of artists using information indicating user preferences.

36. The computer-implemented method of claim 22, wherein selecting the set of artists further comprises:
selecting an artist to be a part of the set of artists using information indicating user genre preferences.

37. The computer-implemented method of claim 22, wherein selecting the set of artists further comprises:
selecting an artist to be a part of the set of artists using information indicating a detected user action with respect to one or more tracks by the artist.

38. The computer-implemented method of claim 37, wherein the detected user action comprises changing a volume level during playback of the track by the artist.

39. The computer-implemented method of claim 37, wherein the detected user action comprises skipping at least a portion of the track by the artist.

40. The computer-implemented method of claim 37, wherein the detected user action comprises repeating at least a portion of the track by the artist.

41. A computer-implemented method comprising:
   accepting, by at least one computer, input specifying at least one artist;
   selecting, by the at least one computer, a set of play logs from a corpus of play logs, each play log in the corpus corresponding to a user and being used to identify artist occurrences from observed behavior of the user, each play log in the set is selected by taking into account a number of occurrences of the at least one artist in the play log; and
   selecting, by the at least one computer, a set of artists for a playlist from a corpus of artists comprising artists found in the set of play logs selected, wherein selecting the set of artists comprises analyzing artist occurrences identified from observed behavior indicated in each play log in the selected set and artist occurrences identified from observed behavior indicated in the corpus of play logs, each artist in the selected set of artists is determined to be overrepresented in the set of play logs based on a significance measurement for the artist that takes into account multiple occurrences of the artist in the play log; and
   selecting, by the at least one computer and for each of at least a subset of the artists, at least one track for the playlist.

42. The computer-implemented method of claim 41, wherein selecting the set of artists further comprises:
   selecting an artist to be a part of set of artists using a degree of co-occurrence of the artist with the specified at least one artist in the selected set of play logs.

43. The computer-implemented method of claim 41, wherein learned relationships exist among the artists found in the selected set of play logs, and wherein selecting the set of artists further comprises:
   selecting the set of artists using the learned relationships among artists.

44. The computer-implemented method of claim 41, wherein selecting the set of artists further comprises:
   selecting a set of artists responsive to parameters provided by one user.

45. The computer-implemented method of claim 41, wherein each track comprises a music track.

46. The computer-implemented method of claim 41, wherein each track comprises a video track.

47. The computer-implemented method of claim 41, further comprising transmitting, by the at least one computer, the set of tracks.

48. The computer-implemented method of claim 41, wherein selecting the set of artists further comprises:
   selecting an artist to be a part of the set of artists using information indicating a frequency with which one or more tracks by the artist have been played for one user.

49. The computer-implemented method of claim 41, wherein selecting the set of artists further comprises:
   selecting an artist to be a part of the set of artists using information indicating a frequency with which one or more tracks by the artist have been played for a group of users.

50. The computer-implemented method of claim 41, wherein selecting the set of artists further comprises:
   selecting an artist to be a part of the set of artists using information indicating an overall popularity.

51. The computer-implemented method of claim 41, wherein selecting the set of artists further comprises:
   selecting an artist to be a part of the set of artists using information indicating a popularity of the artist within a demographic group.

52. The computer-implemented method of claim 41, wherein selecting the set of artists further comprises:
   selecting an artist to be a part of the set of artists using information indicating how recently one or more tracks by the artist have been played for one user.

53. The computer-implemented method of claim 41, wherein selecting the set of artists further comprises:
   selecting an artist to be a part of the set of artists using information indicating how recently one or more tracks by the artist have been played for a group of users.

54. The computer-implemented method of claim 41, wherein selecting the set of artists further comprises:
   selecting an artist to be a part of the set of artists using information indicating that one or more tracks by the artist have not yet been played for one user.

55. The computer-implemented method of claim 41, wherein selecting the set of artists further comprises:
   selecting an artist to be a part of the set of artists using information indicating that one or more tracks by the artist have not been played for one user within a predefined period of time.

56. The computer-implemented method of claim 41, wherein selecting the set of artists further comprises:
   selecting an artist to be a part of the set of artists using information indicating user preferences.

57. The computer-implemented method of claim 41, wherein selecting the set of artists further comprises:
   selecting an artist to be a part of the set of artists using information indicating user genre preferences.

58. The computer-implemented method of claim 41, wherein selecting the set of artists further comprises:
   selecting an artist to be a part of the set of artists using information indicating a detected user action with respect to one or more tracks by the artist.

59. The computer-implemented method of claim 58, wherein the detected user action comprises changing a volume level during playback of a track by the artist.

60. The computer-implemented method of claim 58, wherein the detected user action comprises skipping at least a portion of a track by the artist.

61. The computer-implemented method of claim 58, wherein the detected user action comprises repeating at least a portion of a track by the artist.

62. A computer-implemented method comprising:
   accepting, by at least one computer, input specifying at least one track;
   determining, by the at least one computer, at least one artist for the specified at least one track;
   selecting, by the at least one computer, a set of play logs from a corpus of play logs, each play log in the corpus corresponding to a user and being used to identify artist occurrences from observed behavior of the user, each play log in the set is selected by taking into account a number of occurrences of the at least one artist found in the play log; and
   selecting, by the at least one computer, a set of artists for a playlist from a corpus of artists comprising artists found in the set of play logs selected, wherein selecting the set of artists comprises analyzing artist occurrences identified from observed behavior indicated in each play log in the selected set and artist occurrences identified from observed behavior indicated in the corpus of play logs, each artist in the selected set of artists is determined to be overrepresented in the selected set of play logs based on a significance measurement for the artist that takes into account multiple occurrences of the artist in the play log; and selecting, by the at least one computer and for each of at least a subset of the set of selected artists, at least one track for the playlist.

63. The computer-implemented method of claim 62, wherein selecting the set of artists comprises:
selecting an artist to be a part of the set of artists using a degree of co-occurrence of the artist with the specified at least one artist in the selected set of play logs.

64. The computer-implemented method of claim 62, wherein learned relationships exist among the artists found in the selected set of play logs, and wherein selecting the set of artists further comprises:
selecting the set of artists using the learned relationships among artists.

65. The computer-implemented method of claim 62, wherein selecting the set of artists further comprises:
selecting the set of artists responsive to parameters provided by one user.

66. The computer-implemented method of claim 62, wherein each track comprises a music track.

67. The computer-implemented method of claim 62, wherein each track comprises a video track.

68. The computer-implemented method of claim 62, further comprising transmitting, by the at least one computer, the set of tracks.

69. The computer-implemented method of claim 62, wherein selecting the set of artists further comprises:
selecting an artist to be a part of the set of artists using information indicating a frequency with which one or more tracks by the artist have been played for one user.

70. The computer-implemented method of claim 62, wherein selecting the set of artists further comprises:
selecting an artist to be a part of the set of artists using information indicating a frequency with which one or more tracks by the artist have been played for a group of users.

71. The computer-implemented method of claim 62, wherein selecting the set of artists further comprises:
selecting an artist to be a part of the set of artists using information indicating an overall popularity.

72. The computer-implemented method of claim 62, wherein selecting the set of artists further comprises:
selecting an artist to be a part of the set of artists using information indicating a popularity of the artist within a demographic group.

73. The computer-implemented method of claim 62, wherein selecting the set of artists further comprises:
selecting an artist to be a part of the set of artists using information indicating how recently one or more tracks by the artist have been played for one user.

74. The computer-implemented method of claim 62, wherein selecting the set of artists further comprises:
selecting an artist to be a part of the set of artists using information indicating how recently one or more tracks by the artist have been played for a group of users.

75. The computer-implemented method of claim 62, wherein selecting the set of artists further comprises:
selecting an artist to be a part of the set of artists using information indicating that one or more tracks by the artist have not yet been played for one user.

76. The computer-implemented method of claim 62, wherein selecting the set of artists further comprises:
selecting an artist to be a part of the set of artists using information indicating that one or more tracks by the artist have not been played for one user within a predefined period of time.

77. The computer-implemented method of claim 62, wherein selecting the set of artists further comprises:
selecting an artist to be a part of the set of artists using information indicating user preferences.

78. The computer-implemented method of claim 62, wherein selecting the set of artists further comprises:
selecting an artist to be a part of the set of artists using information indicating user genre preferences.

79. The computer-implemented method of claim 62, wherein selecting the set of artists further comprises:
selecting an artist to be a part of the set of artists using information indicating a detected user action with respect to a track by the artist.

80. The computer-implemented method of claim 79, wherein the detected user action comprises changing a volume level during playback of the track.

81. The computer-implemented method of claim 79, wherein the detected user action comprises skipping at least a portion of the track.

82. The computer-implemented method of claim 79, wherein the detected user action comprises repeating at least a portion of the track.

83. A computer-implemented method comprising:
accepting, by at least one computer, a set of preferences;
selecting, by the at least one computer, a set of play logs from a corpus of play logs, each play log in the corpus corresponding to a user and being used to identify track occurrences from observed behavior of the user, each play log in the set is selected by taking into account a number of occurrences of the at least one track in the play log; and
selecting, by the at least one computer, a set of tracks for a playlist from a corpus of tracks comprising tracks found in the set of play logs selected, wherein selecting the set of tracks comprises using the accepted set of preferences and analyzing track occurrences identified from observed behavior indicated in each play log in the selected set and track occurrences identified from observed behavior indicated in the corpus of play logs, each track in the selected set of tracks is determined to be overrepresented in the selected set of play logs based on a significance measurement for the track that takes into account multiple occurrences of the track in the play log.

84. The computer-implemented method of claim 83, wherein the user preferences comprise at least one selected from the group consisting of: at least one genre; at least one artist; and at least one track.

85. The computer-implemented method of claim 83, further comprising:
determining, by the at least one computer, demographic information; and
wherein selecting the set of tracks further comprises selected the tracks using the determined demographic information.

86. The computer-implemented method of claim 83, wherein selecting the set of tracks further comprises selecting a track to be a part of the set of tracks using information indicating a frequency with which the track has been played for a group of users.

87. The computer-implemented method of claim 83, wherein selecting the set of tracks further comprises selecting a track to be a part of the set of tracks using information indicating an overall popularity of the track.

88. The computer-implemented method of claim 83, wherein selecting the set of tracks further comprises selecting a track to be a part of the set of tracks using information indicating a popularity within a demographic group.

* * * * *